(12) United States Patent
Hori et al.

(10) Patent No.: US 11,985,503 B2
(45) Date of Patent: May 14, 2024

(54) COMMUNICATION BETWEEN TERMINAL AND BASE STATION DURING HANDOVER

(71) Applicant: Sharp Kabushiki Kaisha, Sakai (JP)

(72) Inventors: Takako Hori, Sakai (JP); Hidekazu Tsuboi, Sakai (JP); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 53 days.

(21) Appl. No.: 17/626,592

(22) PCT Filed: Jul. 17, 2020

(86) PCT No.: PCT/JP2020/027847
§ 371 (c)(1),
(2) Date: Jan. 12, 2022

(87) PCT Pub. No.: WO2021/010465
PCT Pub. Date: Jan. 21, 2021

(65) Prior Publication Data
US 2022/0256346 A1   Aug. 11, 2022

(30) Foreign Application Priority Data

Jul. 17, 2019   (JP) .................................. 2019-131999

(51) Int. Cl.
*H04W 12/106* (2021.01)
*H04W 12/03* (2021.01)
(Continued)

(52) U.S. Cl.
CPC ......... *H04W 12/106* (2021.01); *H04W 12/03* (2021.01); *H04W 12/0431* (2021.01); *H04W 76/20* (2018.02)

(58) Field of Classification Search
CPC .. H04L 9/14; H04L 2209/80; H04W 36/0069; H04W 36/18; H04W 72/04;
(Continued)

(56) References Cited

U.S. PATENT DOCUMENTS 9,756,678 B2 *   9/2017   Yamada ................. H04W 76/15
11,057,958 B2 *   7/2021   Xiao ..................... H04W 76/20
(Continued)

FOREIGN PATENT DOCUMENTS

EP           3923631 A1 *  12/2021   ............ H04W 36/18

OTHER PUBLICATIONS

NTT DOCOMO, Inc., "New WID on New Radio Access Technology", RP-170855, 3GPP TSG RAN Meeting #75, Mar. 6-9, 2017, 8 pages.
(Continued)

*Primary Examiner* — Lizbeth Torres-Diaz
(74) *Attorney, Agent, or Firm* — Keating & Bennett, LLP

(57) ABSTRACT

A terminal apparatus for communicating with a base station apparatus, the terminal apparatus including: a receiver configured to receive an RRC reconfiguration message from the base station apparatus; and a processing unit, wherein the processing unit establishes a PDCP entity in accordance with the RRC reconfiguration message, applies, to the PDCP entity, a first ciphering algorithm, a first ciphering key, a first integrity protection algorithm, and a first integrity protection key provided by an upper layer, and based on a first request made by the upper layer, applies, to the PDCP entity, a second ciphering algorithm, a second ciphering key, a second integrity protection algorithm, and a second integrity protection key provided by the upper layer.

5 Claims, 29 Drawing Sheets

(51) Int. Cl.
*H04W 12/0431* (2021.01)
*H04W 76/20* (2018.01)

(58) Field of Classification Search
CPC ..... H04W 36/08; H04W 76/20; H04W 76/34; H04W 12/106; H04W 12/0431; H04W 12/03
See application file for complete search history.

(56) References Cited

U.S. PATENT DOCUMENTS

| | | | |
|---|---|---|---|
| 11,134,527 B2* | 9/2021 | Chang | H04B 7/26 |
| 2019/0253945 A1* | 8/2019 | Paladugu | H04W 76/27 |
| 2020/0178332 A1* | 6/2020 | Sharma | H04W 76/19 |
| 2020/0359206 A1* | 11/2020 | Rugeland | H04W 12/037 |
| 2021/0014339 A1* | 1/2021 | Zhang | H04L 69/22 |
| 2021/0059010 A1* | 2/2021 | Kim | H04W 28/06 |
| 2021/0105675 A1* | 4/2021 | Kim | H04W 76/27 |

OTHER PUBLICATIONS

"3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.
"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, pp. 1-52.
"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.3.0, Sep. 2019, pp. 1-47.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, pp. 1-127.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.3.0, Sep. 2018, pp. 1-59.
"3rd Generation Partnership Project; Technical Specification Group Radio Access Network; NR; NR and NG-RAN Overall Description; Stage 2 (Release 15)", 3GPP TS 38.300 V15.3.0, Sep. 2018, pp. 1-92.
"3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-474.
"3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.
"3rd Generation Partnership Project; Technical Specification Group Radio Access Network; NR; Radio Link Control (RLC) protocol specification (Release 15)", 3GPP TS 38.322 V15.3.0, Sep. 2018, pp. 1-33.
"3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.
"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, 1-386.
"3rd Generation Partnership Project; Technical Specification Group Services and System Aspects; Procedures for the 5G System; Stage 2 (Release 15)", 3GPP TS 23.502 V15.3.0, Sep. 2018, pp. 1-329.
"3rd Generation Partnership Project; Technical Specification Group Radio Access Network; E-UTRA and NR; Service Data Adaptation Protocol (SDAP) specification (Release 15)", 3GPP TS 37.324 V15.1.0, Sep. 2018, pp. 1-13.
ETSI MCC, "Report of 3GPP TSG RAN2#105 meeting", 3GPP TSG-RAN WG2 meeting #105, R2-1903001, Feb. 25-Mar. 1, 2019, pp. 1-293.
China Telecom, "Revised WID: Even further mobility enhancement in E-UTRAN", 3GPP TSG RAN meeting #81, RP-181544, Sep. 10-13, 2018, 4 pages.
Intel Corporation, "New WID: NR mobility enhancements", 3GPP TSG RAN Meeting #80, RP-181433, May 21-25, 2018, 5 pages.
Intel Corporation, "Detail for non-split bearer option for simultaneous connectivity", 3GPP TSG RAN WG2 Meeting #105, R2-1901364, Feb. 25-Mar. 1, 2019, pp. 1-7.
CMCC, "Consideration on Approaches to reduce Interruption Time during HO/SCCG change", 3GPP TSG-RAN WG2 Meeting #105, R2-1901978, Feb. 25-Mar. 1, 2019, 11 pages.
Official Communication issued in International Patent Application No. PCT/JP2020/027847, mailed on Sep. 15, 2020.

* cited by examiner

| Timer | Start | Stop | At expiry |
|---|---|---|---|
| T300 | Transmission of RRCConnectionRequest or RRCConnectionResumeRequest or RRCEarlyDataRequest | Reception of RRCConnectionSetup, RRCConnectionReject or RRCConnectionResume or RRCEarlyDataComplete or RRCConnectionRelease for UP-EDT, cell re-selection and upon abortion of connection establishment by upper layers | Perform the specified action |
| T301 | Transmission of RRCConnectionReestablishmentRequest | Reception of RRCConnectionReestablishment or RRCConnectionReestablishmentReject message as well as when the selected cell becomes unsuitable | Go to RRC_IDLE |
| T304 | Reception of RRCConnectionReconfiguration message including the MobilityControl Info or reception of MobilityFromEUTRACommand message including CellChangeOrder | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |
| T311 | Upon initiating the RRC connection re-establishment procedure | Selection of a suitable E-UTRA cell or a cell using another RAT. | Enter RRC_IDLE |

FIG. 9

```
<OMITTED>
MobilityControlInfo ::=       SEQUENCE {
    targetPhysCellId          PhysCellId,
    <PARTLY OMITTED>
    t304                      ENUMERATED {
                                  ms50, ms100, ms150, ms200, ms500, ms1000,
                                  ms2000, ms10000-v1310},
    newUE-Identity             C-RNTI,
    radioResourceConfigCommon  RadioResourceConfigCommon,
    rach-ConfigDedicated       RACH-ConfigDedicated           OPTIONAL,   -- Need OP
    ...,
    <PARTLY OMITTED>
    [[
    <PARTLY OMITTED>
        makeBeforeBreak-r14    ENUMERATED {true}              OPTIONAL,   -- Need OR
        rach-Skip-r14          RACH-Skip-r14                  OPTIONAL,   -- Need OR
    <PARTLY OMITTED>
    ]],
    [[
    <PARTLY OMITTED>
        makeBeforeBreak-r16    ENUMERATED {true}              OPTIONAL,   -- Need OR
    <PARTLY OMITTED>
    ]],
    <PARTLY OMITTED>
    <OMITTED>
}
```

FIG. 10

```
<OMITTED>
MobilityControlInfo ::=    SEQUENCE {
    <PARTLY OMITTED>
    [[
    <PARTLY OMITTED>
        makeBeforeBreak-r14        ENUMERATED {true}         OPTIONAL,  -- Need OR
    <PARTLY OMITTED>
    ]],
    <PARTLY OMITTED>
        makeBeforeBreak-r16        MakeBeforeBreak-r16       OPTIONAL,  -- Need OR
    <PARTLY OMITTED>
    ]],
    <PARTLY OMITTED>
}
<OMITTED>
MakeBeforeBreak-r16 ::=    SEQUENCE {
    parameterA                     ParameterA,
    parameterB                     ParameterB,
    <PARTLY OMITTED>
}
<OMITTED>
```

FIG. 11

```
<OMITTED>
ReconfigurationWithSync ::=     SEQUENCE {
    spCellConfigCommon          ServingCellConfigCommon     OPTIONAL,       -- Need M
    <PARTLY OMITTED>
    t304                        ENUMERATED {ms50, ms100, ms150, ms200, ms500, ms1000, ms2000, ms10000},
    newUE-Identity              RNTI-Value,
    rach-ConfigDedicated        CHOICE {
        uplink                      RACH-ConfigDedicated,
        supplementaryUplink         RACH-ConfigDedicated
    }                                                       OPTIONAL,       -- Need N
    <PARTLY OMITTED>
    [[
    <PARTLY OMITTED>
    makeBeforeBreak-r16         ENUMERATED {true}           OPTIONAL,       -- Need OR
    rach-Skip-r16               RACH-Skip-r16               OPTIONAL,       -- Need OR
    <PARTLY OMITTED>
    ]],
    <PARTLY OMITTED>
}
<OMITTED>
```

FIG. 12

```
<OMITTED>
ReconfigurationWithSync ::=   SEQUENCE {
<PARTLY OMITTED>
[[
<PARTLY OMITTED>
   makeBeforeBreak-r16        MakeBeforeBreak-r16       OPTIONAL,  -- Need OR
<PARTLY OMITTED>
]],
<PARTLY OMITTED>
}
<OMITTED>
MakeBeforeBreak-r16 ::=   SEQUENCE {
   parameterA                 ParameterA,
   parameterB                 ParameterB,
<PARTLY OMITTED>
}
<OMITTED>
```

FIG. 13

```
RadioBearerConfig ::=            SEQUENCE {
    <PARTLY OMITTED>
    srb-ToAddModList             SRB-ToAddModList       OPTIONAL,
    drb-ToAddModList             DRB-ToAddModList       OPTIONAL,
    drb-ToReleaseList            DRB-ToReleaseList      OPTIONAL,
    <PARTLY OMITTED>
}

SRB-ToAddModList ::=             SEQUENCE (SIZE (1..2)) OF SRB-ToAddMod
SRB-ToAddMod ::=                 SEQUENCE {
    srb-Identity                 SRB-Identity,
    <PARTLY OMITTED>
    pdcp-Config                  PDCP-Config            OPTIONAL,   -- Cond PDCP
    ...
}

DRB-ToAddModList ::=             SEQUENCE (SIZE (1..maxDRB)) OF DRB-ToAddMod
DRB-ToAddMod ::=                 SEQUENCE {
    cnAssociation                CHOICE {
        eps-BearerIdentity       INTEGER (0..15),       -- EPS-DRB-Setup
        sdap-Config              SDAP-Config            -- 5GC
    }                                                   OPTIONAL, -- Cond DRBSetup
    drb-Identity                 DRB-Identity,
    <PARTLY OMITTED>
    pdcp-Config                  PDCP-Config            OPTIONAL,   -- Cond PDCP
    ...
}

DRB-ToReleaseList ::=            SEQUENCE (SIZE (1..maxDRB)) OF DRB-Identity
DRB-Identity ::=                 INTEGER (1..32)
SDAP-Config ::=                  SEQUENCE {
    <PARTLY OMITTED>
    pdu-Session                  PDU-SessionID,
    mappedQoS-FlowsToAdd         SEQUENCE (SIZE (1..maxNrofQFIs)) OF QFI
    mappedQoS-FlowsToRelease     SEQUENCE (SIZE (1..maxNrofQFIs)) OF QFI
    ...
}
```

FIG. 14

```
<OMITTED>
RadioResourceConfigDedicated ::=        SEQUENCE {
    <PARTLY OMITTED>
    srb-ToAddModList            SRB-ToAddModList ,
    drb-ToAddModList            DRB-ToAddModList,
    drb-ToReleaseList           SEQUENCE (SIZE (1..maxDRB)) OF DRB-Identity,
    <PARTLY OMITTED>
}
SRB-ToAddModList ::= SEQUENCE (size (1..2)) OF SRB-ToAddMod
SRB-ToAddMod ::= SEQUENCE {
    <PARTLY OMITTED>
    srb-Identity        INTEGER (1..2),
    pdcp-Config         PDCP-Config                     OPTIONAL,
    <PARTLY OMITTED>
}
DRB-ToAddModList ::= SEQUENCE (size (1..maxQoSFlowID)) OF DRB-ToAddMod
DRB-ToAddMod ::= SEQUENCE {
    <PARTLY OMITTED>
    eps-BearerIdentity          INTEGER (0..15)         OPTIONAL,
    drb-Identity        DRB-Identity,
    pdcp-Config         PDCP-Config                     OPTIONAL,
    <PARTLY OMITTED>
}
DRB-Identity ::=        INTEGER (1..32)
<OMITTED>
```

FIG. 15

(A)
```
<OMITTED>
PDCP-Config ::=           SEQUENCE {
    <PARTLY OMITTED>
    [[
    mbb-drb           ENUMERATED {true} OPTIONAL,    -- Cond MBB-HO
    <PARTLY OMITTED>
    ]],
    <PARTLY OMITTED>
    <OMITTED>
}
```

(B)
```
<OMITTED>
PDCP-Config ::=           SEQUENCE {
    <PARTLY OMITTED>
    [[
    mbb-drb           MBB-DRB           OPTIONAL,    -- Cond MBB-HO
    <PARTLY OMITTED>
    ]],
    MBB-DRB ::= SEQUENCE {
        targetCellGroupId            CellGroupId,
        targetlogicalChannelIdentity    LogicalChannelIdentity
    }
    <PARTLY OMITTED>
}
    <PARTLY OMITTED>
CellGroupId ::=    INTEGER (0.. maxSecondaryCellGroups)
    <PARTLY OMITTED>
LogicalChannelIdentity ::=    INTEGER (1..maxLC-ID)
<OMITTED>
```

FIG. 20

```
<OMITTED>
ReconfigurationWithSync ::=     SEQUENCE {
<PARTLY OMITTED>
[[
<PARTLY OMITTED>
    makeBeforeBreak-r16         MakeBeforeBreak-r16        OPTIONAL,    -- Need OR
<PARTLY OMITTED>
]].
<PARTLY OMITTED>
}

<PARTLY OMITTED>
MakeBeforeBreak-r16 ::=     SEQUENCE {
<PARTLY OMITTED>
    mbb-drbList                 MBB-DRBList,
<PARTLY OMITTED>
}

<PARTLY OMITTED>
MBB-DRBList ::=     SEQUENCE (SIZE (1..maxDRB)) OF MBB-DRB
<PARTLY OMITTED>
MBB-DRB ::=     SEQUENCE {
    drb-Identity                DRB-Identity,
    targetCellGroupId           CellGroupId,
    targetLogicalChannelIdentity LogicalChannelIdentity
<PARTLY OMITTED>
}
<OMITTED>
```

PDCP ENTITY PERFORMS RECEPTION PROCESSING BASED ON FIRST INFORMATION IN RESPONSE TO PDCP DATA PDU FROM FIRST RLC ENTITY, AND PERFORMS RECEPTION PROCESSING BASED ON SECOND INFORMATION IN RESPONSE TO PDCP DATA PDU FROM SECOND RLC ENTITY. ALTERNATIVELY, SUB-ENTITY OF PDCP ENTITY PERFORMS RECEPTION PROCESSING BASED ON INFORMATION CONFIGURED FOR SUB-ENTITY.

FIG. 24

COMMUNICATION BETWEEN TERMINAL AND BASE STATION DURING HANDOVER

TECHNICAL FIELD

The present invention relates to a terminal apparatus, a method, and an integrated circuit. This application claims priority to JP 2019-131999 filed on Jul. 17, 2019, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core or EPC") have been studied by the 3rd Generation Partnership Project (3GPP). EUTRA is also referred to as E-UTRA.

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300 v15.3.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.4.0, "Evolved Universal Terrestrial Radio Access (E-UTRA); Radio Resource Control (RRC); Protocol specifications"
NPL 5: 3GPP TS 36.323 v15.3.0, "Evolved Universal Terrestrial Radio Access (E-UTRA); Packet Data Convergence Protocol (PDCP) specification"
NPL 6: 3GPP TS 36.322 v15.3.0, "Evolved Universal Terrestrial Radio Access (E-UTRA); Radio Link Control (RLC) protocol specification"
NPL 7: 3GPP TS 36.321 v15.3.0, "Evolved Universal Terrestrial Radio Access (E-UTRA); Medium Access Control (MAC) protocol specification"
NPL 8: 3GPP TS 37.340v 15.3.0, "Evolved Universal Terrestrial Radio Access (E-UTRA) and NR; Multi-Connectivity; Stage 2"
NPL 9: 3GPP TS 38.300v 15.3.0, "NR; NR and NG-RAN Overall description; Stage 2"
NPL 10: 3GPP TS 38.331 v15.4.0, "NR; Radio Resource Control (RRC); Protocol specifications"
NPL 11: 3GPP TS 38.323 v15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.3.0, "NR; Medium Access Control (MAC) protocol specification"
NPL 14: 3GPP TS 23.401 v15.0.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) Specification"
NPL 17: 3 GPP Draft_Report_v1.doc, "Report of 3GPP TSG RAN2 #105 Meeting, Athens, Greece" http://www.3gpp.Org/ftp/TSG_RAN/WG2_RL2/TSGR2_105/Report/Draft_Report_v1.zip
NPL 18: 3GPP RP-181544, "Revised WID: Even further mobility enhancement in E-UTRAN"
NPL 19: 3GPP RP-181433, "New WID: NR mobility enhancements"
NPL 20: 3GPP R2-1901364, "Detail for non-split bearer option for simultaneous connectivity"

SUMMARY OF INVENTION

Technical Problem

As a technical study for LTE, a mechanism for further expanding a mobility expansion technology for existing LTE has been under study. Furthermore, as a technical study for NR, a mechanism for further expanding a mobility expansion technology for existing NR has also been under study. (NPL 18, NPL 19). These studies include a study of a technology for making interruption of transmission and/or reception of user data closer to 0 ms mainly during movement between cells (during handover) while a base station apparatus and a terminal apparatus are connected (Reduce User Data Interruption (RUDI) and a study of handover robustness improvements.

For RUDI, a scheme for simultaneous presence of two protocol stacks for a single cell group has been under study. However, detailed operations of a terminal for efficiently controlling mobility have not yet been studied.

One aspect of the present invention has been made in light of the foregoing, and an object of the present invention is to provide a terminal apparatus, a base station apparatus, a method, and an integrated circuit, which enable efficient control of mobility.

Solution to Problem

In order to accomplish the object described above, an aspect of the present invention is contrived to provide the following measures. Specifically, a terminal apparatus for communicating with a base station apparatus, the terminal apparatus including: a receiver configured to receive an RRC reconfiguration message from the base station apparatus; and a processing unit, wherein the processing unit establishes a PDCP entity in accordance with the RRC reconfiguration message, applies, to the PDCP entity, a first ciphering algorithm, a first ciphering key, a first integrity protection algorithm, and a first integrity protection key provided by an upper layer, and based on a first request made by the upper layer, applies, to the PDCP entity, a second ciphering algorithm, a second ciphering key, a second integrity protection algorithm, and a second integrity protection key provided by the upper layer.

One aspect of the present invention is a method for a terminal apparatus for communicating with a base station apparatus, the method including: receiving an RRC reconfiguration message from the base station apparatus; establishing a PDCP entity in accordance with the RRC reconfiguration message; applying, to the PDCP entity, a first ciphering algorithm, a first ciphering key, a first integrity protection algorithm, and a first integrity protection key provided by an upper layer, and based on a first request being made by the upper layer, applying, to the PDCP entity, a second ciphering algorithm, a second ciphering key, a second integrity protection algorithm, and a second integrity protection key provided by the upper layer.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can implement efficient mobility processing.

BRIEF DESCRIPTION OF DRAWINGS

FIG. 9 is an example of conditions for start and stop of each timer according to an embodiment of the present invention.

FIG. 10 is an example of a mobilityControlInfo information element according to an embodiment of the present invention.

FIG. 11 is another example of the mobilityControlInfo information element according to an embodiment of the present invention.

FIG. 12 is an example of a Reconfiguration With Synch information element according to an embodiment of the present invention.

FIG. 13 is another example of the Reconfiguration With Sync information element according to an embodiment of the present invention.

FIG. 14 is an example of an ASN.1 notation included in a message related to reconfiguration of RRC connection in NR according to an embodiment of the present invention.

FIG. 15 is an example of an ASN.1 notation included in a message related to reconfiguration of RRC connection in E-UTRA according to an embodiment of the present invention.

FIG. 20 is an example of ASN.1 notation indicating a parameter for a configuration as to whether to apply a make before break-handover to a radio bearer according to each embodiment of the present invention.

FIG. 21 is another example of ASN.1 notation indicating the parameter for the configuration as to whether to apply a make before break-handover to the radio bearer according to each embodiment of the present invention.

FIG. 24 is an example of a downlink reception processing method performed by the PDCP entity 2200 according to each form of the present implementation.

DESCRIPTION OF EMBODIMENTS

Hereinafter, an embodiment of the present invention will be described in detail with reference to the drawings.

LTE (and LTE-A Pro) and NR may be defined as different Radio Access Technologies (RATs). The NR may be defined as a technology included in the LTE. The LTE may be defined as a technology included in the NR. The LTE that is connectible to the NR by using Multi Radio Dual connectivity may be distinguished from the existing LTE. The LTE in which a 5GC is used as a core network may be distinguished from a conventional LTE, where an EPC is used as a core network. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA."

Figure 1:
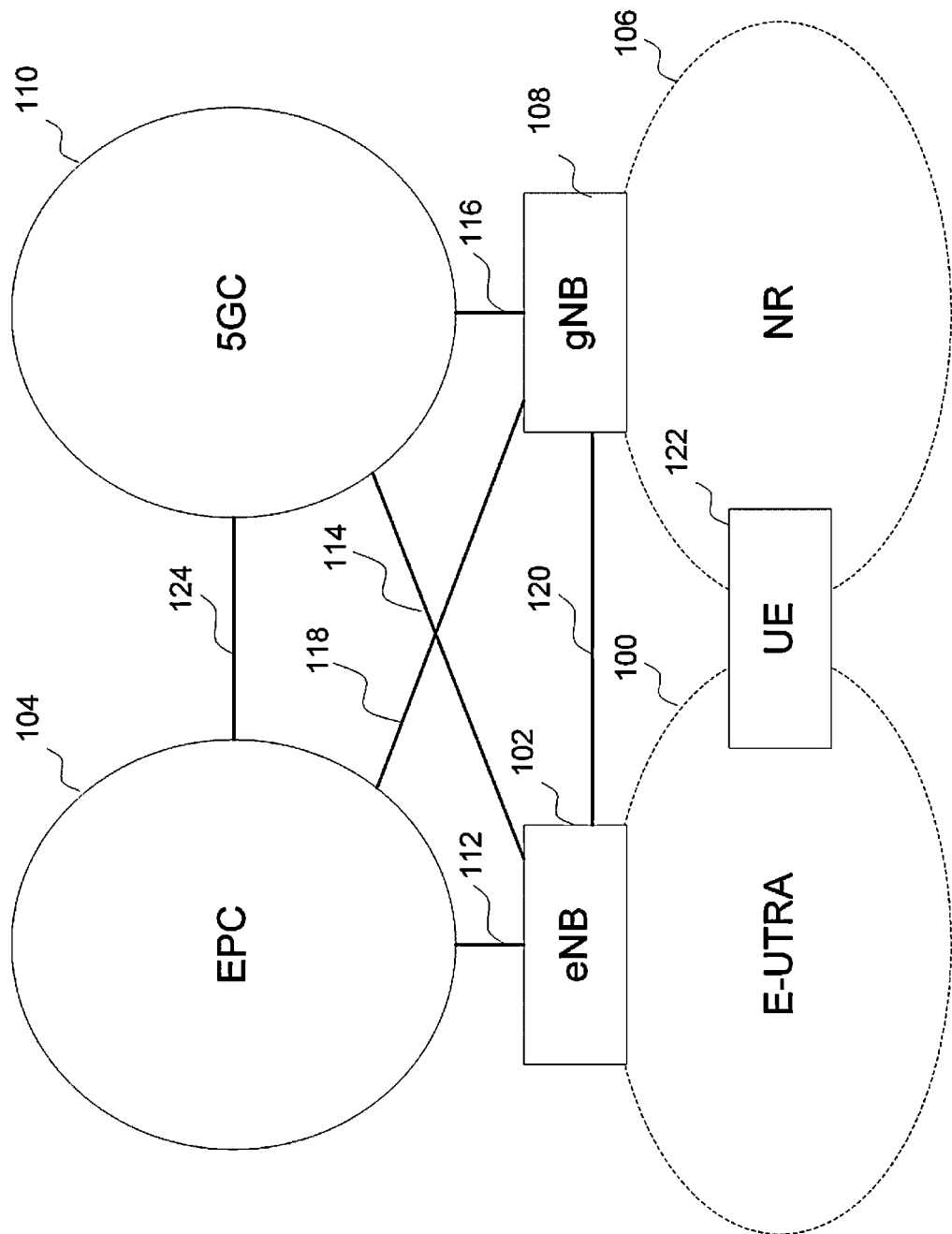
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA 100. An Evolved Packet Core (EPC) 104 is a core network described in NPL 14 and the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 9 and the like, and includes a cell group (CG) including one or multiple frequency bands. A gNodeB (gNB) 108 is a base station apparatus in the NR 106. A 5GC 110 is a core network described in NPL 2 and the like, and is designed as a core network for the NR 106, but may also be used as a core network used for the E-UTRA 100 and including a function to connect to the 5GC 110. Hereinafter, the E-UTRA 100 may include the E-UTRA 100 including a function to connect to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, the interface 124, and the like may be interfaces that allow a CP only, an UP only, or both the CP and UP to pass through. The interface 114, the interface 116, the interface 118, the interface 120, the interface 124, and the like may be absent depending on a communication system provided by a network operator.

A UE 122 is a terminal apparatus supporting one or all of the E-UTRA 100 and the NR 106. As described in any or all of NPL 3 and NPL 9, in a case that the UE 122 connects to a core network via any or all of the E-UTRA 100 and the NR 106, a logical path called a radio bearer (RB) is established between the UE 122 and any or all of the E-UTRA 100 and the NR 106. The radio bearer used for the CP is referred to as a Signaling Radio Bearer (SRB), and the radio bearer used for the UP is referred to as a Data Radio Bearer (DRB). Each RB is assigned an RB identity (or an RB ID) and uniquely identified. The RB identity for the SRB is referred to as an SRB identity (or an SRB ID), and the RB identity for the DRB is referred to as a DRB identity (or a DRB ID).

As described in NPL 3, in a case that a connection destination core network for the UE 122 is an EPC 104, each DRB established between the UE 122 and any or all of the E-UTRA 100 and the NR 106 is uniquely linked to each Evolved Packet System (EPS) bearer passing through the EPC 104. Each EPS bearer is assigned an EPS bearer identity (or ID), and uniquely identified. Additionally, identical QoS is ensured for data passing through an identical EPS bearer.

As described in NPL 9, in a case that a connection destination core network of the UE 122 is the 5GC 110, one or multiple DRBs established between the UE 122 and any or all of the E-UTRA 100 and the NR 106 are further linked to one of the Packet Data Unit (PDU) sessions established in the 5GC 110. One or multiple QoS flows are present in each PDU session. Each DRB may be mapped to one or multiple QoS flows present in the linked PDU session or to none of the QoS flows. Each PDU session is identified by a PDU session identity (or ID). Additionally, each QoS flow is identified by a QoS flow identity. Identical QoS is ensured for data passing through an identical QoS flow.

In the EPC 104, any of the PDU sessions and the QoS flows is absent or none of the PDU sessions and the QoS flows are present. No EPS bearers are present in the 5GC 110. In other words, in a case of being connected to the EPC 104, the UE 122 has information of the EPS bearers. In a case of being connected to the 5GC 110, the UE 122 has information of any or all of the PDU sessions and the QoS flows.

Figure 2:
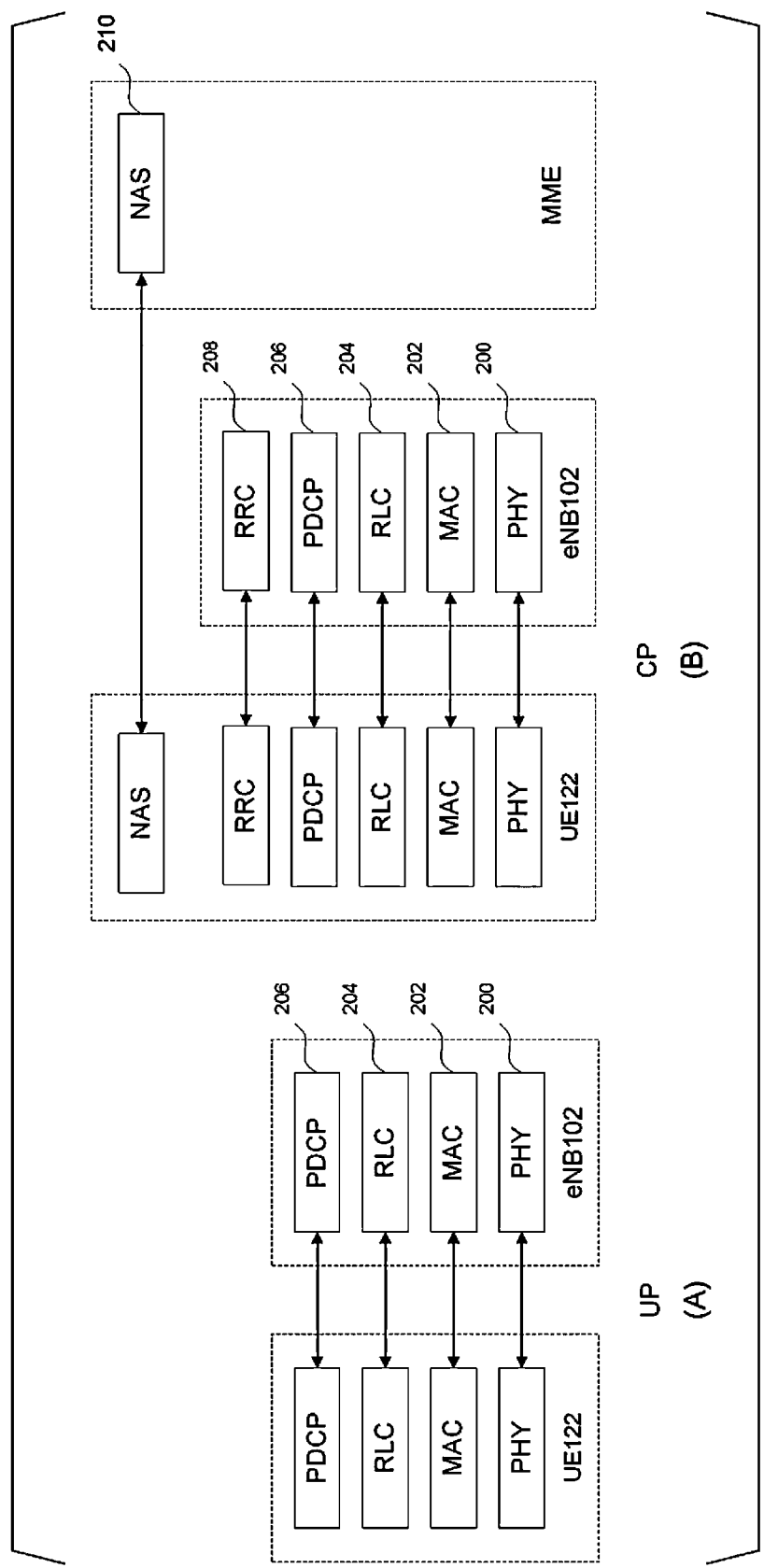
FIG. 2 is a diagram of protocol stacks of a UP and a CP of a terminal apparatus and a base station apparatus in E-UTRA according to each embodiment of the present invention.

FIG. 2 is a diagram of protocol stacks of UP and CP of a terminal apparatus and a base station apparatus in an E-UTRA radio access layer according to each embodiment of the present invention.

FIG. 2(A) is a diagram of a protocol stack of the UP used in a case that the UE 122 communicates with the eNB 102 in the E-UTRA 100.

A Physical layer (PHY) 200 is a radio physical layer and provides a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

An RLC 204 is a radio link control layer that segments data received from a Packet Data Convergence Protocol Layer (PDCP) 206 corresponding to an upper layer and described below, and adjusts the data size such that a lower layer can properly transmit the data. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting IP packets, used as user data, in wireless sections. The PDCP 206 may include a header compression function to compress unnecessary control information. The PDCP 206 may also include a data ciphering function. (NPL 5).

Note that data processed in the MAC 202, the RLC 204, and the PDCP 206 are referred to as a MAC Protocol Data Unit (PDU), an RLC PDU, and a PDCP PDU, respectively. Data delivered from an upper layer to the MAC 202, the RLC 204, and the PDCP 206 or data delivered therefrom to the upper layer are respectively referred to as a MAC Service Data Unit (SDU), an RLC SDU, and a PDCP SDU.

Additionally, PDCP PDUs may also be referred to as PDCP DATA PDUs (PDCP Data PDUs) and PDCP CONTROL PDUs (PDCP Control PDUs) in order to distinguish protocol data units for data from protocol data units for control. Additionally, RLC PDUs may also be referred to as RLC DATA PDUs (RLC Data PDUs) and RLC CONTROL PDUs (RLC Control PDUs) in order to distinguish protocol data units for data from protocol data units for control.

FIG. 2(B) is a protocol stack diagram of the CP used by the UE 122 in communicating with the eNB 102 and a Mobility Management Entity (MME) used as a logical node providing functions such as authentication and mobility management in the E-UTRA 100.

In the protocol stack of the CP, a Radio Resource Control layer (RRC) 208 and a non Access Strarum (NAS) 210 are present in addition to the PHY 200, the MAC 202, the RLC 204, and the PDCP 206. The RRC 208 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. In addition, a portion of the RB including the RLC 204 and the MAC 202 may be referred to as an RLC bearer (NPL 4). In contrast to the NAS layer carrying signals between the MME and the UE 122, some or all of the layers of the PHY 200, the MAC 202, the RLC 204, the PDCP 206, and the RRC 208 carrying signals and data between the UE 122 and the eNB 102 may be referred to as Access Strarum (AS) layers.

The functional classification of the MAC 202, the RLC 204, the PDCP 206, and the RRC 208 described above is an example, and some or all of the respective functions may not be implemented. Some or all of the functions of each layer may be included in another layer.

Note that an IP layer, and a Transmission Control Protocol (TCP) layer, a User Datagram Protocol (UDP) layer, an application layer, and the like that are upper layers of the IP layer are upper layers of the PDCP layer (this is not illustrated). In addition, the RRC layer and the non Access Strarum (NAS) layer also correspond to upper layers of the PDCP layer (this is not illustrated). In other words, the PDCP layer is a lower layer of the Transmission Control Protocol (TCP) layer, the User Datagram Protocol (UDP) layer, and the application layer that are upper layers of the RRC layer, the NAS layer, and the IP layer (this is not illustrated).

Figure 3:
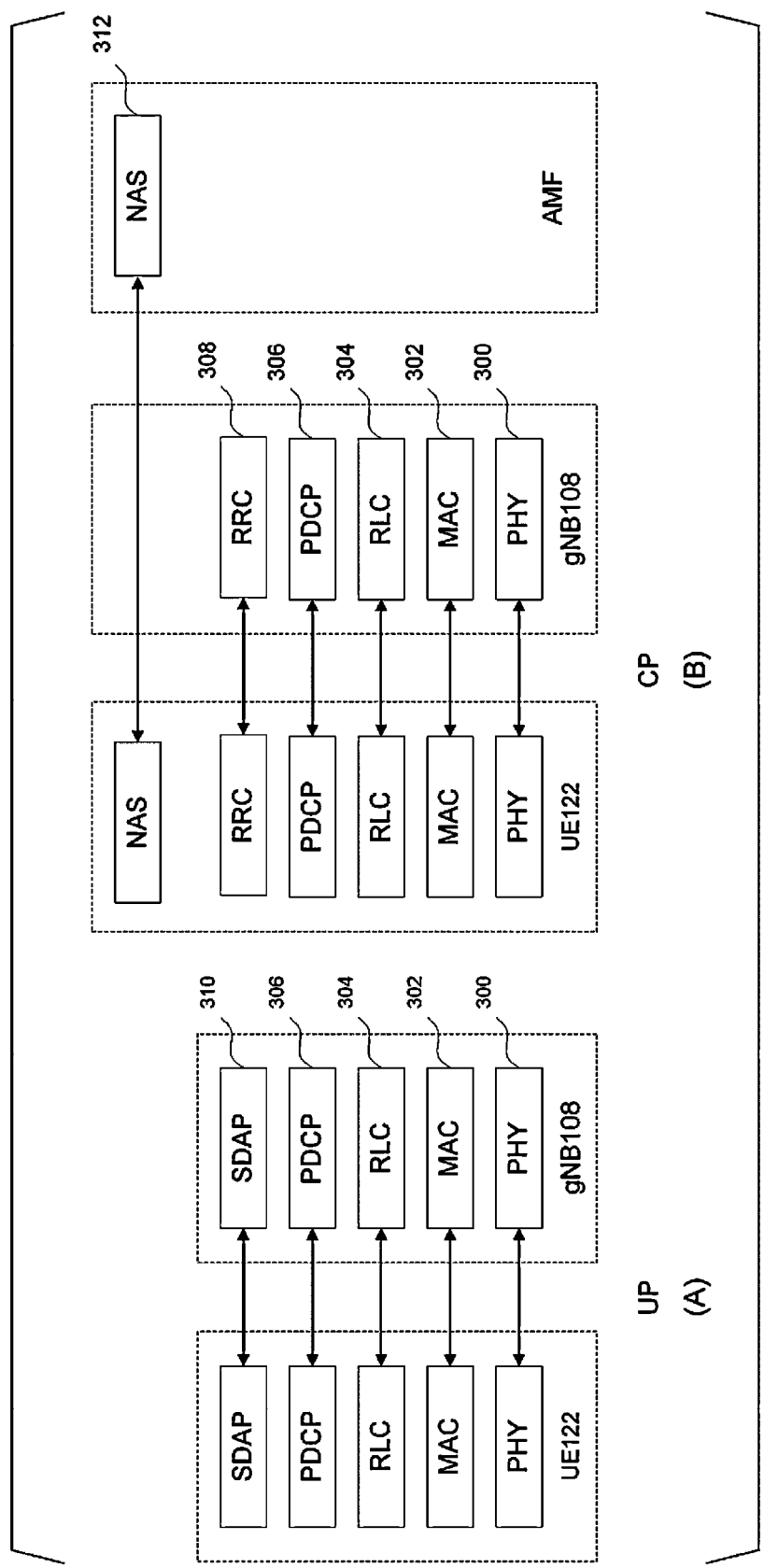
FIG. 3 is a diagram of protocol stacks of the UP and the CP of the terminal apparatus and the base station apparatus in NR according to each embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used by the UE 122 in communicating with the gNB 108 in the NR 106.

A physical layer (PHY) 300 is a radio physical layer of the NR and may provide a transmission service to an upper layer by using a physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

Now, the physical channels will be described.

The following physical channels may be used for the radio communication between the terminal apparatus and the base station apparatus.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast system information required by the terminal apparatuses.

The PBCH may be used to broadcast time indexes (SSB-Indexes) within the periodicity of synchronization signal blocks (also referred to as SS/PBCH blocks) in NR.

The PDCCH is used to transmit (or carry) downlink control information (DCI) in a case of downlink radio communication (radio communication from the base station apparatus 3 to the terminal apparatus). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus monitors a set of PDCCH candidates in the serving cell. The monitoring means an attempt to decode the PDCCH in accordance with a certain DCI format. The certain DCI format may be used for scheduling of the PUSCH in the serving cell. The PUSCH may be used for transmission of user data, transmission of RRC messages, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK).

The PDSCH may be used to transmit downlink data (Downlink Shared CHannel (DL-SCH)) from the MAC layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. Furthermore, the PSCH may be used to transmit the CSI only or the HARQ-ACK and CSI only. In other words, the PSCH may be used to transmit the UCI only. The PDSCH or the PUSCH may be used to transmit RRC signaling (also referred to as RRC messages) and MAC control elements. In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used to transmit a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

The MAC 302 is a medium access control layer that maps various logical channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the random access procedure, a function of reporting the transmit power information, a function of performing the HARQ control, and the like (NPL 13).

An RLC 304 is a radio link control layer that segments data received from a Packet Data Convergence Protocol Layer (PDCP) 206 described below and corresponding to an upper layer and that adjusts the data size such that a lower layer can properly transmit the data. Furthermore, the RLC 304 may also have a function of ensuring Quality of Service (QoS) required for each piece of data. In other words, the RLC 304 may have a function of data retransmission control or the like (NPL 12).

The PDCP 306 is a packet data convergence protocol layer that efficiently transmits IP packets, used as user data, in wireless sections. The PDCP 306 may include a header compression function to compress unnecessary control information. The PDCP 306 may also have a data ciphering function and a data integrity protection function (NPL 11).

A Service Data Adaptation Protocol (SDAP) 310 is a service data adaptation protocol layer that functions to map the DRB to a downlink QoS flow transmitted from the 5GC 110 to the terminal apparatus via the base station apparatus, and to map the DRB to an uplink QoS flow transmitted from the terminal apparatus to the 5GC 110 via the base station apparatus, and to store mapping rule information (NPL 16).

Note that the data processed in the MAC 302, the RLC 304, the PDCP 306, and the SDAP 310 may be respectively referred to as a MAC Protocol Data Unit (PDU), an RLC PDU, a PDCP PDU, and an SDAP PDU. Data delivered from an upper layer to the MAC 302, the RLC 304, the PDCP 306, and the SDAP 310 or data delivered therefrom to the upper layer are respectively referred to as a MAC Service Data Unit (SDU), an RLC SDU, a PDCP SDU, and an SDAP SDU.

SDAP PDUs may also be referred to as SDAP DATA PDUs (SDAP Data PDUs) and SDAP CONTROL PDUs (SDAP Control PDUs) in order to distinguish protocol data units for data from protocol data units for control. Additionally, PDCP PDUs may also be referred to as PDCP DATA PDUs (PDCP Data PDUs) and PDCP CONTROL PDUs (PDCP Control PDUs) in order to distinguish protocol data units for data from protocol data units for control. Additionally, RLC PDUs may also be referred to as RLC DATA PDUs (RLC Data PDUs) and RLC CONTROL PDUs (RLC Control PDUs) in order to distinguish protocol data units for data from protocol data units for control.

FIG. 3(B) is a protocol stack diagram of the CP used by the UE 122 in communicating with the gNB 108 and an Access and Mobility Management function (AMF) used as a logical node providing functions such as authentication and mobility management in the NR 106.

In the protocol stack of the CP, a Radio Resource Control layer (RRC) 308 and a non Access Strarum (NAS) 312 are present in addition to the PHY 300, the MAC 302, the RLC 304, and the PDCP 306. The RRC 308 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. In addition, a portion of the RB including the RLC 304 and the MAC 302 may be referred to as an RLC bearer (NPL 10). In contrast to the NAS layer carrying signals between the AMF and the UE 122, some or all of the layers of the PHY 300, the MAC 302, the RLC 304, the PDCP 306, the RRC 308, and the SDAP 310 carrying signals and data between the UE 122 and the gNB 108 may be referred to as Access Strarum (AS) layers.

For the SRB, SRB0 to SRB3 described below may be defined. SRB0 may be an SRB used for an RRC message and using a Common Control CHannel (CCCH) corresponding to a logical channel SRB1 may be an SRB for the RRC message (which may include a piggybacked NAS message) and for the NAS message prior to the establishment of SRB2, and the Dedicated Control CHannel (DCCH) corresponding to a logical channel may be used for all cases. SRB2 may be an SRB for the NAS message, and the DCCH corresponding to a logical channel may be used for all cases. SRB2 may have a lower priority than SRB1. SRB3 may be an SRB for a particular RRC message in a case that the UE 122 is configured with EN-DC, NGEN-DC, NR-DC, or the like, and the DCCH corresponding to a logical channel may be used for all cases. Other SRBs may also be provided for other applications.

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that the IP layer and the Transmission Control Protocol (TCP) layer, the User Datagram Protocol (UDP) layer, the application layer, and the like that are upper layers of the IP layer are upper layers of one or all of the SDAP layer and the PDCP layer (this is not illustrated). Additionally, the RRC layer and the non Access Strarum (NAS) layer may also be an upper layer of one or all of the SDAP layer and the PDCP layer (this is not illustrated). In other words, one or all of the SDAP layer and the PDCP layer are lower layers of any or all of the Transmission Control Protocol (TCP) layer, the User Datagram Protocol (UDP) layer, and the application layer that are upper layers of the RRC layer, the NAS layer, and the IP layer (this is not illustrated).

Note that, in each embodiment of the present invention, any or all of the following belong to the application layer: a Session Initiation Protocol (SIP), a Session Description Protocol (SDP), and the like used for IMS; a Real-time Transport Protocol (RTP), a Real-time Transport Control Protocol (RTCP), a HyperText Transfer Protocol (HTTP), and the like used for media communication or media communication control; and codecs of various media and the like.

Note that the RRC layer of the terminal apparatus may perform any or all of establishment, configuration, and control of the physical layer, the MAC layer, the RLC layer, the PDCP layer, and the SDAP layer of the terminal apparatus. The RRC layer of the terminal apparatus may establish and/or configure the physical layer, the MAC layer, the RLC layer, the PDCP layer, and the SDAP layer in accordance with the RRC message transmitted from the RRC layer of the base station apparatus. The MAC layer, the RLC layer, the PDCP layer, and the SDAP layer may be referred to as a MAC sublayer, an RLC sublayer, a PDCP sublayer, and a SDAP sublayer.

Note that an entity may refer to each of the layers belonging to the AS layer configured for one or all of the terminal apparatus and the base station apparatus or the function of each layer. Specifically, the physical layer (PHY layer), the MAC layer, the RLC layer, the PDCP layer, the SDAP layer, and the RRC layer in which one or all of the terminal apparatus and the base station apparatus are subjected to any or all of establishment, configuration, and control, or the functions of the layers may be referred to as a physical entity (PHY entity), a MAC entity, an RLC entity, a PDCP entity, an SDAP entity, and an RRC entity. For the entity in each layer, one or multiple entities may be included in each layer. The PDCP entity and the RLC entity may be subjected to any or all of establishment, configuration, and control for each radio bearer. The MAC entity may be subjected to any or all of establishment, configuration, and control for each cell group. The SDAP entity may be subjected to any or all of establishment, configuration, and controlling may be performed for each PDU session.

Note that a COUNT value may be used in processing for ciphering or integrity protection in the PDCP layer or the PDCP entity. The COUNT value may include a Hyper Frame Number (HFN) and a sequence number (SN) added to the header of the PDCP PDU. The sequence number may be incremented by one each time a PDCP data PDU is generated by the PDCP layer or PDCP entity on the transmission side. The HFN may be incremented by one each time the sequence number reaches the maximum value.

Note that in each embodiment of the present invention, for a distinction between the E-UTRA protocol and the NR protocol, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In the E-UTRA 100, the NR PDCP may be used as a PDCP even in a case that the UE 122 communicates with the eNB 102.

The state transition of the UE 122 in LTE and NR will now be described. The UE 122 connected to the EPC may be in an RRC_CONNECTED state in a case that an RRC connection has been established. The UE 122 may be in an RRC_INACTIVE state in a case that the RRC connection is suspended (in a case that the UE 122 is connected to the 5GC). In the other cases, the UE 122 may be in an RRC_IDLE state.

Note that the UE 122 connected to the EPC does not have the RRC_INACTIVE state but that the E-UTRAN may initiate suspension of the RRC connection. In this case, in response to suspension of the RRC connection, the UE 122 transitions to the RRC_IDLE state while retaining an AS context of the UE and an identity used for resumption (resumeIdentity). In a case that the UE 122 retains the AS context of the UE and that the E-UTRAN permits the RRC connection to be resumed and that the UE 122 needs to transition from the RRC_IDLE state to the RRC_CONNECTED state, the resumption of the RRC connection suspended may be initiated by the upper layer (e.g., the NAS layer).

In other words, the definition of the suspension may vary between the UE 122 connected to the EPC and the UE 122 connected to the 5GC. All or part of the procedure for resuming the connection suspended may vary between a case where the UE 122 is connected to the EPC (the connection is suspended in the RRC_IDLE state) and a case where the UE 122 is connected to the 5GC (the connection is suspended in the RRC_INACTIVE state).

Note that the RRC_CONNECTED state, the RRC_INACTIVE state, and the RRC_IDLE state may be respectively referred to as a connected mode, an inactive mode, and an idle mode.

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

Figure 4:
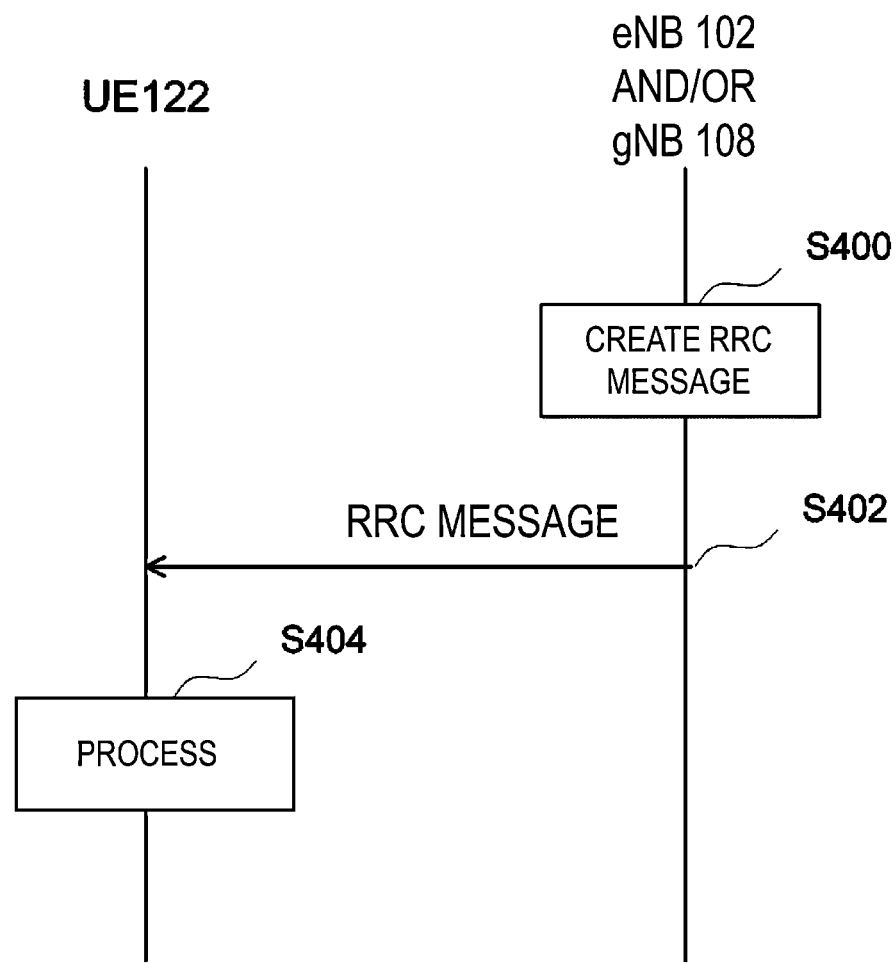
FIG. 4 is a diagram illustrating an example of a flow of a procedure for various configurations in RRC 208 and/or RRC 308 according to each embodiment of the present invention.

FIG. 4 is a diagram illustrating an example of a flow of a procedure for various configurations in the RRC 208 and/or the RRC 308 in each embodiment of the present invention. FIG. 4 is an example of a flow in a case that an RRC message is sent from the base station apparatus (eNB 102 and/or gNB 108) to the terminal apparatus (UE 122).

In FIG. 4, the base station apparatus creates an RRC message (step S400). The creation of the RRC message in the base station apparatus may be performed in a case that the base station apparatus distributes broadcast information (System Information (SI)) or paging information, or in a case that the base station apparatus determines a need to cause a particular terminal apparatus to perform processing, for example, configuration related to security, reconfiguration of an RRC connection (processing (establishment, change, release, or the like) of the radio line bearer, processing (establishment, addition, change, release, or the like) of the cell group, measurement configuration, handover configuration, or the like), release of the RRC connected state, or the like. Additionally, the RRC message may be used for a command for handover to a different RAT. The RRC message includes information (parameters) for various information notifications and configurations. In specifications related to RRC in NPL 4, NPL 10, or the like, the above-described parameters are referred to as fields and/or information elements, and described by using a notation scheme referred to as Abstract Syntax Notation One (ASN.1).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404).

Note that the creation of the RRC message is not limited to the example described above, and may be performed for other purposes, as described in NPL 4, NPL 10, and the like.

For example, the RRC message may be used for configuration related to Dual Connectivity (DC) or Multi-Radio Dual Connectivity (MR-DC) described in NPL 8.

The Dual Connectivity (DC) may be a technology for performing data communication by using radio resources of both cell groups including a master cell group (MCG) including master nodes (MNs) and a secondary cell group (SCG) including secondary nodes (SNs), each cell group including two base station apparatuses (nodes). The master node and the secondary node may be an identical node (identical base station apparatus). Furthermore, the MR-DC described in NPL 8 may be a technology in which cells of both Radio Access Technologies (RATs) of E-UTRA and NR are formed into cell groups for each RAT, which are assigned to the UE, and in which data communication is performed by utilizing radio resources of both MCG and SCG. In the MR-DC, the master node may be a base station including primary RRC functions related to MR-DC, for example, functions to add a secondary node, to establish, change, and release an RB, to add, change, and release an MCG, and to perform handover and the like, and the secondary base station may be a base station including some RRC functions, for example, functions to change and release an SCG, and the like.

In the MR-DC described in NPL 8, the RRC corresponding to the master node side RAT may be used to configure both the MCG and the SCG. For example, in E-UTRA-NR Dual Connectivity (EN-DC) corresponding to the MR-DC in which the EPC 104 is used as a core network and the eNB 102 (also referred to as an evolved eNB 102) is used as a master node and in NG-RAN E-UTRA-NR Dual Connectivity (NGEN-DC) corresponding to the MR-DC in which the 5GC 110 is used as a core network and the eNB 102 is used as a master node, an RRC message for E-UTRA described in NPL 4 may be transmitted and received between the eNB 102 and the UE 122. In this case, the RRC message may include NR configuration information described in NPL 10 as well as LTE (E-UTRA) configuration information. Additionally, the RRC message transmitted from the eNB 102 to the UE 122 may be transmitted from the eNB 102 to the UE 122 via the gNB 108. The configuration of the present RRC message may be used in E-UTRA/5GC (option 5 described in NPL 17) corresponding to non-MR-DC in which the eNB 102 (evolved eNB) uses the 5GC as a core network.

Additionally, in contrast, in the MR-DC described in NPL 8, in NR-E-UTRA Dual Connectivity (NE-DC) corresponding to the MR-DC in which the 5GC 110 is used as a core network and the gNB 108 is used as a master node, an RRC message for NR described in NPL 10 may be transmitted and received between the gNB 108 and the UE 122. In this case, the RRC message may include LTE (E-UTRA) configuration information described in NPL 4 as well as NR configuration information. Additionally, the RRC message transmitted from the gNB 108 to the UE 122 may be transmitted from the gNB 108 to the UE 122 via the eNB 102.

Note that the embodiment is not limited to the case of utilization of the MR-DC and that the RRC message for E-UTRA transmitted from the eNB 102 to the UE 122 may include an RRC message for NR, whereas or the RRC message for NR transmitted from the gNB 108 to the UE 122 may include an RRC message for E-UTRA.

A network configuration in which the eNB 102 is used as a master node and the EPC 104 is used as a core network may be referred to as E-UTRA/EPC. Additionally, a network configuration in which the eNB 102 is used as a master node and the 5GC 110 is used as a core network may be referred to as E-UTRA/5GC. In addition, a network configuration in which the gNB 108 is used as a master node and the 5GC 110 is used as a core network may be referred to as NR or NR/5GC. Moreover, this designation need not be limited to a case where the DC is configured. in the case that the DC is not configured, the above-described master node may refer to a base station apparatus that communicates with the terminal apparatus.

FIG. 14 is an example of an ASN.1 notation expressing any or all of the fields and information elements related to a radio bearer configuration, the ASN.1 notation being included in a message related to reconfiguration of RRC connection in NR in FIG. 4. Additionally, FIG. 15 is an example of an ASN.1 notation expressing any or all of the fields and information elements related to a radio bearer configuration, the ASN.1 notation being included in a message related to reconfiguration of RRC connection in E-UTRA in FIG. 4. In examples of the ASN.1, <omitted> and <partly omitted> are not a part of the notation of the ASN.1 and indicate that other information is omitted at these positions. Note that there may also be omitted information elements in a part where neither <omitted> nor <partly omitted> is indicated. Note that the examples of ASN.1 do not correctly follow the ASN.1 notation method but represent examples parameters of a message for reconfiguration of RRC connection according to an embodiment of the present invention and that any other designation and any other notation may be used. The examples of ASN.1 are limited to examples related to main information closely associated with an aspect of the present invention in order to avoid complexity of description. Note that the parameters notated in ASN.1 may all be referred to as information elements instead of being sorted into fields, information elements, or the like. Additionally, in an embodiment of the present invention, parameters such as fields and information elements which are included in the RRC message and notated in ASN.1 may also be referred to as information. Note that the message for reconfiguration of RRC connection may be an RRC reconfiguration message in NR or may be an RRC connection reconfiguration message in E-UTRA.

In FIG. 14, the information element represented by RadioBearerConfig is an information element related to configurations of radio bearers such as SRBs or DRBs and include PDCP configuration information elements and SDAP configuration information elements to be described below. An information element represented by SRB-ToAddMod and included in the information elements represented by RadioBearerConfig may be information indicating a signaling radio bearer (SRB) configuration, and may also be referred to as an SRB configuration information element or a signaling radio bearer configuration information element. An information element represented by SRB-ToAddModList may be a list of pieces of information indicating SRB configurations. An information element represented by DRB-ToAddMod and included in the information elements represented by RadioBearerConfig may be information indicating a data radio bearer (DRB) configuration, and may also be referred to as a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element.

An information element included in the DRB configuration information elements and represented by DRB-Identity is an information of DRB identity of a DRB to be added or changed, and may be an identifier that uniquely identifies the DRB at each terminal apparatus. This information element may be replaced with a DRB identity information element, a radio bearer identity information element, or a data radio bearer identity information element. In the example illustrated in FIG. 14, the DRB identity has an integer value ranging from 1 to 32. However, the DRB identity may take another value. For DC, the DRB identity is unique within the scope of the UE 122.

An information element included in the DRB configuration information elements and represented by cnAssociation may be an information element indicating whether the EPC 104 or the 5GC 110 is used as a core network, and may also be referred to as a core network association information element. In other words, in a case that the UE 122 is connected to the EPC, the DRB may be associated with an EPS bearer identity information element (eps-BearerIdentity) in cnAssociation or with an EPS bearer identity corresponding to the value of the EPS bearer identity information element. In a case that the UE 122 is connected to the 5GC 110, the DRB may be associated with an SDAP entity configured in accordance with an SDAP configuration information element (sdap-Config) described below, or a PDU session information element described below and included in the SDAP configuration information element, or a PDU session identity corresponding to the value of the PDU session information element, or a PDU session indicated by the PDU session information element. In other words, the information represented by cnAssociation may include an EPS bearer identity information element (eps-BearerIdentity) in a case that the EPC 104 is used as a core network, such as in a case of using EN-DC, and may include an information element (sdap-Config) indicating an SDAP configuration in a case that the 5GC 110 is used as a core network, in other words, in a case of not using EN-DC.

The information element represented by sdap-Config may be information related to a configuration or reconfiguration of the SDAP entity that determines a mapping method between the QoS flow and the DRB in a case that the 5GC 110 is used as a core network, and may be replaced with an SDAP configuration information element.

A field or an information element included in the SDAP configuration information elements and represented by pdu-session or PDU-SessionID may be the PDU session identity of a PDU session described in NPL 2 and to which the QoS flow mapped to the radio bearer corresponding to the value of the radio bearer identity information element belongs, the radio bearer identity information element being included in the DRB configuration information elements including the present SDAP configuration information element, and may be replaced with a PDU session identity information element. The value of the PDU session identity information element may be an integer that is not negative. Additionally, at each of the terminal apparatuses, multiple DRB identities may correspond to one PDU session identity.

An information element included in the SDAP configuration information elements and indicated by mappedQoS-FlowsToAdd may be information indicating a list of QoS flow identity (QFI) information elements described below of QoS flows to be mapped to or additionally mapped to the radio bearer corresponding to the value of the radio bearer identity information element included in the DRB configuration information elements including the present SDAP configuration information elements, and may be replaced with an added QoS flow information element. The QoS flow described above may be a QoS flow of a PDU session indicated by the PDU session information element included in the present SDAP configuration information elements.

An information element included in the SDAP configuration information elements and indicated by mappedQoS-FlowsToRelease may be information indicating a list of QoS flow identity (QFI) information elements described below of QoS flows from which a mapping relationship is to be released and which are included in the QoS flows mapped to the radio bearer corresponding to the value of the radio bearer identity information element included in the DRB configuration information elements including the present SDAP configuration information elements, and may be replaced with a released QoS flow information element. The QoS flow described above may be a QoS flow of a PDU session indicated by the PDU session information element included in the present SDAP configuration information elements.

An information element indicated by QFI may be a QoS flow identity described in NPL 2 and uniquely identifying a QoS flow, and may be replaced with a QoS flow identity information element. The value of the QoS flow identity information element may be an integer that is not negative. The value of the QoS flow identity information element may be unique to the PDU session.

Furthermore, the SDAP configuration information elements may include, in addition to the above-described information elements, an uplink header information element indicating whether an uplink SDAP header is present in uplink data transmitted via the configured DRB, a downlink header information element indicating whether a downlink SDAP header is present in downlink data received via the configured DRB, a default bearer information element indicating whether the configured DRB is a default radio bearer (default DRB), and the like.

Information elements included in the SRB configuration information elements and the DRB configuration information elements and represented by pdcp-Config or PDCP-Config may be information elements used to establish or change the PDCP 306 for the SRB and/or the DRB and related to the configuration of an NR PDCP entity, and may be replaced with PDCP configuration information elements. The information elements related to the configuration of the NR PDCP entity include an information element indicating the size of an uplink sequence number, an information element indicating the size of a downlink sequence number, an information element indicating a profile of header compression (RObust Header Compression (RoHC)), a re-ordering timer information element, and the like.

An information element represented by DRB-ToReleaseList and included in the information elements represented by RadioBearerConfig may include information indicating one or more DRB identities to be released.

In FIG. 15, an information element represented by radioResourceConfigDedicated may be an information element used for configuration, change, release, or the like of the radio bearer. An information element represented by SRB-ToAddMod and included in the information elements represented by RadioResourceConfigDedicated may be information indicating a signaling radio bearer (SRB) configuration, and may be replaced with an SRB configuration information element or a signaling radio bearer configuration information element. An information element represented by SRB-ToAddModList may be a list of piece of information indicating SRB configurations. An information element represented by DRB-ToAddMod and included in the information elements represented by RadioResourceConfigDedicated may be information indicating a data radio bearer (DRB) configuration, and may be replaced with a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element. An information element represented by SRB-Identity in FIG. 15 may be an information element having a role identical to the role of the information element represented by SRB-Identity in FIG. 14.

An information element included in the DRB configurations and represented by DRB-Identity may be information of DRB identity of a DRB to be added or changed and may be a DRB identity uniquely identifying, at each terminal apparatus, the DRB. This information element may be replaced with a DRB identity information element, a radio bearer identity information element, or a data radio bearer identity information element. In the example illustrated in FIG. 15, the DRB Identity has an integer value ranging from 1 to 32. However, the DRB identity may take another value. The information element represented by DRB-Identity in FIG. 15 may be an information element having a role identical to the role of the information element represented by DRB-Identity in FIG. 14.

An information element included in the DRB configuration information elements and represented by eps-BearerIdentity may be an EPS bearer identity uniquely identifying an EPS bearer at each terminal apparatus. The information element represented by eps-BearerIdentity may be referred to as an EPS bearer identity information element. In the example illustrated in FIG. 15, the EPS bearer Identity has an integer value ranging from 1 to 15. However, the EPS bearer identity may take another value. The information element represented by eps-BearerIdentity in FIG. 15 may be an information element having a role identical to the role of the information element represented by eps-BearerIdentity in FIG. 14. Additionally, at each terminal apparatus, the EPS bearer identities correspond to the DRB identities on a one-to-one basis.

Additionally, an information element included in the SRB configuration information elements and the DRB configuration information elements and represented by pdcp-Config or PDCP-Config may be an information element related to the configuration of an E-UTRA PDCP entity and used to establish or change the PDCP 206 for the SRB and/or for the DRB, and may be replaced with a PDCP configuration information element. The information elements related to the configuration of the E-UTRA PDCP entity may include an information element indicating the size of the sequence number, an information element indicating the profile of header compression (RObust Header Compression (RoHC)), re-ordering timer information, and the like.

Additionally, some or all of the information elements illustrated in FIG. 14 or FIG. 15 may be optional. In other words, the information elements illustrated in FIG. 14 or FIG. 15 may be included in a message related to the reconfiguration of RRC connection depending on requirements or conditions. In addition, the message related to the reconfiguration of RRC connection may include an information element meaning that a full configuration is to be applied, in addition to an information element related to the configuration of the radio bearer. The information element meaning that the full configuration is to be applied may be represented by an information element name such as fullConfig, and true, enable, or the like may be used to indicate application of the full configuration.

An information element represented by DRB-ToReleaseList and included in the information elements represented by RadioResourceConfigDedicated may include information indicating one or more DRB identities to be released.

In the following description, the eNB 102 and/or the gNB 108 is simply referred to as a base station apparatus, and the UE 122 is also simply referred to as a terminal apparatus.

In a case that RRC connection is established, in a case that the RRC connection is re-established, or in a case of handover, one serving cell provides mobility information for the NAS. In a case that the RRC connection is re-established or in a case of handover, one serving cell provides a security input. The serving cell is referenced as a primary cell (PCell). Additionally, depending on the capability of the terminal apparatus, one or multiple serving cells (secondary cells, SCells) may be additionally configured together with the primary cell.

A set of serving cells including two subsets may be configured for the terminal apparatus. The two subsets may include a cell group (master cell group) including one or multiple serving cells including the primary cell (PCell), and one or multiple cell groups (secondary cell groups) each including one or multiple serving cells including a primary secondary cell (PSCell) and no primary cell. The primary secondary cell may be a cell configured with a PUCCH resource.

An example of operation related to radio link failure (RLF) by an RRC connected terminal apparatus will be described.

The terminal apparatus uses broadcast information and user-specific RRC messages to acquire, from a serving base station apparatus, information such as values (t310 and t313) of timers (e.g., T310 and T313) for detection of physical layer problems of the serving cell, N310 and N313 corresponding to thresholds for the number of detections of out-of-sync (OoS), and N311 and N314 corresponding to thresholds for the number of detections of in-sync (IS). Default values may be configured for the values of the timers and the threads for the numbers of times. The names of the timers may vary between the EUTRA and the NR.

For radio link monitoring, in a case of estimating that the radio link quality of the serving cell is worse than a specific threshold (Qout) over a specific period of time (e.g., TEvaluate_Qout=200 ms), based on, for example, information such as the received power of a reference signal received and/or the received power of the synchronization signal and/or the error rate of a packet, a physical layer processing unit of the terminal apparatus notifies "out-of-sync" to an RRC layer processing unit corresponding to an upper layer. In a case of estimating that the radio link quality of the serving cell exceeds a specific threshold (Qin) over a specific period of time (e.g., TEvaluate_Qin=100 ms), based on, for example, information such as the received power of the reference signal received and/or the received power of the synchronization signal and/or the error rate of the packet, the physical layer processing unit notifies the RRC layer processing unit corresponding to an upper layer of "in-sync." Note that the physical layer processing unit may notify the upper layer of out-of-sync or in-sync at specific intervals (e.g., TReport_sync=10 ms) or more.

In this regard, for example, the threshold Qout may be defined as a level at which the downlink radio link fails to be reliably received and further the block error rate of transmission of a hypothetical downlink control channel (PDCCH) based on a predefined parameter is a first specific rate. For example, the threshold Qin may be defined as a level at which the downlink radio link quality can be received significantly more reliably than in the state of Qout and further the block error rate of transmission of the hypothetical downlink control channel based on the predefined parameter is a second specific rate. Multiple block error rates (levels of the threshold Qout and the threshold Qin) may be defined based on the frequency and subcarrier spacing used, the type of service, and the like. The first specific rate and/or the second specific rate may be a predefined value defined in the specifications. The first specific rate and/or the second specific rate may be a value notified or broadcast from the base station apparatus to the terminal apparatus.

The terminal apparatus may monitor the radio link by using a certain type of reference signal (e.g., cell-specific reference signal (CRS)) in the serving cell (e.g., the PCell and/or PSCell). The terminal apparatus may receive, from the base station apparatus, a configuration indicating which reference signal is used for radio link monitoring in the serving cell (e.g., the PCell and/or PSCell) (radio link monitoring configuration: RadioLinkMonitoringConfig), and monitor the radio link by using one or multiple reference signals (referred to here as RLM-RSs). The terminal apparatus may monitor the radio link by using any other signal. The physical layer processing unit of the terminal apparatus may notify the upper layer of in-sync in a case that conditions for in-sync are satisfied in the serving cell (e.g., the PCell and/or the PSCell).

The radio link monitoring configuration may include information indicating the purpose of monitoring and identifier information indicating the reference signal. For example, the purpose of monitoring may include the purpose of monitoring radio link failure, the purpose of monitoring beam failure, both of the purposes, and the like. For example, the identifier information indicating the reference signal may include information indicating the identifier (SSB-Index) of a synchronization signal block (SSB) of the cell. That is, the reference signal may include the synchronization signal. For example, the identifier information indicating the reference signal may include information indicating an identifier linked to a channel state information reference signal (CSI-RS) configured for the terminal apparatus.

In the primary cell, in response to a predefined number of (N310) continuous receptions of out-of-sync notified from the physical layer processing unit, the RRC layer processing unit of the terminal apparatus may start or restart the timer (T310). In response to a predetermined number of (N311) continuous receptions of in-sync, the RRC layer processing unit of the terminal apparatus may stop the timer (T310). The RRC layer processing unit of the terminal apparatus may perform transition to an idle state or an RRC connection re-establishment procedure in a case that the timer (T310) expires. For example, the operation of the terminal apparatus may vary depending on an establishment state of AS Security. In a case that AS Security has not been established, the terminal apparatus transitions to the RRC IDLE state, and in a case that the AS Security has been established, the terminal apparatus may perform a procedure for re-establishing RRC connection (Re-establishment). An additional condition for determining that the timer T310 is to be started or restarted may be that none of the timer T300, the timer T301, the timer T304, and the timer T311 are running.

FIG. 9 illustrates an example of the conditions for start, stop, and expiry of each of the timers of the EUTRA. Note that similar conditions may also be applied in the NR, though the timer name and/or the message name may differ in the NR.

In the primary secondary cell, in response to a predefined number of (N313) continuous receptions of out-of-sync notified from the physical layer processing unit, the RRC layer processing unit of the terminal apparatus may start or restart the timer (T313). In response to a predefined number of (N314) continuous receptions of in-sync, the RRC layer processing unit of the terminal apparatus may stop the timer (T313). In response to expiry of the timer (T313), the RRC layer processing unit of the terminal apparatus may perform an SCG failure information procedure for notifying the network of SCG failure.

In the SpCell (the PCell in the MCG and the PSCell in the SCG), in response to a predefined number of (N310) continuous receptions of out-of-sync notified from the physical layer processing unit in each SpCell, the RRC layer processing unit of the terminal apparatus may start or restart the timer (T310) of the SpCell. In response to a predefined number of (N311) continuous receptions of in-sync in each SpCell, the RRC layer processing unit of the terminal apparatus may stop the timer (T310) for the SpCell. The RRC layer processing unit of the terminal apparatus may perform transition to the idle state or the RRC connection re-establishment procedure in a case that the SpCell is a PCell in a case that the timer (T310) for each SpCell expires. In a case that the SpCell is the PSCell, the SCG failure information procedure may be performed to notify the network of the SCG failure.

The above description is an example of a case in which discontinuous reception (DRX) is not configured for the terminal apparatus. With the DRX configured for the terminal apparatus, the RRC layer processing unit of the terminal apparatus may configure for the physical layer processing unit the period of time for measuring radio link quality and the intervals of notifications to the upper layer such that the period of time and the intervals have values different from those in the case that the DRX is not configured. Note that, even with the DRX configured, in a case that the above-described timer (T310, T313) is running, the period of time when radio link quality is measured for estimation of in-sync and the intervals of notifications to the upper layer may have values identical to those used in a case that the DRX is not configured.

For example, in order to detect an early physical layer problem, the RRC layer processing unit of the terminal apparatus may start the timer (T314) in response to a predefined number of (N310) continuous receptions of early out-of-sync notified from the physical layer processing unit. In response to a predefined number of (N311) continuous receptions of in-sync while the T314 is running, the RRC layer processing unit of the terminal apparatus may stop the timer (T314).

For example, in order to detect early improvement of the physical layer, the RRC layer processing unit of the terminal apparatus may start the timer (T315) in response to a predefined number of (N311) continuous receptions of early in-sync notified from the physical layer processing unit. In addition, in response to a predefined number of (N311) continuous receptions of in-sync while the T315 is running, the RRC layer processing unit of the terminal apparatus may stop the timer (T315).

For example, in a case that measurement is reported to the base station apparatus and that performance of first measurement is configured in measurement configurations (e.g., the measurement is performed using the timer T312), the timer T312 is started in a case that the timer T310 is running, while the timer T312 is not running. The RRC layer processing unit of the terminal apparatus may stop the timer (T312) in response to a predefined number of (N311) continuous receptions of in-sync.

The RLM-RS described above may be undefined in a case that the RLM-RS is not explicitly or implicitly configured by the network. In other words, the terminal apparatus need not monitor the radio link in a case that no RLM-RS is configured by the network (for example, the base station apparatus).

The RLM-RS is a reference signal used in monitoring the radio link, and multiple RLM-RSs may be configured for the terminal apparatus. A resource for one RLM-RS may be a resource for one SS block or one CSI-RS (or port).

Moreover, radio link monitoring using the CRS may be performed in an EUTRA cell, and radio link monitoring using the RLM-RS may be performed in an NR cell, but no such limitation is intended.

Detection of radio link failure based on radio link monitoring will be described.

The terminal apparatus determines that radio link failure has been detected in the MCG in a case that the timer T310 expires or the timer T312 expires, or in a case that a random access problem is notified from the MAC layer of the MCG while none of the multiple specific timers are running, in a case that the RLC layer of the MCG has notified the terminal apparatus that the number of retransmissions of the SRB or the DRB has reached the maximum number of retransmissions. The specific timers do not include the timer T310 or the timer T312.

The upper layer (in this regard, the RRC entity) may be notified of the random access problem from the MAC entity of the cell group including an SpCell in a case that at the MAC entity, the number of retransmissions of a random access preamble has reached a predefined number and that the random access preamble is transmitted in the SpCell.

In response to determining that radio link failure is detected in the MCG, the terminal apparatus stores various information as radio link failure information. In a case that the security of the AS has not been activated, processing for leaving RRC_CONNECTED is initiated with "other" configured as the reason for release. In a case that the AS security has been activated, the RRC connection re-establishment procedure is initiated.

In a case that the timer T313 expires, in a case that a random access problem is notified from the MAC layer of the SCG, or in a case that the RLC layer of the SCG has notified the terminal apparatus that the number of retransmissions has reached the maximum number of retransmissions, the terminal apparatus determines that radio link failure has been detected in the SCG, and initiates processing for reporting, to the base station apparatus, information related to the SCG radio link failure.

In a case that the timer T314 expires, the terminal apparatus determines that an "early out-of-sync" event has been detected and initiates processing for reporting related information to the base station apparatus.

In a case that the timer T315 expires, the terminal apparatus determines that an "early in-sync" event has been detected, and initiates processing for reporting related information to the base station apparatus.

The RRC connection re-establishment procedure will be described.

The purpose of the RRC connection re-establishment procedure is to re-establish RRC connection, and the procedure may involve a procedure for resuming SRB1, reactivation of security, and configuration of only the PCell.

The RRC connection re-establishment procedure may be initiated in a case that any of conditions (A) to (E) below is satisfied.
  (A) In response to detection of radio link failure in the MCG
  (B) In response to handover failure (in the NR, in response to failure in Reconfiguration With Sync in the MCG)
  (C) In response to failure in mobility to another RAT
  (D) In response to notification, from the lower layer, of failure in integrity check related to SRB1 or SRB2
  (E) In response to failure in RRC connection reconfiguration In response to initiation of the RRC connection re-establishment procedure, the terminal apparatus performs some or all of steps of processing (A) to (J) below.
  (A) With the timer T310 running, the timer T310 is stopped.
  (B) With the timer T312 running, the timer T312 is stopped.
  (C) With the timer T313 running, the timer T313 is stopped.

(C) With the timer T314 running, the timer T314 is stopped.
(D) The timer T311 is started.
(E) All the RBs other than SRB0 are suspended.
(F) The MAC is reset.
(G) In a case that the SCell of the MCG is configured, the SCell of the MCG is released.
(H) The default physical channel configuration is applied.
(I) A default MAC main configuration is applied to the MCG.
(J) The cell selection procedure is performed.

In response to selection of an optimal cell of an identical RAT by the cell selection procedure, the terminal apparatus performs the following processing.

In a case that the terminal apparatus is connected to the 5GC and that the cell selected can be connected only to the EPC or in a case that the terminal apparatus is connected to the EPC and that the cell selected can be connected only to the 5GC, the terminal apparatus performs an action for leaving RRC_CONNECTED with "RRC connection failure" configured as a reason for release. Otherwise, the terminal apparatus stops the timer T311, starts the timer T301, and initiates transmission of an RRC connection re-establishment request (ReestablishmentRequest) message.

In a case that the timer T311 expires, the terminal apparatus performs the action for leaving RRC_CONNECTED with "RRC connection failure" configured as a reason for failure.

In a case that the timer T301 expires or in a case that the cell selected is no longer the optimal cell in terms of cell selection criterion, the terminal apparatus performs the action for leaving RRC_CONNECTED with "RRC connection failure" configured as a reason for failure.

Handover will be described.

Figure 7:
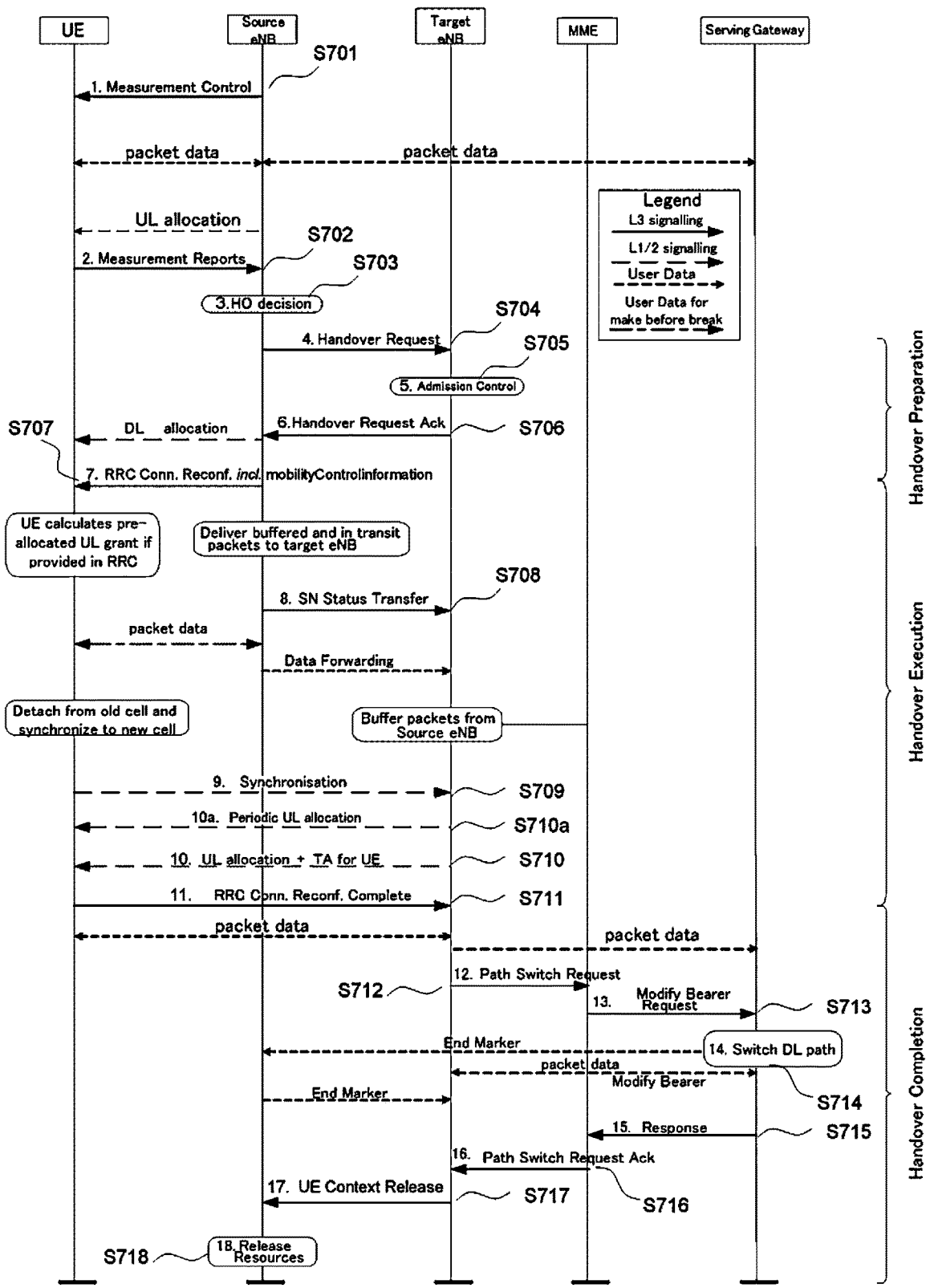
FIG. 7 is an example of processing related to handover in EUTRA according to each embodiment of the present invention.

An example of processing related to handover in the EUTRA between the same RATs (i.e., between the EUTRAs) will be described using FIG. 7. The description using FIG. 7 is an example, and the processing may partly be omitted or include another processing. Alternatively, another processing may be performed as processing related to handover.

In FIG. 7, a base station apparatus used as a handover source (source eNB) configures the terminal apparatus with measurement of neighbor cells (step S701).

The terminal apparatus performs the measurement configured by the Source eNB, and reports measurement results to the Source eNB, based on reporting conditions (step S702).

The Source eNB determines handoff of the terminal apparatus, based on information such as the measurement results reported (step S703).

The Source eNB issues a handover request message including information required to prepare for the handover, to a base station apparatus used as a handover destination (Target eNB) (step S704).

Admission control may be performed in the Target eNB. The Target eNB configures the required resources. (step S705).

The Target eNB sends a HANDOVER REQUEST ACKNOWLEDGE message to the Source eNB (step S706). The HANDOVER REQUEST ACKNOWLEDGE message includes, as an RRC message for performance of handover, a container transmitted transparently to the terminal apparatus. The container may include some or all of a new C-RNTI, a security algorithm identity of the Target eNB for a selected security algorithm, a preamble of a dedicated random access channel (random access preamble), system information of the target cell, and the like.

The Source eNB may send the terminal apparatus a first RRC connection reconfiguration message (RRCConnectionReconfiguration message) including a container (mobility control information (mobilityControlInfo)) information element (IE) received from the target eNB (step S707).

Note that in a case that make before break handover (Make-Before-Break HO (MBB-HO)) is configured by the first RRC connection reconfiguration message, the terminal apparatus receives the first RRC connection reconfiguration message and then maintains connection with the Source eNB at least until the Target eNB performs the first uplink transmission. Note that the make before break handover may be selected from multiple configurations. For example, configuration of true in a field makeBeforeBreak-r14 included in a mobilityControlInfo information element already specified may allow determination that make before break handover to is configured. For example, in a case that makeBeforeBreak-r16 to be newly defined is included in the field of the mobilityControlInfo information element and that true is configured in makeBeforeBreak-r16, determination that make before break handover is configured. The field makeBeforeBreak-r16 may include, as values, information elements including various configurations.

The Source eNB sends the Target eNB an SN STATUS TRANSFER message for communicating (Conveying) the reception state of the sequence number of the uplink PDCP and the transmission state of the sequence number of the downlink PDCP (step S708).

In a case that RACH-less handover is not configured by the first RRC connection reconfiguration message, the terminal apparatus performs synchronization with the Target eNB and uses a random access channel to access the cell used as a target. At this time, in a case that a dedicated random access preamble is indicated by the first RRC connection reconfiguration message, the terminal apparatus performs a contention-free random access procedure. In a case that no dedicated random access preamble is indicated, the terminal apparatus performs a contention-based random access procedure. In a case that RACH-less handover is configured by the first RRC connection reconfiguration message, the terminal apparatus performs synchronization with the Target eNB (step S709).

In a case that no RACH-less handover is configured by the first RRC connection reconfiguration message, the Target eNB returns information of uplink allocation and timing advance to the terminal apparatus (step S710).

In a case that RACH-less handover is configured by the first RRC connection reconfiguration message and that periodic pre-allocated uplink grant has failed to be acquired by the first RRC connection reconfiguration message, the terminal apparatus receives the uplink grant by the PDCCH of the target cell. The terminal apparatus uses the first available uplink grant after synchronization with the target cell (step S710a).

With RACH-less handover not configured, in a case that the terminal apparatus successfully accesses the target cell, the terminal apparatus sends an RRC connection reconfiguration complete message (RRCConnectionReconfigurationComplete message) to the Target eNB to confirm handover. This RRC connection reconfiguration complete message indicates completion of a handover procedure of the terminal apparatus. The RRC connection reconfiguration complete message includes a C-RNTI, and the Target eNB verifies the C-RNTI of the RRC connection reconfiguration complete message received.

In a case that RACH-less handover is configured and that the terminal apparatus receives the uplink grant, the terminal apparatus sends the RRC connection reconfiguration complete message (RRCConnectionReconfigurationComplete message) to the Target eNB to confirm handover. The RRC connection reconfiguration complete message includes a C-RNTI, and the Target eNB verifies the C-RNTI of the RRC connection reconfiguration complete message received. In a case that the terminal apparatus receives a UE contention resolution identity MAC control element from the Target eNB, the handover procedure of the terminal apparatus completes (step S711).

The Target eNB sends a PATH SWITCH REQUEST message to the MME to notify the MME that the terminal apparatus has changed the cell (step S712).

The MME sends a MODIFY BEARER REQUEST message to a serving gateway (S-GW) (step S713).

The S-GW switches a downlink data path to the target side. The S-GW sends one or multiple end marker packets to the Source eNB and releases user plane resources to the Source eNB (step S714).

The S-GW sends a MODIFY BEARER RESPONSE message to the MME (step S715).

The MME checks the path switch request by using the PATH SWITCH REQUEST ACKNOWLEDGE message (step S716).

The Target eNB sends a UE CONTEXT RELEASE message to the Source eNB to indicate the success of handover, triggering release of resources by the Source eNB. The Target eNB may send this message after receiving the path switch request acknowledge message (step S717).

In response to receiving a UE context release message, the Source eNB can release resources associated with radio and a C-plane related to the UE context. Data forwarding in performance may be continued (step S718).

In a case that the timer T304 expires, the terminal apparatus performs some or all of steps of processing (A) to (D) below.
  (A) Consider the configuration of the dedicated random access channel to be unavailable, the dedicated random access channel being configured by the first RRC connection reconfiguration message.
  (B) Change the configurations for the terminal apparatus back to the configurations used in the PCell of the handover source, except for the configuration of the dedicated physical channel, the main configuration of the MAC layer, and the configuration of a semi-persistent schedule.
  (C) Store related information as handover failure information.
  (D) Initiate the RRC connection re-establishment procedure and terminate the RRC connection reconfiguration procedure.

Details of processing performed by the terminal apparatus in response to receiving the first RRC connection reconfiguration message will be described. The first RRC connection reconfiguration message may include a mobility control information (mobilityControlInfo) information element. The mobilityControlInfo information element includes parameters related to the mobility of network control from another RAT to the EUTRA or within the EUTRA (e.g., information of the identifier of the target cell and a carrier frequency).

In a case that the terminal apparatus receives the RRC connection reconfiguration message including the mobility-ControlInfo information element (first RRC connection reconfiguration message) and can satisfy the configuration in the message, the terminal apparatus performs some or all of steps of processing (A) to (G) below.
  (A) With the timer T310 running, the timer T310 is stopped.
  (B) With the timer T312 running, the timer T312 is stopped.
  (C) With the timer T314 running, the timer T314 is stopped.
  (D) The timer T304 is started at a value (t304) included in the mobilityControlInfo information element
  (E) In a case that the information of the carrier frequency is included, the frequency is determined to be the frequency of the target cell. In a case that the information of the carrier frequency is not included, the frequency of the source PCell is determined to be the frequency of the target cell.
  (F) In a case that a timer for which access is restricted is running, the timer is stopped.
  (G) Downlink synchronization with the target cell is initiated.

Figure 8:
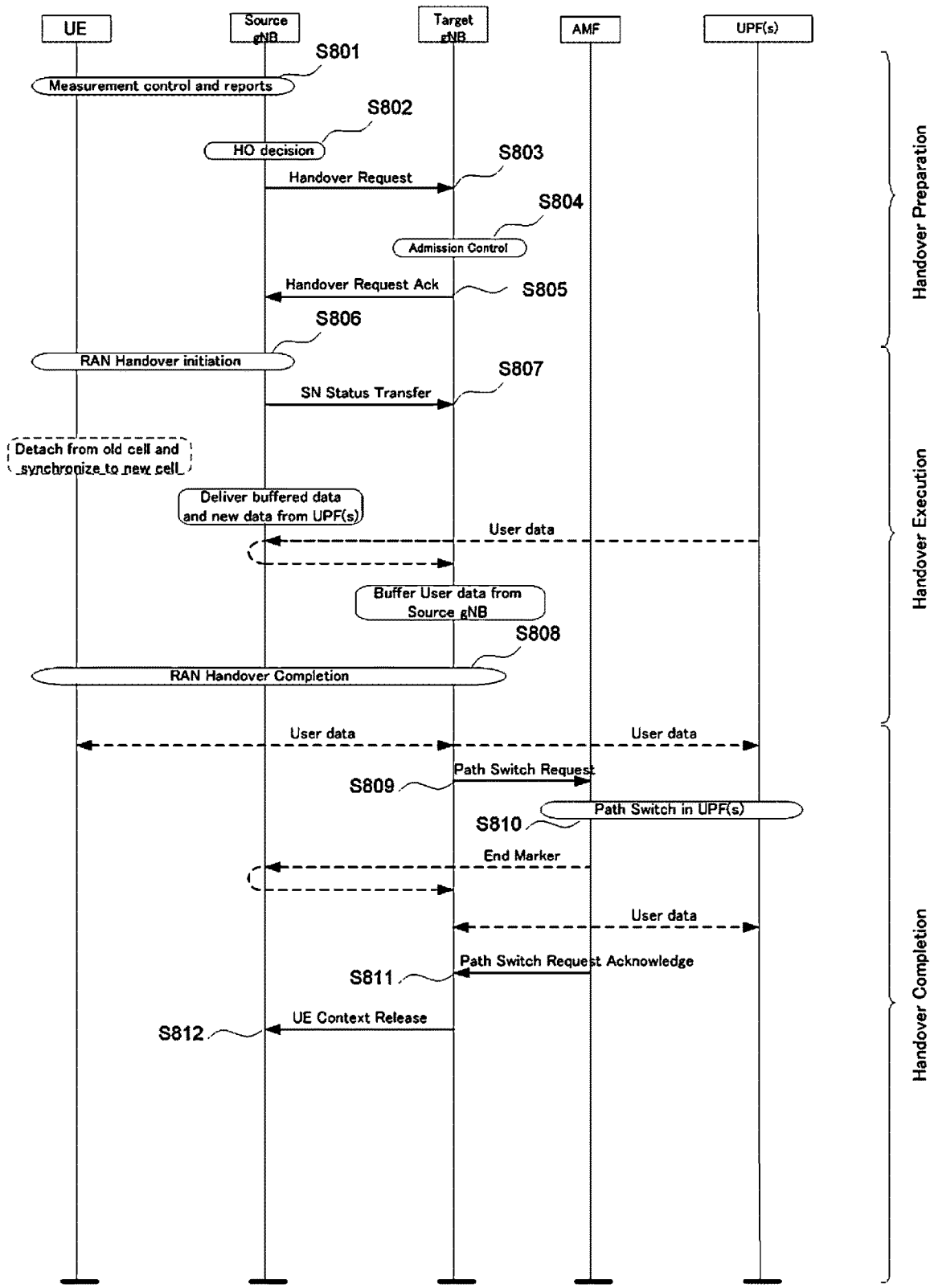
FIG. 8 is an example of processing related to handover in NR according to each embodiment of the present invention.
Figure 16:
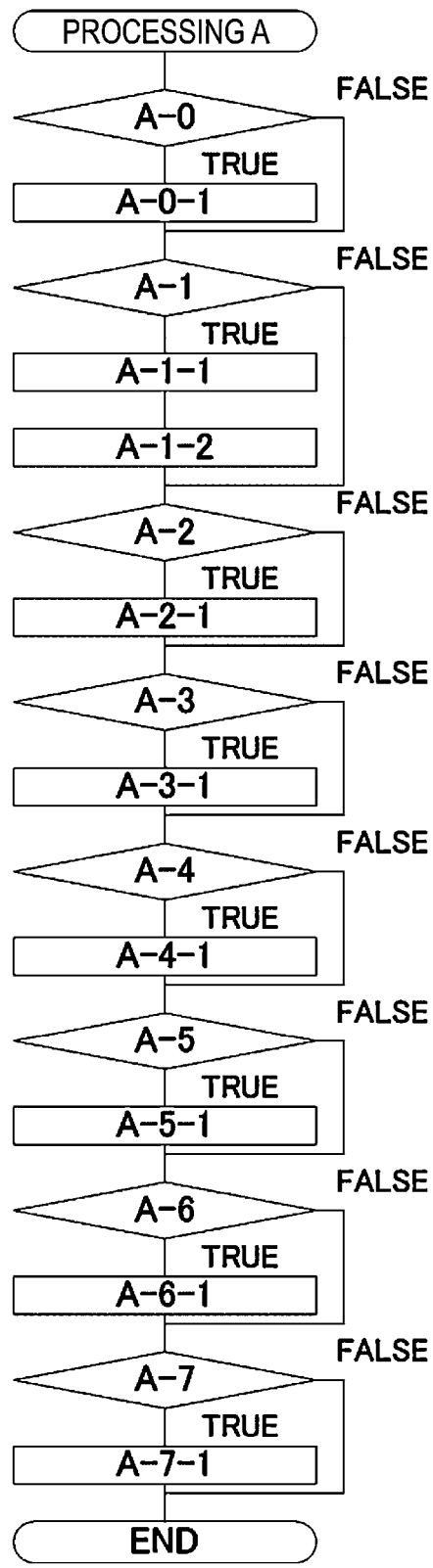
FIG. 16 is a diagram illustrating an example of a flow of processing A according to an embodiment of the present invention.
Figure 17:
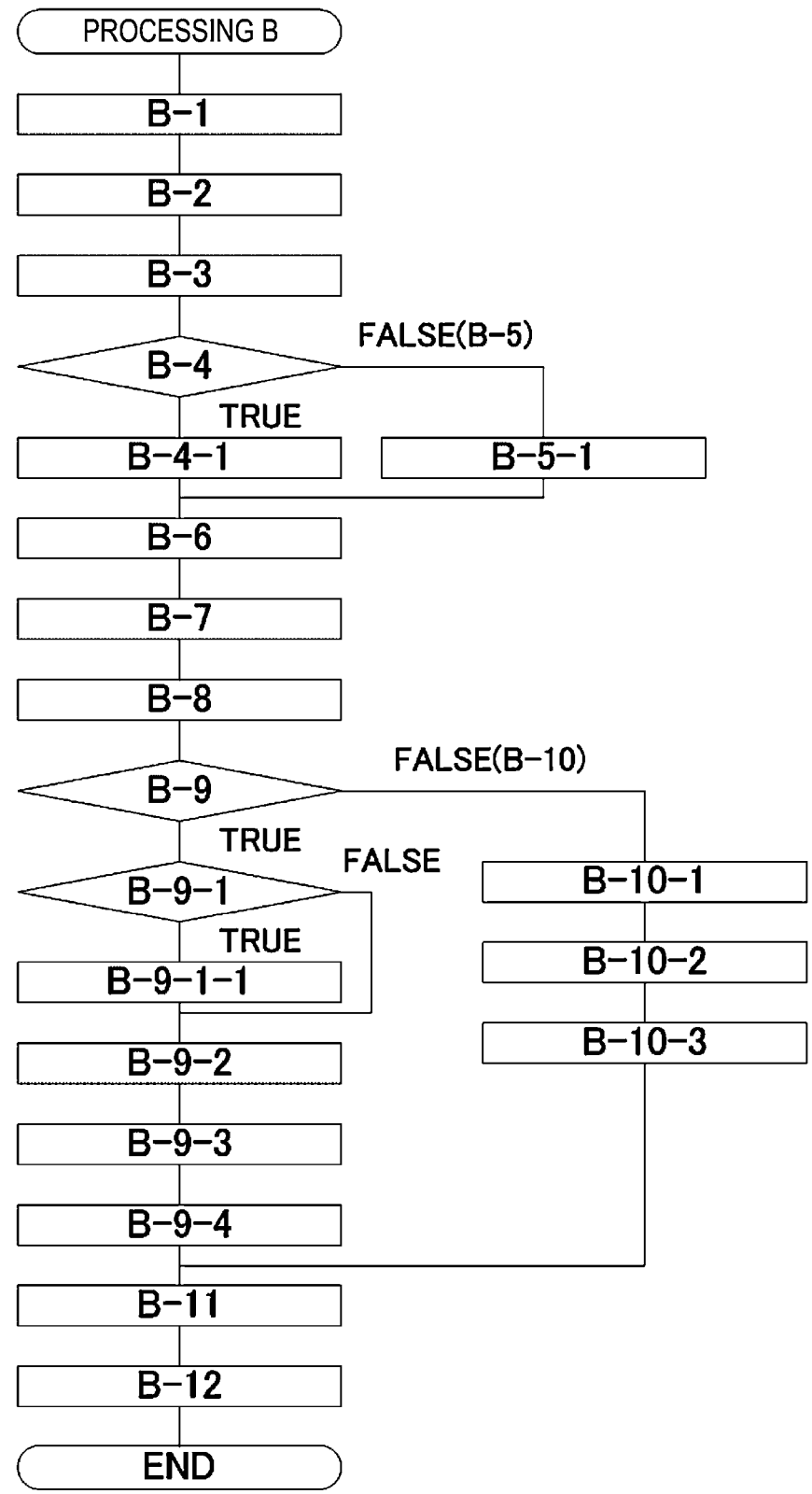
FIG. 17 is a diagram illustrating an example of a flow of processing B according to an embodiment of the present invention.
Figure 18:
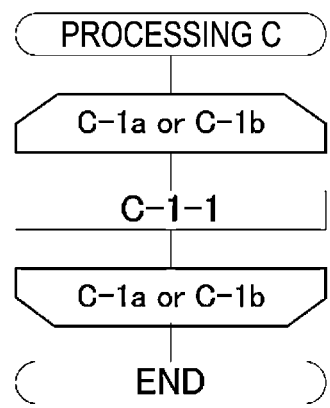
FIG. 18 is a diagram illustrating an example of a flow of processing C according to an embodiment of the present invention.
Figure 19:
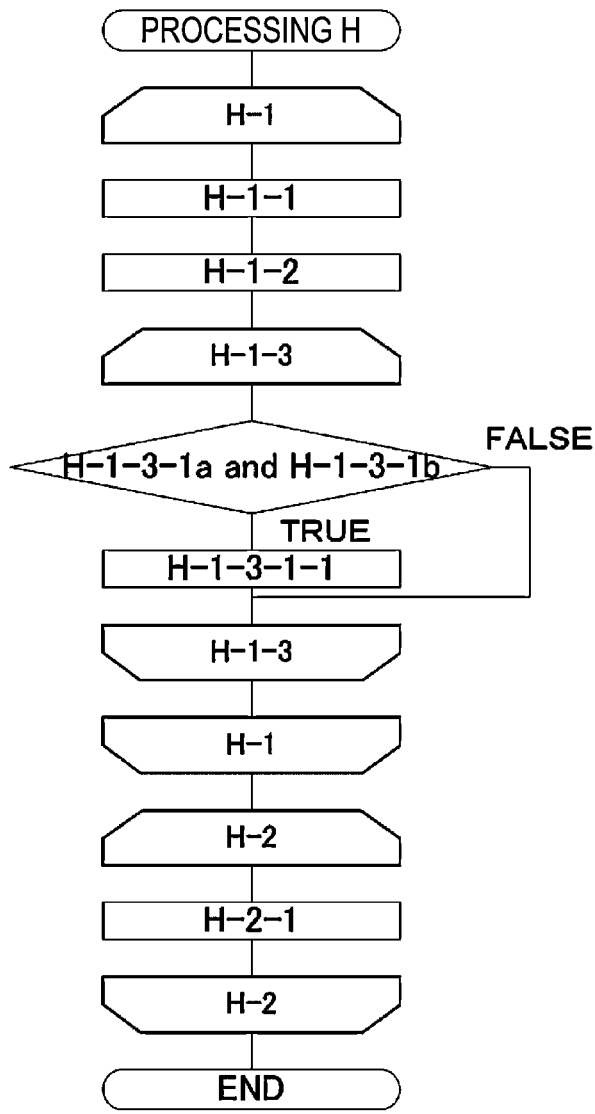
FIG. 19 is a diagram illustrating an example of a flow of processing H according to an embodiment of the present invention.

An example of processing related to handover between the same RATs (i.e., between the NRs) in NR will be described using FIG. 8. The description using FIG. 8 is an example, and the processing may partly be omitted or include another processing. Alternatively, another processing may be performed as processing related to handover.

In FIG. 8, the base station apparatus used as a handover source (Source gNB) configures the terminal apparatus with measurement of neighbor cells, and the terminal apparatus performs the measurement configured by the Source gNB and reports measurement results to the Source gNB (step S801).

The Source gNB determines handoff of the terminal apparatus, based on information such as the measurement results reported (step S802).

The Source gNB issues a handover request message including information required to prepare for handover, to a base station apparatus used as a handover destination (Target gNB) (step S803).

Admission control may be performed in the Target gNB (step S804).

The Target gNB prepares for handover and sends the Source gNB the HANDOVER REQUEST ACKNOWLEDGE message to the Source eNB (step S805). The HANDOVER REQUEST ACKNOWLEDGE message includes, as an RRC message for performance of handover, a container transmitted transparently to the terminal apparatus.

The Source gNB sends the terminal apparatus the container received from the Target gNB (the first RRC reconfiguration message (RRCReconfiguration message)) (step S806). The RRC reconfiguration message may include some or all of the identifier of the target cell, a new C-RNTI, the security algorithm identity of the Target gNB for a selected security algorithm, a set of resources for the dedicated random access channel, the configuration of a UE-specific CSI-RS, common random access channel resources, and the system information of the target cell.

Note that in a case that make before break handover (Make-Before-Break HO (MBB-HO)) is configured by the first RRC reconfiguration message, the terminal apparatus may maintain connection with the Source gNB from reception of the first RRC reconfiguration message at least until the Target gNB performs the first uplink transmission.

The Source eNB sends the Target gNB the SN STATUS TRANSFER message for communicating (conveying) the reception state of the sequence number of the uplink PDCP and the transmission state of the sequence number of the downlink PDCP (step S807).

In a case that no RACH-less handover is configured by the first RRC reconfiguration message, the terminal apparatus performs synchronization with the Target eNB and uses the random access channel to access the cell used as a target. At this time, in a case that a dedicated random access preamble is indicated by the first RRC reconfiguration message, the terminal apparatus may perform the contention-free random access procedure. In a case that no dedicated random access preamble is indicated by the first RRC reconfiguration message, the terminal apparatus may perform the contention-based random access procedure. In a case that RACH-less handover is configured by the first RRC reconfiguration message, the terminal apparatus performs synchronization with the Target gNB.

In a case that no RACH-less handover is configured by the first RRC reconfiguration message, the Target gNB may return information of uplink allocation and timing advance to the terminal apparatus.

In a case that RACH-less handover is configured by the first RRC reconfiguration message and that periodic pre-allocated uplink grant has failed to be acquired by the first RRC reconfiguration message, the terminal apparatus receives the uplink grant by the PDCCH of the target cell. The terminal apparatus uses the first available uplink grant after synchronization with the target cell.

With RACH-less handover not configured, in a case that the terminal apparatus successfully accesses the target cell, the terminal apparatus may send the RRC reconfiguration complete message (RRCReconfigurationComplete message) to the Target gNB to confirm handover. The RRC reconfiguration complete message may indicate completion of the handover procedure of the terminal apparatus. The RRC reconfiguration complete message includes the C-RNTI, and the Target gNB may verify the C-RNTI of the RRC reconfiguration complete message received.

In a case that the RACH-less handover is configured and that the terminal apparatus receives the uplink grant, the terminal apparatus may send an RRC reconfiguration complete (RRCReconfigurationComplete) message to the Target gNB to confirm handover. The RRC reconfiguration complete message includes the C-RNTI, and the Target gNB may verify the C-RNTI of the RRC reconfiguration complete message received. In a case that the terminal apparatus receives the UE contention resolution identity MAC control element from the Target gNB, the handover procedure of the terminal apparatus may complete (step S808).

The Target eNB sends the PATH SWITCH REQUEST message to the AMF to cause the 5GC to switch the downlink data path to the Target gNB to establish an NG-C interface instance for the Target gNB (step S809).

The 5GC switches the downlink data path to the Target gNB. UPF sends one or multiple end marker packets to the Source eNB to release the user plane resources for the Source gNB (step S810).

The AMF checks the path switch request by using the PATH SWITCH REQUEST ACKNOWLEDGE message (step S811).

The Target gNB sends the UE CONTEXT RELEASE message to the Source eNB to indicate the success of handover, triggering release of resources by the Source gNB. The Target gNB may send this message after receiving the path switch request acknowledge message from the AMF. In response to receiving the UE context release message, the Source gNB can release resources associated with the radio and C-plane related to the UE context. The data forwarding in performance may be continued (step S812).

In a case that the timer T304 expires, the terminal apparatus performs some or all of steps of processing (A) to (D) below.
- (A) In response to expiry of the timer T304 of the MCG, the configuration of the dedicated random access channel of the MCG configured by the first RRC connection reconfiguration message is released.
- (B) In response to expiry of the timer T304 of the MCG, the configurations for the terminal apparatus are changed back to the configurations used in the PCell of the handover source.
- (D) In response to expiry of the timer T304 of the MCG, the RRC connection re-establishment procedure is initiated.
- (E) In response to expiry of the timer T304 of the SCG, the configuration of the dedicated random access channel of the SCG configured by the first RRC connection reconfiguration message is released
- (E) In response to expiry of the timer T304 of the SCG, the procedure for reporting failure in Reconfiguration With Sync in the SCG is initiated.

Details of processing performed by the terminal apparatus in response to receiving the first RRC reconfiguration message will be described. The first RRC reconfiguration message may include a Reconfiguration With Sync (reconfigurationWithSync) information element. The reconfigurationWithSync information element may be included in the configuration of the SpCell for each cell group (MCG or SCG) in the RRC reconfiguration message. The reconfigurationWithSync information element includes parameters related to reconfigurationWithSync with the target SpCell (e.g., the configuration of the target SpCell, a new identifier for the terminal apparatus, and the like).

In response to receiving the RRC reconfiguration message including the reconfigurationWithSync information element (first RRC reconfiguration message), the terminal apparatus performs some or all of steps of processing (A) to (E) below.
- (A) In a case that security has not been activated, the processing for leaving RRC_CONNECTED is initiated with "other" configured as a reason for release. The processing for leaving the RRC_CONNECTED may be processing for heading for the RRC_IDLE.
- (B) With the timer T310 of the target SpCell running, the timer T310 of the target SpCell is stopped.
- (C) The timer T304 of the target SpCell is started at a value (t304) included in the reconfigurationWithSync information element
- (D) In a case that the information of the downlink frequency is included, the frequency is determined to be the frequency of SSB of the target cell. In a case that the information of the downlink frequency is not included, the frequency of SSB of the source SPCell is determined to be the frequency of SSB of the target cell.
- (E) Downlink synchronization with the target cell is initiated.

As described above, in the EUTRA and/or NR, in a case of being configured with make before break handover (Make-Before-Break HO (MBB-HO)), the terminal apparatus maintains connection with the Source eNB or the Source gNB until the Target eNB or the Target gNB performs the first uplink transmission. At present, the timer T310 is stopped in response to reception of the first RRC connection reconfiguration message or the first RRC reconfiguration message. Thus, in the subsequent Source eNB or the serving cell (source cell) of the Source gNB, the terminal apparatus fails to determine whether the situation is considered to be a radio link failure caused by a physical layer problem. With the timer T304 running, in the Source eNB or the serving cell (source cell) of the Source gNB, the terminal apparatus fails to determine whether the situation is considered to be radio link failure caused by a random access problem notified from the MAC layer. In the source cell, in a case that the number of retransmissions based on RLC reaches the maximum number, this is considered to be radio link failure, and the RRC connection re-establishment procedure is performed.

Now, conditional handover will be described. In the NR, conditional handover may be an RRC reconfiguration using an RRC reconfiguration message including an information element (conditional handover configuration) including information included in the Reconfiguration With Sync information element and information indicating a condition for applying the information element (conditional handover condition). In the LTE, conditional handover may be an RRC connection reconfiguration using an RRC connection reconfiguration message including an information element (conditional handover configuration) including information included in the mobility control information element and information indicating a condition for applying the information element (conditional handover condition).

In the NR, the conditional handover configuration may include some or all of configurations (A) to (F) below.
  (A) Configuration information of the cell group (Cell-GroupConfig)
  (B) Information indicating whether a full configuration has been provided.
  (C) NAS layer message
  (D) System information
  (E) Measurement configuration
  (F) Configuration of the radio bearer The configuration information of the cell group may include some or all of configurations (1) to (6) below.
  (1) Identifier of the cell group
  (2) Information of the RLC bearer
  (3) Configuration information of MAC layer of the cell group
  (4) Configuration information of physical (PHY) layer of the cell group
  (5) Configuration information of the SpCell (the information may include the Reconfiguration With Sync information element)
  (6) Information of the SCell The configuration of the radio bearer may include some or all of the configurations (1) to (3) below.
  (1) SRB configuration
  (2) DRB configuration
  (3) Security configuration (for example, information related to an integrity protection algorithm and a ciphering algorithm for the SRB and/or the DRB (securityAlgorithmConfig), information (keyToUse) indicating which key of the master (MCG) and the secondary (SCG) is to be used, and the like)

In the LTE, the conditional handover configuration may include some or all of configurations (A) to (E) below.
  (A) Measurement configuration
  (B) Mobility control information element
  (C) NAS layer message
  (D) Radio resource configuration
  (E) Security configuration (e.g., information related to the integrity protection algorithm and the ciphering algorithm for the SRB and/or the DRB (SecurityAlgorithmConfig))

The above-described radio resource configuration may include some or all of configurations (1) to (4) below.
  (1) SRB information
  (2) DRB information
  (3) Configuration information of MAC layer of the cell group
  (4) Configuration information of physical (PHY) layer of the cell group In the LTE and/or NR, the conditional handover condition may include some or all of conditions (A) to (D) below.
  (A) The cell of the handover destination (target) has become better than the current (source) PCell with an offset
  (B) The cell of the handover destination (target) has become better than a certain threshold, and the PCell has become worse than another threshold.
  (C) The cell of the handover destination (target) has become better than a certain threshold
  (D) No condition (handover is performed immediately)

For comparison under the conditional handover conditions described above, RSRP, RSRQ, and/or RS-SINR may be used as quantities. Which of the quantities is used may be configured by the network. Information indicating which quantity is to be used may be included in the conditional handover condition.

The information element indicating the conditional handover configuration and/or the conditional handover condition may be included as part of the RRC message at the handover source, or may be stored in the container (information element that stores a bit sequence) included in the RRC message.

Various embodiments of the present invention will be described based on the foregoing description. Note that, for each of the steps of processing omitted in the following description, each of the steps of processing described above may be applied.

An example will be described in which MBB-HO is efficiently performed by changing the procedure related to radio link monitoring in MBB-HO.

First, in the primary cell (PCell) corresponding to the SpCell of the MCG, under a specific condition (first condition), regardless of whether the timer T304 is running, the RRC layer processing unit of the UE 122 may start or restart the timer (T310) in response to a predefined number of (N310) continuous receptions of out-of-sync notified from the physical layer processing unit. The RRC layer processing unit of the UE 122 may stop the timer (T310) in response to a predetermined number of (N311) continuous receptions of in-sync. An additional condition for determining that the timer T310 is to be started or restarted may be that none of the timer T300, the timer T301, and the timer T311 are running.

The RRC layer processing unit of the UE 122 determines that radio link failure has been detected in the MCG in response to satisfaction of any of the conditions (A) to (E) below.
  (A) In response to expiry of the timer T310
  (B) In response to expiry of the timer T312
  (C) In response to reception of a notification (indication) of a random access problem from the MAC entity of the MCG while none of the timer T300, the timer T301, the timer T304, and the timer T311 are running (D) In response to reception of a notification of a random access problem from the MAC entity of the MCG in a case that the first condition is satisfied and while the timer T304 is running (E) In response to reception, from the RLC layer of the MCG, of a notification indicating that the number of retransmissions of the SRB or the DRB has reached the maximum number of retransmissions The first condition may be that makeBeforeBreak-r16 is configured for the UE 122. The configuration of makeBeforeBreak-r16 may correspond to, for example, in a case of the EUTRA, the reception, by the UE 122, of the RRC connection reconfiguration message in which makeBeforeBreak-r16 is included in a field of the mobilityControlInfo information element. The configuration of makeBeforeBreak-r16 may correspond to, for example, in a case of the NR, the reception of the RRC reconfiguration message in which the makeBeforeBreak-r16 is included in a field of the Reconfiguration With Sync information element. The non-configuration of makeBeforeBreak-r16 may correspond to, for example, in a case of the EUTRA, the reception, by the UE 122, of the RRC connection reconfiguration message in which makeBeforeBreak-r16 is not included in any field of the mobilityControlInfo information element. Additionally, makeBeforeBreak-r16 not being configured may correspond to, for example, in a case of the EUTRA, the reception, by the UE 122, of the RRC connection reconfiguration message including makeBeforeBreak-r16 having a value of false. The makeBeforeBreak-r16 not being configured may correspond to, for example, in a case of the NR, the reception of the RRC reconfiguration message in which makeBeforeBreak-r16 is not included in any field of the Reconfiguration With Sync information element.

The configuration of makeBeforeBreak-r16 may correspond to, for example, in a case of the EUTRA, the reception, by the UE 122, of the RRC connection reconfiguration message in which makeBeforeBreak-r16 is included in a terminal apparatus-specific radio resource configuration (radioBearerConfigDedicated) information element. The configuration of makeBeforeBreak-r16 may correspond to, for example, in a case of the NR, the reception of the RRC reconfiguration message in which the makeBeforeBreak-r16 is included in a field of the data radio bearer configuration information element.

makeBeforeBreak-r16 may have, for example, an enumerated type value including true, or may have, as a value, an information element including information required for make before break handover.

Furthermore, the condition (E) described above may be (E2) below.

(E2) In response to reception, from the RLC layer of the MCG, of a notification indicating that the number of retransmissions of the SRB or the DRB has reached the maximum number of retransmissions while none of the timer T300, the timer T301, the timer T304, and the timer T311 are running, or in response to reception, from the RLC layer of the MCG, of a notification indicating that the number of retransmissions of the SRB or the DRB has reached the maximum number of retransmissions, in a case that the first condition is satisfied and while the timer T304 is running.

In response to determining that radio link failure has been detected in the MCG, the UE 122 stores various pieces of information as radio link failure information. In a case that the AS security has not been activated, the processing for leaving RRC_CONNECTED may be initiated with "Other" configured as a reason for release.

In a case that the AS security has been activated and that the first condition is satisfied, part or all of transmission of the SRB and/or DRB in the MCG may be suspended, and the MAC entity of the MCG may be reset.

In a case that the AS security has been activated and that the first condition is not satisfied, the RRC connection re-establishment procedure may be initiated.

The RRC connection re-establishment procedure may be initiated in a case that any of conditions (A) to (E) below is satisfied.

(A) In response to detection of radio link failure in the MCG in a case that the first condition is not satisfied (B) In response to handover failure (in the NR, in response to failure in Reconfiguration With Sync in the MCG)

(C) In response to failure in mobility to another RAT (D) In response to notification, from the lower layer, of failure in integrity check related to SRB1 or SRB2

(E) In response to failure in RRC connection reconfiguration

In a case that any of the above-described conditions has been satisfied, that the first condition is satisfied, and that the MCG used as a handover source has not detected radio link failure, then the RRC connection re-establishment procedure is not initiated, and the procedure in which the MCG used as a handover source notifies handover failure may be initiated.

In a case that the first condition is that makeBeforeBreak-r16 is configured for the UE 122, makeBeforeBreak-r16 configured may be released in a case that the timer T304 expires or that the procedure in which the MCG used as a handover source notifies handover failure is initiated.

In response to initiation of the RRC connection re-establishment procedure, the UE 122 performs some or all of steps of processing (A) to (J) below.

(A) With the timer T310 running, the timer T310 is stopped.

(B) With the timer T312 running, the timer T312 is stopped.

(C) With the timer T313 running, the timer T313 is stopped.

(C) With the timer T314 running, the timer T314 is stopped.

(D) The timer T311 is started.

(E) All the RBs other than SRB0 are suspended.

(F) The MAC is reset.

(G) In a case that the SCell of the MCG is configured, the SCell of the MCG is released.

(H) The default physical channel configuration is applied.

(I) The default main configuration of the MAC is applied to the MCG (J) The cell selection procedure is performed.

Next, a case has been studied in which, in the handover processing, after transmitting the RRC connection reconfiguration complete message or the RRC reconfiguration complete message to the target cell, the UE 122 transmits and/or receives data via a cell group of both the MCG resulting from handover (also referred to as the Target MCG or Current MCG) and the MCG used as a handover source (Source MCG) (a case of operation in a Dual protocol stack). An example of the processing in that case will be described. Note that the following processing is not limited to the case of the Dual protocol stack, and may be applied in other cases.

First, in the primary cell used as the SpCell of the Source MCG, under a particular condition (first condition), the RRC layer processing unit of the UE 122 may start or restart the timer (T310) for the Source MCG in response to a predetermined number of (N310) receptions of out-of-sync notified from the physical layer processing unit of the Source MCG, regardless of whether the timer T304 for the Source MCG is running. The RRC layer processing unit of the UE 122 may stop the timer (T310) in a case that the RRC layer processing unit of the UE 122 continuously receives in-sync a predetermined number of times (N311 times) from the physical layer processing unit of the Source MCG. An additional condition for determining to start or restart the timer T310 may be that none of the Source MCG timer T300, the Source MCG timer T301, and the Source MCG timer T311 are running.

In response to satisfaction of any of conditions (A) to (E) below, the RRC layer processing unit of the UE 122 determines that radio link failure has been detected in the Source MCG.

(A) In response to expiry of the Source MCG timer T310

(B) In response to expiry of the Source MCG timer T312

(C) In response to reception of a notification (indication) of a random access problem from the MAC entity of the Source MCG in a case that none of the timer T300, the timer T301, the timer T304, and the timer T311 for the Source MCG are running (D) In response to reception of notification of a random access problem from the MAC entity of the Source MCG in a case that the first condition is satisfied and that Source MCG timer T304 is running (E) In response to reception, from the RLC layer of the Source MCG, of a notification indicating that the number of retransmissions of the SRB or DRB has reached the maximum number of retransmissions.

The first condition may be that makeBeforeBreak-r16 is configured for the UE 122.

The first condition may be that either makeBeforeBreak-r14 or makeBeforeBreak-r16 is configured for the UE 122.

Furthermore, the condition (E) described above may be (E2) below.

(E2) In response to reception, from the RLC layer of the Source MCG, of a notification indicating that the number of retransmissions of the SRB or DRB has reached the maximum number of retransmissions in a case that the none of the timer T300, the timer T301, the timer T304, and the timer T311 for the Source MCG are running, or in response to reception, from the RLC layer of the Source MCG, of a notification indicating that the number of retransmissions of the SRB or DRB has reached the maximum number of retransmissions in a case that the first condition is satisfied and that the timer T304 is running.

In response to determining that radio link failure has been detected in the Source MCG, the UE 122 may suspend the transmission of some or all of the SRBs and/or DRBs of the Source MCG and reset the MAC entity of the Source MCG.

In response to configuration of makeBeforeBreak-r16 in the Current MCG, the UE 122 may consider the MCG to be the Source MCG.

In addition, in response to allocation of the first uplink grant in the handover destination cell by the PDCCH, the UE 122 may consider the handover source MCG to be the Source MCG.

In response to transmission of the RRC reconfiguration complete message, the UE 122 may consider the handover source MCG to be the Source MCG.

In response to reception of the UE contention resolution identity MAC control element from the Target gNB, the UE 122 may consider the handover source MCG to be the Source MCG.

In a case that the Source MCG is already present in the Current MCG at the time of configuration of makeBeforeBreak-r16, the UE 122 may release the MCG and consider the Current MCG to be a new Source MCG.

In this way, by distinguishing the processing for detecting radio link failure in the Source MCG from the processing for detecting radio link failure in the Current MCG, unnecessary re-establishment processing in MBB-HO can be prevented, allowing efficient mobility to be achieved.

An example of the operation of MBB-HO will be described. In this regard, an example will be described in which in the NR, the RRC reconfiguration message is used that includes CellGroupConfig including the Reconfiguration With Sync information element. Note that the description of processing below includes description of reception of an information element but that this means that the information element is included in the RRC reconfiguration message triggering the processing unless otherwise indicated. The information element used in processing may be associated with the information element used in NPL 10 unless otherwise indicated.

The terminal apparatus performs processing A, based on a CellGroupConfig information element received. The terminal apparatus performs processing L, based on a masterKeyUpdate information element received. The terminal apparatus performs processing I, based on a RadioBearerConfig information element received.

Note that each item of each of the processing described below is assigned an indent and a code. For example, processing A, processing B, processing C, and processing H are respectively interpreted to constitute flows illustrated in FIGS. 16, 17, 18, and 19, and processing other than the above is similarly interpreted.

Processing A The following processing is performed based on the CellGroupConfig information element received.

(A-0) In a case that CellGroupConfig includes configuration information (spCellConfig information elements) of the SpCell including Reconfiguration With Sync information, and the Reconfiguration With Sync information includes information (e.g., MakeBeforeBreak-r16) indicating that the RRC reconfiguration is MBB-HO, (A-0-1) the configuration of the current terminal apparatus (the configuration of the source) is replicated as a target configuration, and subsequent processing may be performed on the target configuration replicated unless otherwise indicated. For example, the "configuration of the current terminal apparatus" for processing may be, for MBB-HO, considered to be the "target configuration of the current terminal apparatus." In addition, for example, the configuration replicated includes some or all of (1) the configuration related to the bearer (for example, the configuration related to the SRB, the configuration related to the DRB, and the like), (2) the configurations of the cell group (e.g., the configuration of the SpCell, the configuration of the SCell, the configuration of each entity, and the like), (3) variables (measurement configuration (VarMeasConfig), a measurement result (VarMeasReportList), a timer, a counter, etc.) held inside the terminal apparatus, and (4) the configuration related to security (e.g., keys).

The configuration of the bearer replicated may exclude a configuration related to the SRB. Specifically, for the DRB, both the source configuration and the target configuration may be managed, and for the SRB, with the replication of the configuration being avoided, the source configuration may be switched to the target configuration. Information enabling determination of whether to replicate the SRB configuration may be included in the RRC reconfiguration message including Reconfiguration With Sync. For example, the above-described information may be included in MakeBeforeBreak-r16.

(A-1) In a case that CellGroupConfig includes configuration information (spCellConfig information elements) of the SpCell including Reconfiguration With Sync information
 (A-1-1) the processing B described below is performed.
 (A-1-2) In a suspended state, all radio bearers suspended are resumed, and the transmission on the SCG for all of the radio bearers is resumed.
(A-2) In a case that CellGroupConfig includes a list of RLC bearers to be released (rlc-BearerToReleaseList information elements)
 (A-2-1) the processing C described below is performed.
(A-3) In a case that CellGroupConfig includes a list of RLC bearers to be added and/or changed (rlc-BearerToAddModList information elements),
 (A-3-1) the processing D described below is performed.
(A-4) In a case that CellGroupConfig includes MAC configurations for the cell group (mac-CellGroupConfig information elements),
 (A-4-1) the MAC entity of the cell group is configured by the processing E described below. Note that in the embodiments of the present invention, the terminal apparatus performing "configuration" using the information elements included in the RRC message may refer to applying, to the configuration of the terminal apparatus, the information included in the information elements.
(A-5) In a case that CellGroupConfig includes a list of SCells to be released (sCellToReleaseList information elements),
 (A-5-1) release of the SCell is performed by the processing F described below.
(A-6) In a case that CellGroupConfig includes configuration information (spCellConfig information elements) of the SpCell
 (A-6-1) the SpCell is configured by the processing G described below.
(A-7) In a case that CellGroupConfig includes a list of SCells to be added and/or changed (sCellToAddModList information elements),
 (A-7-1) the SCell is added and/or changed by the processing H described below. Processing B
(B-1) In a case that the AS security has not been activated, processing for transitioning to RRC_IDLE is performed to terminate the processing B.
(B-2) In a case that the timer T310 for the corresponding SpCell is running, the timer T310 is stopped.
(B-3) The timer T304 fore corresponding SpCell is started using the timer value of t304 included in Reconfiguration With Sync.
(B-4) In a case that frequency information (frequencyInfoDL) is included,
 (B-4-1) The target SpCell is considered to be a cell having an SSB frequency indicated by frequencyInfoDL and having a physical cell identity indicated by the physical cell identity information (physCellId) included in Reconfiguration With Sync.
(B-5) Otherwise,
 (B-5-1) the target SpCell is considered to be a cell having the SSB frequency of the source SpCell and having a physical cell identity indicated by the physical cell identity information (physCellId) included in Reconfiguration With Sync.
(B-6) Downlink synchronization of the target SpCell is initiated.
(B-7) Predefined BCCH configurations are applied.
(B-8) A master information block (MIB) being one of pieces of broadcast information is acquired as necessary.
(B-9) In a case that Reconfiguration With Sync includes information indicating MBB-HO,
 (B-9-1) in a case that no MAC entity is present in the cell group used as a target,
  (B-9-1-1) a MAC entity of the cell group used as a target (also simply referred to as the target MAC entity) is generated.
 (B-9-2) Predefined (default) MAC cell group configurations are applied to the target MAC entity.
 (B-9-3) The SCell of the target cell group is considered to be in a deactivated state in a case that this configuration is provided.
 (B-9-4) The value of newUE-Identity is applied as the C-RNTI of the target cell group.
(B-10) Otherwise,
 (B-10-1) the MAC entity of the cell group is reset.
 (B-10-2) The SCell of the target cell group is considered to be in the deactivated state in a case that this configuration is provided.
 (B-10-3) The value of newUE-Identity is applied as the C-RNTI of the cell group.
(B-11) The lower layer is configured based on the configuration of the SpCell (spCellConfigCommon) included in Reconfiguration With Sync.
(B-12) The lower layer is configured based on other information included in Reconfiguration With Sync as necessary.

Processing C
 (C-1a) For each of the values of logical channel identities (logicalChannelIdentity) that are part of the configuration of the current terminal apparatus and that are included in rlc-BearerToReleaseList, or
 (C-1b) for each of the values of the logical channel identities to be released as a result of the release of the SCG,
  (C-1-1) the corresponding logical channel and an RLC entity linked to the logical channel are released.

Processing D
The following processing is performed for each of the RLC bearer configurations (RLC-BearerConfig) included in the rlc-BearerToAddModList information element received.
 (D-1) In a case that the configuration of the current terminal apparatus includes the RLC bearer of the logical channel identity received,
  (D-1-1) in response to reception of information (reestablishRLC) indicating re-establishment of RLC,
   (D-1-1-1) the RLC entity is re-established, and
   (D-1-2) the RLC entity is reconfigured in accordance with the configuration of RLC received (rlc-Config).
  (D-1-3) The logical channel is reconfigured in accordance with the MAC logical channel configuration received (mac-LogicalChannelConfig).

(D-2) Otherwise,
- (D-2-1) in a case that the configuration of the logical channel identity and the RLC for the SRB are not included;
  - (D-2-1-1) an RLC entity is established in accordance with the predefined (default) configuration.
- (D-2-2) Otherwise,
  - (D-2-2-1) an RLC entity is established in accordance with the RLC configuration received (rlc-Config).
- (D-2-3) In a case that the logical channel identity and MAC logical channel configuration for the SRB are not included,
  - (D-2-3-1) the MAC entity corresponding to the logical channel is configured in accordance with the predefined (default) configuration.
- (D-2-4) Otherwise,
  - (D-2-4-1) the MAC entity corresponding to the logical channel is configured in accordance with the MAC logical channel configuration received.
- (D-2-5) The logical channel is associated with a PDCP entity, based on identifier information (servedRadioBearer) of the radio bearer included in the configuration of the RLC bearer.

Processing E
- (E-1) In a case that the reconfiguration target based on CellGroupConfig is the SCG and that SCG MAC is not part of the configuration of the current terminal apparatus,
  - (E-1-1) an SCG MAC entity is generated.
- (E-2) The MAC main configuration of the cell group is reconfigured in accordance with MAC cell group configurations (mac-Cell) other than configurations related to addition, modification, and/or release of a timing advance group (TAG).
- (E-3) In a case that the MAC cell group configuration received includes information (tag-ToReleaseList) related to the release of the TAG,
  - (E-3-1) in a case that the identifier of the TAG included in tag-ToReleaseList is part of the configuration of the current terminal apparatus, then for the identifier of each TAG, the TAG indicated by the identifier of the TAG is released.
- (E-4) In a case that the MAC cell group configuration received includes information (tag-ToAddModList) related to addition and/or modification of the TAG,
  - (E-4-1) in a case that the identifier of the TAG included in tag-ToAddModList is not part of the configuration of the current terminal apparatus, then for the identifier of each TAG,
    - (E-4-1-1) the TAG corresponding to the identifier of the TAG is added in accordance with the timing advance timer received.
  - (E-4-2) In a case that the identifier of the TAG included in tag-ToAddModList is part of the configuration of the current terminal apparatus, then for the identifier of each TAG,
    - (E-4-2-1) the TAG corresponding to the identifier of the TAG is reconfigured in accordance with the timing advance timer received.

Processing F
- (F-1) In a case that the release has been triggered by receiving an SCell release list (sCellToReleaseList),
  - (F-1-1) for the value of each of the SCell indexes (sCellIndex) included in sCellToReleaseList,
    - (F-1-1-1) in a case that the configuration of the current terminal apparatus includes an SCell having a value of sCellIndex,
      - (F-1-1-1-1) the SCell is released.

Processing G
- (G-1) In a case that the SpCell configuration includes information of a timer and a constant (rlf-TimersAndConstants) related to radio link failure (RLF),
  - (G-1-1) a timer and a constant for the RLF for the cell group are configured in accordance with rlf-TimersAndConstants.
- (G-2) Otherwise, in a case that rlf-TimersAndConstants is not configured for the cell group,
  - (G-2-1) a timer and a constant for the RLF for the cell group are configured by using the values of the timer and the constant received in system information.
- (G-3) In a case that the SpCell configuration includes a dedicated SpCell configuration (spCellConfigDedicated),
  - (G-3-1) an SpCell is configured in accordance with spCellConfigDedicated.
  - (G-3-2) A Bandwidth part (BWP) indicated by the identifier (firstActiveUplinkBWP-Id) of the first active uplink BWP is considered to be an active uplink BWP in a case that this configuration is provided.
  - (G-3-3) A Bandwidth part (BWP) indicated by the identifier (firstActiveDownlinkBWP-Id) of the first active downlink BWP (Bandwidth part) is considered to be an active downlink BWP in a case that this configuration is provided.
  - (G-3-4) In a case that the dedicated SpCell configuration received reconfigures the reference signal used for radio link monitoring,
    - (G-3-4-1) in a case that the timer T310 corresponding to the SpCell is running, the timer T310 is stopped.
    - (G-3-4-2) The counters N310 and N311 are stopped.

Processing H
- (H-1) Among the values of sCellIndex included in sCellToAddModList, for each of the values that are not part of the configuration of the current terminal apparatus,
  - (H-1-1) the SCell corresponding to sCellIndex is added.
  - (H-1-2) For the lower layer, the SCell is configured to be considered to be in the deactivated state.
  - (H-1-3) For each of the measurement identifiers in a list (measIdList) of measurement identifiers corresponding to variables (VarMeasConfig) holding measurement configurations,
    - (H-1-3-1a) in a case that the SCell is not applicable to the measurement corresponding to the measurement identifier, and
    - (H-1-3-1b) in a case that the SCell is included in a list of triggered cells (cellsTriggeredList) defined by variables (VarMeasReportList) holding a measurement report for the measurement identifier,
      - (H-1-3-1-1) the SCell is deleted from the list of trigger cells (cellsTriggeredList) defined by the variables (VarMeasReportList) holding the measurement report for the measurement identifier.
- (H-2) Among the values of sCellIndex included in the sCellToAddModList, for each of the values that are part of the configuration of the current terminal apparatus,
  - (H-2-1) the configuration of the SCell corresponding to sCellIndex is changed.

Processing I
- (I-1) In a case that RadioBearerConfig includes srb3-ToRelease,
  - (I-1-1) the PDCP entity and the SRB identity for the SRB3 are released.
- (I-2) In a case that RadioBearerConfig includes SRB-ToAddModList,
  - (I-2-1) an SRB is added and/or reconfigured.
- (I-3) In a case that RadioBearerConfig includes drb-ToReleaseList,
  - (I-3-1) the DRB is released by the processing J described below.
- (I-4) In a case that RadioBearerConfig includes DRB-ToAddModList,
  - (I-4-1) a DRB is added and/or reconfigured by the processing K described below.
- (I-5) All the SDAP entities that are not associated with the DRB are released, and the upper layer is notified of release of user plane resources for a PDU session associated with the SDAP entity released.

In the processing I described above, for MBB-HO, two configurations of the source configuration and the target configuration may be managed in the processing for adding, reconfiguring, and/or releasing an SRB, and instead of performing the processing I-1 and the processing I-2 for the target configuration, the processing I-1 and the processing I-2 may be used for reconfiguration for the current SRB configuration. In other words, the SRB may manage one configuration. In this case, for a case of failure in handover and the like, the SRB configuration for the source before reconfiguration for reversion may be separately held.

As the processing I-5, for MBB-HO, all the SDAP entities that are not linked to the DRB of the source configuration or the DRB of the target configuration may be released, to notify the upper layer of release of user plane resources for the PDU sessions linked to the SDAP entities released. For example, MBB-HO may be performed based on the RRC reconfiguration message including reconfiguration-with-synchronization. Until a message for releasing the source configuration (e.g., an RRC message or a MAC CE) is received in the target cell, the SDAP entities associated with one or both of the source DRB and the target DRB may not be released. In a case that the source DRB is released in response to reception of the message for releasing the source configuration, all the SDAP entities that are not linked to the (target) DRB may be released. The upper layer may be notified of release of user plane resources for PDU sessions linked to the SDAP entities released.

The above "receiving a message for releasing a source configuration" may be interpreted as detecting a certain request. The certain request may be interpreted as certain information. Detecting a certain request may refer to inclusion of a particular information element (e.g., an information element indicating release of a source configuration) in the RRC message received, inclusion of particular information (e.g., information indicating release of a source configuration) in the MAC control element received, or reception of the first uplink grant in the SpCell. Detecting a certain request may refer to a success in the random access procedure. Detecting a certain request may refer to a success in the random access procedure in one or both of (A) a case that Reconfiguration With Sync is included in the SpCellConfig and (B) a case that the random access procedure is triggered by the RRC entity by submitting, to the lower layer, a message notifying completion of RRC reconfiguration (e.g., an RRC connection reconfiguration complete message for LTE or an RRC reconfiguration complete message for NR).

Detecting a certain request may refer to something detected by implementation of the terminal apparatus.

Processing J
- (non-transitory J-1a) For each of the DRB identities included in drb-ToReleaseList and that are part of the configuration of the current terminal apparatus, or
- (J-1b) for each of the DRB identities released as a result of the full configuration,
  - (J-1-1) the PDCP entity and the DRB identity are released.
  - (J-1-2) In a case that the SDAP entity linked to the DRB is configured,
    - (J-1-2-1) the release of the DRB is indicated to the SDAP linked to the DRB.
  - (J-1-3) In a case that the DRB is linked to the identity of an EPS bearer,
    - (J-1-3-1) in a case that no new bearer is added in the NR or the E-UTRA by using an identical EPS bearer identity,
      - (J-1-3-1-1) the upper layer is notified of release of the DRB and the EPS bearer identity of the released DRB.

As the processing J-1-3-1, for MBB-HO, in a case that no new bearer is added in the source or target configuration for the identical EPS bearer, the upper layer may be notified of release of the DRB and the EPS bearer identity of the DRB released. For example, MBB-HO may be performed based on the RRC reconfiguration message including Reconfiguration With Sync. Until a message for releasing the source configuration (e.g., an RRC message, a MAC CE, or the like) is received in the target cell, the upper layer may not be notified of release of the DRB or the EPS bearer identity of the DRB released in a case that the bearer is linked in one of the source and target configurations for the identical EPS bearer. In a case that the source DRB is released in response to reception of the message for releasing the source configuration, the upper layer may be notified of release of the DRB or the EPS bearer identity of the DRB released in a case that no new bearer is added in the NR or the E-UTRA by using the identical EPS bearer identity.

Processing K
- (K-1) For each of the DRB identities included in DRB-ToAddModList and not being part of the configuration of the current terminal apparatus,
  - (K-1-1) a PDCP entity is established, and configured in accordance with a PDCP configuration received (pdcp-Config).
  - (K-1-2) In a case that the PDCP entity of the DRB is not configured due to disabled ciphering (cipheringDisabled),
    - (K-1-2-1a) in a case that the target RAT of handover is E-UTRA/5GC, or
    - (K-1-2-1b) in a case that the terminal apparatus connects only to the E-UTRA/5GC,
      - (K-1-2-1-1) the PDCP entity is configured using a ciphering algorithm in NPL 4 and a key configuration.
    - (K-1-2-2) Otherwise,
      - (K-1-2-2-1) the PDCP entity is configured by using the ciphering algorithm in accordance with a security configuration (securityConfig), and a key is applied that is indicated by a parameter (keyToUse) linked to a master key (KeNB or KgNB) or a secondary key (S-KgNB).

(K-1-3) In a case that the PDCP entity of the DRB is configured for integrity protection,
  (K-1-3-1) the PDCP entity is configured by using an integrity protection algorithm in accordance with the security configuration (securityConfig), and the key is applied that is indicated by the parameter (keyToUse) linked to the master key (KeNB or KgNB) or the secondary key (S-KgNB).
(K-1-4) In a case that an SDAP configuration (sdap-Config) is included,
  (K-1-4-1) in a case that no SDAP is present in the PDU session received,
    (K-1-4-1-1) an SDAP entity is established.
    (K-1-4-1-2) In a case that no SDAP is present for the PDU session received before reception of this reconfiguration,
      (K-1-4-1-2-1) the upper layer is notified of establishment of user plane resources for that PDU session.
  (K-1-4-2) The SDAP entity is configured in accordance with the SDAP configuration received, and the DRB is linked to the SDAP entity.
(K-1-5) In a case that the DRB is linked to the EPS bearer identity,
  (K-1-5-1) in a case that the DRB is configured for the identical EPS bearer identity by the NR or E-UTRA before reception of the reconfiguration,
    (K-1-5-1-1) the DRB established is linked to the corresponding EPS bearer identity.
  (K-1-5-2) Otherwise,
    (K-1-5-2-1) the upper layer is notified of the establishment of the DRB and the EPS bearer identity of the DRB established.
(K-2) For each of the DRB identities included in DRB-ToAddModList and being part of the configuration of the current terminal apparatus,
  (K-2-1) in a case that parameter reestablishPDCP is set,
    (K-2-1-1a) in a case that the target RAT of handover is the E-UTRA/5GC, or
    (K-2-1-1b) in a case that the terminal apparatus connects only to the E-UTRA/5GC,
      (K-2-1-1-1) in a case that the PDCP entity of the DRB is not configured due to disabled ciphering (cipheringDisabled),
        (K-2-1-1-1-1) the PDCP entity is configured by using the ciphering algorithm in NPL 4 and the key configuration.
    (K-2-1-2) Otherwise,
      (K-2-1-2-1) in a case that the PDCP entity of the DRB is not configured due to disabled ciphering (cipheringDisabled),
        (K-2-1-2-1-1) the PDCP entity is configured by using the ciphering algorithm in accordance with the security configuration (securityConfig), and the key is applied that is indicated by the parameter (keyToUse) linked to the master key (KeNB or KgNB) or the secondary key (S-KgNB).
      (K-2-1-2-2) In a case that the PDCP entity of the DRB is configured for integrity protection,
        (K-2-1-2-2-1) the PDCP entity is configured by using the integrity protection algorithm in accordance with the security configuration (securityConfig), and the key is applied that is indicated by the parameter (keyToUse) linked to the master key (KeNB or KgNB) or the secondary key (S-KgNB).
    (K-2-1-3) In a case that drb-ContinueROHC is included in pdcp-Config,
      (K-2-1-3-1) the lower layer is notified that drb-ContinueROHC is configured.
    (K-2-1-4) A PDCP entity of the DRB is re-established.
  (K-2-2) Otherwise, in a case that recoverPDCP is set,
    (K-2-2-1) performance of data recovery for the PDCP entity of the DRB is triggered.
  (K-2-3) in a case that a PDCP configuration is included,
    (K-2-3-1) the PDCP entity is reconfigured in accordance with the PDCP configuration received.
  (K-2-4) In a case that an SDAP configuration is included,
    (K-2-4-1) the SDAP entity is reconfigured in accordance with the SDAP configuration received.
    (K-2-4-2) In a case that a QFI value is configured for each of the QFIs added by mappedQoS-Flows-ToAdd, the QFI values are sequentially released starting with the oldest DRB.

As the above-described processing K-1-4-1-2, for MBB-HO, in a case that no SDAP for the PDU session received is present in the source configuration or the target configuration before reception of the reconfiguration, the upper layer may be notified of establishment of user plane resources for the PDU session. Alternatively, as the above-described processing K-1-4-1-2, for MBB-HO, in a case that no SDAP for the PDU session received is present in the source configuration before reception of the reconfiguration, the upper layer may be notified of establishment of user plane resources for the PDU session.

In the above-described processing K-1-5-2, for MBB-HO, in a case that the DRB is not configured in the source or target configuration for the identical EPS bearer identity by the NR or the E-UTRA before reception of the reconfiguration, the upper layer may be notified of establishment of a DRB and the EPS bearer identity of the DRB established. Alternatively, in the above-described processing K-1-5-2, for MBB-HO, in a case that the DRB is not configured in the source configuration for the identical EPS bearer identity by the NR or the E-UTRA before reception of the reconfiguration, the upper layer may be notified of establishment of a DRB and the EPS bearer identity of the DRB established.

Processing L (L-1) In a case that the terminal apparatus is connected to the E-UTRA/EPC,
  (L-1-1) in response to reception of sk-Counter,
    (L-1-1-1) the S-KgNB key is updated based on the KgNB key and the sk-Counter received.
    (L-1-1-2) A KRRCenc key and a KUPenc key are derived. The KRRCenc key is a key used to protect the RRC signal generated from KgNB in accordance with the ciphering algorithm. The KUPenc is a key used to protect user plane traffic (user data) generated from KgNB in accordance with the ciphering algorithm.
    (L-1-1-3) The KRRCint key and the KUPint key are generated from the KgNB key. The KRRCint key is a key used to protect the RRC signal generated from KgNB in accordance with the integrity algorithm. Additionally, the KUPint is a key used to protect user plane traffic (user data) generated from KgNB in accordance with the integrity algorithm.

(L-2) Otherwise,
- (L-1-2) in a case that masterKeyUpdate received includes nas-Container,
  - (L-1-2-1) the nas-Container is forwarded to the upper layer.
- (L-1-3) In a case that keySetChangeIndicator is true,
  - (L-1-3-1) KgNB is generated or updated based on KAMF.
- (L-1-4) Otherwise,
  - (L-1-4-1) a KgNB key is generated or updated based on the current KgNB key or NextHop (NH).
- (L-1-5) The value of nextHopChainingCount is stored.
- (L-1-6) A key associated with the KgNB key is generated as follows.
  - (L-1-6-1) In a case that SecurityConfig includes securityAlgorithmConfig,
    - (L-1-6-1-1) a KRRCenc key and a KUPenc key linked to cipheringAlgorithm included in securityAlgorithmConfig are generated from the KgNB key.
    - (L-1-6-1-2) A KRRCint key and a KUPint key linked to integrityProtAlgorithm included in securityAlgorithmConfig are generated from the KgNB key.
  - (L-1-6-2) Otherwise,
    - (L-1-6-2-1) a KRRCenc key and a KUPenc key linked to the current cipheringAlgorithm are generated from the KgNB key.
    - (L-1-6-2-2) A KRRCint key and a KUPint key linked to the current integrityProtAlgorithm are generated from the KgNB key.

An example of the operation of MBB-HO will be described. Here, an example will be described in which in the LTE, an RRC connection reconfiguration message is used that includes mobility control information (mobilityControlInfo) information elements. Note that the description of processing below includes description of reception of an information element but that this means that the information element is included in the RRC connection reconfiguration message triggering the processing unless otherwise indicated. The information element used in processing may be associated with the information element used in NPL 4 unless otherwise indicated.

The terminal apparatus receives the RRC connection reconfiguration message including mobilityControlInfo, and, in a case that the terminal apparatus can respond to the configuration included in the message, the terminal apparatus performs the following processing LA.

Processing LA
- (LA-1) The timer T304 is started using a timer value of t304 included in mobilityControlInfo.
- (LA-2) In a case that carrierFreq is included,
  - (LA-2-1) a cell operating on a frequency indicated by carrierFreq and having a physical cell identity indicated by targetPhysCellII is considered to be the target PCell.
- (LA-3) Otherwise,
  - (LA-3-1) a cell operating on the frequency of the PCell of the source and having a physical cell identity indicated by targetPhysCellII is considered to be the target PCell.
- (LA-4) Downlink synchronization of the target PCell is initiated.
- (LA-5) In a case that makeBeforeBreak is configured,
  - (LA-5-1) the terminal apparatus stops uplink transmission to and/or downlink reception from the source cell, and then performs the subsequent remaining processing of the procedure including resetting of MAC.
- (LA-6) In a case that makeBeforeBreak-r16 is configured,
  - (LA-6-1) the configuration of the current terminal apparatus (source configuration) is replicated as a target configuration, and the subsequent reconfiguration processing may be performed on the replicated target configuration unless otherwise indicated. For example, the "configuration of the current terminal apparatus" for processing may be, for MBB-HO, considered to be the "target configuration of the current terminal apparatus." For example, the configuration to be replicated may include some or all of (1) the configuration of the bearer (e.g., the SRB configuration, the DRB configuration, and the like), (2) the configuration of the cell group (e.g., the SpCell configuration, the SCell configuration, the RLC entity configuration, the MAC entity configuration, a PHY configuration, and the like), (3) internal variables (the measurement configuration (VarMeasConfig), measurement results (VarMeasReportList), the timer, the counter, etc.), and (4) the configuration related to security (e.g., the keys). Furthermore, the configuration of the bearer to be replicated may exclude the SRB configuration. Specifically, for the DRB, both the source configuration and the target configuration may be managed, and for the SRB, with the replication of the configuration being avoided, the source configuration may be switched to the target configuration. Information enabling determination of whether to replicate the SRB configuration may be included in the RRC connection reconfiguration message including mobilityControlInfo. For example, the above-described information may be included in MakeBeforeBreak-r16.
- (LA-7) The MAC of the MCG and the MAC of the SCG are reset in a case that these are configured. In a case that the MakeBeforeBreak-r16 is configured, the MAC of the source MCG and the MAC of the SCG need not be reset. Alternatively, in a case that MakeBeforeBreak-r16 is configured, the target MAC may be reset without resetting the source MAC.
- (LA-8) A PDCP is re-established for all radio bearers that have been configured by the PDCP configuration and established. In a case that MakeBeforeBreak-r16 is configured, re-establishment of the PDCP is applied only to the target PDCP. Alternatively, for Single PDCP described below, in a case that MakeBeforeBreak-r16 is configured and that a PDCP is already present to which the target radio bearer is linked, the establishment and/or re-establishment of a PDCP need not be performed. In other words, in a case that MakeBeforeBreak-r16 is configured, this may allow a PDCP to be established and/or re-established in a case that no PDCP is present that is linked to the target radio bearer.
- (LA-9) The RLC of the MCG and the RLC of the SCG are re-established for all radio bearers established in a case that this configuration is provided.
- (LA-10) The value of newUE-Identity is applied as a C-RNTI.
- (LA-11) The lower layer is configured in accordance with a cell common radio resource configuration received (radioResourceConfigCommon).

(LA-12) The lower layer is configured in accordance with other information included in mobilityControlInfo received.
(LA-13) In a case that the RRC connection reconfiguration message received includes sCellToReleaseList,
 (LA-13-1) the SCell is released.
(LA-14) In a case that the RRC connection reconfiguration message received includes sCellGroupToReleaseList,
 (LA-14-1) the SCell group is released.
(LA-15a) In a case that the RRC connection reconfiguration message received includes scg-Configuration,
(LA-15b) in a case that the configuration of the current terminal apparatus includes one or more split DRBs and that the RRC connection reconfiguration message received includes DRB-ToAddModList,
 (LA-15-1) the SCG is reconfigured.
(LA-16) In a case that the RRC connection reconfiguration message received includes a terminal apparatus-specific radio resource configuration (radioResourceConfigDedicated),
 (LA-16-1) radio resources are configured by processing LB described below.
(LA-17) In a case that the RRC connection reconfiguration message includes a security configuration (securityConfigHO-v1530),
 (LA-17-1) in a case that the nas-Container is received,
  (LA-17-1-1) the nas-Container is forwarded to the upper layer.
 (LA-17-2) In a case that keyChangeIndicator-r15 is received and that keyChangeIndicator-r15 is "true,"
  (LA-17-2-1) the KeNB key is updated based on the KAMF key.
 (LA-17-3) Otherwise,
  (LA-17-3-1) the KeNB key is updated based on the current KeNB or NextHop (NH)
 (LA-17-4) The value of nextHopChainingCount-r15 is stored.
 (LA-17-5) In a case that securityAlgorithmConfig-r15 is received,
  (LA-17-5-1) a KRRCint key is generated that is linked to integrityProtAlgorithm received.
  (LA-17-5-2) A KRRCenc key and an KUPenc key are generated that are linked to the cipheringAlgorithm received. The KRRCenc key is a key used to protect the RRC signal generated from the KeNB key in accordance with the ciphering algorithm. The KUPenc is a key used to protect user plane traffic (user data) generated from the KeNB key in accordance with the ciphering algorithm.
 (LA-17-6) Otherwise,
  (LA-17-6-1) a KRRCint key linked to the current integrityProtAlgorithm is generated from the KeNB key.
  (LA-17-6-2) A KRRCenc key and a KUPenc key linked to the current cipheringAlgorithm is generated from the KeNB key.
(LA-18) In a case that the RRC connection reconfiguration message received includes sCellToAddModList,
 (LA-18-1) an SCell is added and/or modified.
(LA-19) In a case that the received RRC connection reconfiguration message includes sCellGroupToAddModList,
 (LA-19-1) an SCell group is added and/or modified.
(LA-20) In a case that the RRC connection reconfiguration message received includes measConfig,
 (LA-20-1) the measurement configuration is performed.
(LA-21) The measurement identifier is automatically deleted.
(LA-22) The RRC connection reconfiguration complete message is presented to the lower layer for transmission.
(LA-23) In a case that the MAC is successful in the random access procedure,
 (LA-23-1) The timer T304 is stopped to terminate the procedure.

Processing LB
(LB-1) In a case that radioResourceConfigDedicated received includes SRB-ToAddModList,
 (LB-1-1) an SRB is added and/or reconfigured by processing LC described below.
(LB-2) In a case that radioResourceConfigDedicated received includes drb-ToReleaseList,
 (LB-2-1) the DRB is released by processing LD described below.
(LB-3) In a case that radioResourceConfigDedicated received includes DRB-ToAddModList,
 (LB-3-1) a DRB is added and/or reconfigured by processing LE described below.
(LB-4) In a case that radioResourceConfigDedicated received includes mac-MainConfig,
 (LB-4-1) the main configuration of the MAC is performed by processing LF described below.

Processing LC
(LC-1) For each of the SRB identities included in the SRB-ToAddModList and being not part of the configuration of the current terminal apparatus,
 (LC-1-1) a PDCP entity is established by using the current security configuration.
 (LC-1-2) In a case that rlc-BearerConfigSecondary with the value "set up" is received,
  (LC-1-2-1) a secondary MCG RLC entity is established in accordance with rlc-BearerConfigSecondary received and linked to a DCCH logical channel.
  (LC-1-2-2) Configuration is provided to activate duplication on the PDCP entity of the E-UTRA.
(LC-2) For each of the SRB identities included in SRB-ToAddModList and being part of the current terminal apparatus configuration,
 (LC-2-1) in a case that pdcp-verChange is included (in other words, NR PDCP is changed to E-UTRA PDCP),
  (LC-2-1-1) an E-UTRA PDCP entity is established by using the current security configuration.
  (LC-2-1-2) The primary RLC of the SRB is linked to the PDCP entity established.
  (LC-2-1-3) The NR PDCP of the SRB is released.
 (LC-2-2) A primary RLC entity is reconfigured in accordance with rlc-Config received.
 (LC-2-3) A primary DCCH logical channel is reconfigured in accordance with the logical channel configuration received (logicalChannelConfig).
 (LC-2-4) In a case that rlc-BearerConfigSecondary with the value "release" is included,
  (LC-2-4-1) a secondary MCG RLC entity and a DCCH logical channel linked to the secondary MCG RLC entity are released.

(LC-2-5) In a case that case that rlc-BearerConfigSecondary with the value "set up" is received,
  (LC-2-5-1) in a case that the secondary RLC bearer is not included in the current SRB configuration,
    (LC-2-5-1-1) a secondary MCG RLC entity is established in accordance with rlc-BearerConfigSecondary received and is linked to the DCCH logical channel.
    (LC-2-5-1-2) Configuration is provided to activate duplication for the PDCP entity of the E-UTRA.
  (LC-2-5-2) Otherwise,
    (LC-2-5-2-1) the secondary MCG RLC entity is reconfigured in accordance with rlc-BearerConfigSecondary received and is linked to the DCCH logical channel.

Processing LD
  (LD-1a) For each of the DRB identities included in drb-ToReleaseList and that are part of the configuration of the current terminal apparatus, or
  (LD-2b) for each of the values of the DRB identities released as a result of the full configuration,
    (LD-2-1) in a case that the release of the DRB results from full configuration,
      (LD-2-1-1) the PDCP entity of the E-UTRA or NR is released.
    (LD-2-2) Otherwise, in a case that the DRB is configured with a PDCP configuration,
      (LD-2-2-1) the PDCP entity of the E-UTRA is released.
    (LD-2-3) Otherwise,
      (LD-2-3-1) the RLC entity for the DRB is re-established.
    (LD-2-4) The RLC entity is released.
    (LD-2-5) A DTCH logical channel is released.
    (LD-2-6) In a case that the terminal apparatus is connected to the EPC,
      (LD-2-6-1) in a case that the DRB is configured with the PDCP configuration and no new DRB is added by DRB-ToAddModList, nr-radioBearerConfig1, or nr-radioBearerConfig2 by using an identical EPS bearer identity,
        (LD-2-6-1-1) in a case that the procedure has been triggered by handover,
          (LD-2-6-1-1-1) after the success of handover, the upper layer is notified of release of the DRB and the EPS bearer identity of the DRB released.
        (LD-2-6-1-2) Otherwise,
          (LD-2-6-1-2-1) the release of the DRB and the EPS bearer identity of the released DRB are immediately notified to the upper layer.

Processing LE
  (LE-1) For each of the DRB identities included in DRB-ToAddModList and not being part of the configuration of the current terminal apparatus,
    (LE-1-1) in a case that DRB-ToAddModListSCG has not been received or DRB-ToAddModListSCG does not include the value of the DRB identity,
      (LE-1-1-1) in a case that pdcp-Config is included, a PDCP entity is established in accordance with the pdcp-Config and configured by using the current MCG security configuration.
      (LE-1-1-2) In a case that rlc-Config is included, an MCG RLC is established in accordance with rlc-Config.
      (LE-1-1-3) In a case that a logical channel identity (logicalChannelIdentity) and a logical channel configuration (logicalChannelConfig) are included, an MCG DTCH logical channel is established in accordance with logicalChannelIdentity and logicalChannelConfig.
      (LE-1-1-4) In a case that rlc-BearerConfigSecondary with the value "setup," is included
        (LE-1-1-4-1) a secondary MCG RLC entity is established and linked to the DTCH logical channel in accordance with rlc-BearerConfigSecondary. The RLC entity established is then linked to an E-UTRA PDCP with an identical value of the DRB identity in the configuration of the current terminal apparatus.
    (LE-1-2) In a case that the DRB is configured with an identical EPS bearer identity,
      (LE-1-2-1) the DRB established is linked to the EPS bearer identity of the DRB.
    (LE-1-3) Otherwise, in a case that the entries of DRB-ToAddModList include pdcp-config (the bearer is established by the PDCP of the E-UTRA),
      (LE-1-3-1) the upper layer is notified of establishment of the DRB and the EPS bearer identity of the DRB established.
  (LE-2) For each of the DRB identities included in DRB-ToAddModList and being part of the configuration of the current terminal apparatus,
    (LE-2-1) each layer and/or bearer is reconfigured in accordance with the configuration included.

Processing LF
  (LF-1) The MAC main configuration is reconfigured in accordance with MA main configuration information elements (mac-MainConfig) other than configurations related to addition, modification, and/or release of a secondary timing advance group (STAG).
  (LF-2) In a case that mac-MainConfig received includes information related to the release of the STAG (stag-ToReleaseList),
    (LF-2-1) in a case that the identity of the STAG included in stag-ToReleaseList is part of the configuration of the current terminal apparatus, then for the identifier of each STAG, the STAG indicated by the STAG identifier is released.
  (LF-3) In a case that mac-MainConfig received includes information related to the addition and/or modification of the stag (stag-ToAddModList)
    (LF-3-1) in a case that the identifier of the STAG included in stag-ToAddModList is not part of the configuration of the current terminal apparatus, for the identifier of each TAG,
      (LF-3-1-1) the STAG corresponding to the identifier of the STAG is added in accordance with timeAlignmentTimerSTAG received.
    (LF-3-2) In a case that the identity of the STAG included in stag-ToAddModList is part of the configuration of the current terminal apparatus, then for the identifier of each STAG,
      (LF-3-2-1) the STAG corresponding to the identifier of the STAG is reconfigured in accordance with timeAlignmentTimerSTAG received.

Another example of the operation of the MBB-HO will be described. In this regard, an example will be described in which in the NR, an RRC reconfiguration message including a conditional handover configuration is used.

For example, the RRC message transmitted by the base station apparatus may include a conditional handover information element. The conditional handover information element may include a list including one or more information elements (conditional handover configurations) including information included in the Reconfiguration With Sync information element. The conditional handover information element may include, for each or some or all of the conditional handover configurations, an information element (conditional handover condition) indicating a condition for applying the conditional handover configuration.

The conditional handover configurations may include part or all of the information included in RadioBearerConfig and CellGroupConfig. The conditional handover configurations may include information indicating MBB-HO. In addition, the conditional handover condition may include threshold information for determining whether the condition is satisfied, by using a reference signal. The conditional handover condition may also include information indicating that the conditional handover configuration is to be applied immediately. For example, in a case that the conditional handover condition indicates information indicating that the conditional handover configuration is to be immediately applied and that the conditional handover configuration includes information indicating MBB-HO, MBB-HO can be implemented by performing the processing A and the processing I, based on the information included in the conditional handover configuration. Of course, even in a case that the conditional handover condition is another condition, and this condition is satisfied, conditional MBB-HO can be implemented by performing the processing A and the processing I, based on the information included in the conditional handover configuration.

In the MBB-HO of the NR, the terminal apparatus may take a PDCP (Single PDCP) configuration common to the source and the target.

For example, in a case that the core network is a 5GC, then in the source configuration, the logical channel, the DRB (or SRB), and the RLC bearer are linked together by the RLC bearer configuration, and the DRB, the PDCP entity, and the PDU session are linked together by drb-ToAddMod. Similarly, also in the target configuration, the logical channel, the DRB (or SRB), and the RLC bearer are linked together by the RLC bearer configuration, and the DRB (or SRB), the PDCP entity, and the PDU session are linked together by drb-ToAddMod. In this case, for example, the logical channel, the DRB (or SRB), and/or the RLC bearer linked to the identical DRB identity (or SRB identity) for the source and target configurations may be linked to one PDCP. Additionally, for example, the logical channel, the DRB (or SRB), and/or the RLC bearer linked to the identical PDU session for the source and target configurations may be linked to one PDCP.

For example, in a case that the core network is a 5GC, then in the source configuration, the logical channel, the DRB (or SRB), and the RLC bearer are linked together by the RLC bearer configuration, and the DRB, the PDCP entity, and the PDU session are linked together by drb-ToAddMod. Similarly, also in the target configuration, the logical channel, the DRB (or SRB), and the RLC bearer are linked together by the RLC bearer configuration, and the DRB (or SRB), the PDCP entity, and the PDU session are linked together by drb-ToAddMod. In this case, for example, the logical channel, the DRB (or SRB), and/or the RLC bearer linked to the identical DRB identity (or SRB identity) for the source and target configurations may be linked to one SDAP.

For example, in a case that the core network is an EPC, in the source configuration, the DRB (or SRB), the PDCP entity, the logical channel, the RLC entity (and/or the RLC bearer), and the EPS bearer are linked together. Similarly, in the target configuration, the DRB (or SRB), the PDCP entity, the logical channel, the RLC entity (and/or the RLC bearer), and the EPS bearer are linked together. In this case, for example, the logical channel and the RLC entity (and/or RLC bearer) linked to the identical DRB identity (or SRB identity) for the source and target configurations may be linked to one PDCP entity. For example, the logical channel, the RLC entity (and/or RLC bearer), and the DRB (or SRB) linked to the identical EPS bearer identity for the source and target configurations may be linked to one PDCP.

In the above-described case, the terminal apparatus may consider the PDCP configurations of the source and the target linked to one PDCP to be identical. Alternatively, the terminal apparatus may apply the target PDCP configuration to the source PDCP configuration.

In addition, in a case that the source DRB (or SRB) and the target DRB including the identical DRB identity are linked to one PDCP entity, because the source and the target use different security keys (e.g., KUPenc, KUPint, KRRCenc, and/or KRRCint, and the like), multiple security keys are managed in one PDCP entity.

Another example of the operation of the MBB-HO will be described. In this regard, an example will be described in which in the LTE, the RRC connection reconfiguration message including the conditional handover configuration is used.

For example, the RRC message transmitted by the base station apparatus may include a conditional handover information element. The conditional handover information element may include a list including one or more information elements (conditional handover configurations) including information included in the mobilityControlInfo information element. The conditional handover information element may include, for each or some or all of the conditional handover configurations, an information element (conditional handover condition) indicating a condition for applying the conditional handover configuration.

The conditional handover configuration may include part or all of the information included in the cell common radio resource configuration (radioBearerConfigCommon) and the terminal apparatus-specific radio resource configuration (radioBearerConfigDedicated). The conditional handover configuration may include information indicating MBB-HO (e.g., MakeBeforeBreak-r16). In addition, the conditional handover condition may include threshold information for determining whether the condition is satisfied, by using a reference signal. The conditional handover condition may also include information indicating that the conditional handover configuration is to be applied immediately. For example, in a case that the conditional handover condition indicates information indicating that the conditional handover configuration is to be immediately applied, and the conditional handover configuration includes the information indicating MBB-HO, the processing LA is performed based on the information included in the conditional handover configuration, to implement MBB-HO. Of course, even in a case that the conditional handover condition is another condition, in a case that this is satisfied, the processing LA is performed based on information included in the conditional handover configuration, to implement conditional MBB-HO.

In the MBB-HO of the LTE above (MakeBeforeBreak-r16), for the terminal apparatus, the source and the target may take a common PDCP (Single PDCP) configuration.

For example, in a case that the core network is a 5GC, then in the source configuration, the logical channel, the DRB (or SRB), and the RLC bearer are linked together by the RLC bearer configuration, and the DRB, the PDCP entity, and the PDU session are linked together by drb-ToAddMod. Similarly, also in the target configuration, the logical channel, the DRB (or SRB), and the RLC bearer are linked together by the RLC bearer configuration, and the DRB (or SRB), the PDCP entity, and the PDU session are linked together by drb-ToAddMod. In this case, for example, the logical channel, the DRB (or SRB), and/or the RLC bearer linked to the identical DRB identity (or SRB identity) for the source and target configurations may be linked to one PDCP. Additionally, for example, the logical channel, the DRB (or SRB), and/or the RLC bearer linked to the identical PDU session for the source and target configurations may be linked to one PDCP.

For example, in a case that the core network is a 5GC, then in the source configuration, the logical channel, the DRB (or SRB), and the RLC bearer are linked together by the RLC bearer configuration, and the DRB, the PDCP entity, and the PDU session are linked together by drb-ToAddMod. Similarly, also in the target configuration, the logical channel, the DRB (or SRB), and the RLC bearer are linked together by the RLC bearer configuration, and the DRB (or SRB), the PDCP entity, and the PDU session are linked together by drb-ToAddMod. In this case, for example, the logical channel, the DRB (or SRB), and/or the RLC bearer linked to the identical DRB identity (or SRB identity) for the source and target configurations may be linked to one SDAP.

For example, in a case that the core network is an EPC, in the source configuration, the DRB (or SRB), the PDCP entity, the logical channel, the RLC entity (and/or the RLC bearer), and the EPS bearer are linked together. Similarly, in the target configuration, the DRB (or SRB), the PDCP entity, the logical channel, the RLC entity (and/or the RLC bearer), and the EPS bearer are linked together. In this case, for example, the logical channel and the RLC entity (and/or RLC bearer) linked to the identical DRB identity (or SRB identity) for the source and target configurations may be linked to one PDCP entity. For example, the logical channel, the RLC entity (and/or RLC bearer), and the DRB (or SRB) linked to the identical EPS bearer identity for the source and target configurations may be linked to one PDCP.

In the above-described case, the terminal apparatus may consider the PDCP configurations of the source and the target linked to one PDCP to be identical. Alternatively, the terminal apparatus may apply the target PDCP configuration to the source PDCP configuration.

In addition, in a case that the source DRB and the target DRB (or SRB) including the identical DRB identity are linked to one PDCP entity, because the source and the target use different security keys (for example, KUPenc), the one PDCP entity manages the multiple security keys.

Note that information indicating whether to generate any of the layers of the target before connection to the target is completed may be included in the MakeBeforeBreak-r16.

Figure 27:
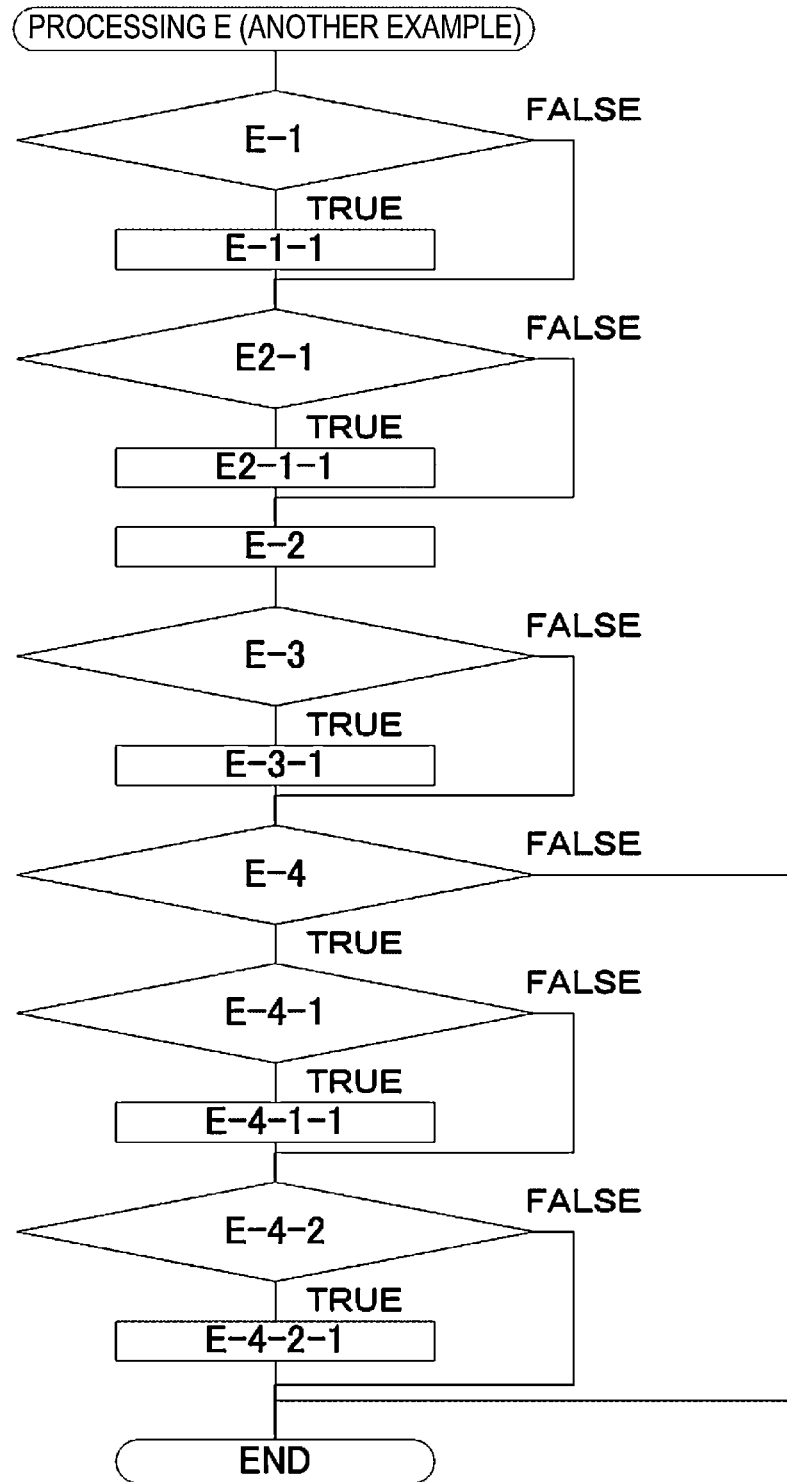
FIG. 27 is a diagram illustrating another example of a flow of processing E according to an embodiment of the present invention.

Note that, in NR, the following processing (E2-1) may be included in the (processing E) described above. For example, as illustrated in FIG. 27, the processing (E2-1) may be performed between processing (E-1) and processing (E-2), but no such limitation is intended. In LTE, the processing (E2-1) described below and the subsequent processing may be included in the (processing LF) described above. For example, the processing (E2-1) may be performed prior to the processing (LF-1), but no such limitation is intended.

(E2-1) In the case of an MBB-HO and in a case that a MAC entity for the target (also referred to as a secondary MAC entity) is not present as part of the configuration of the current terminal apparatus,
  (E2-1-1) the secondary MAC entity is generated.

Thus, the MAC entity can be generated appropriately in the processing based on the MAC layer configuration.

Figure 28:
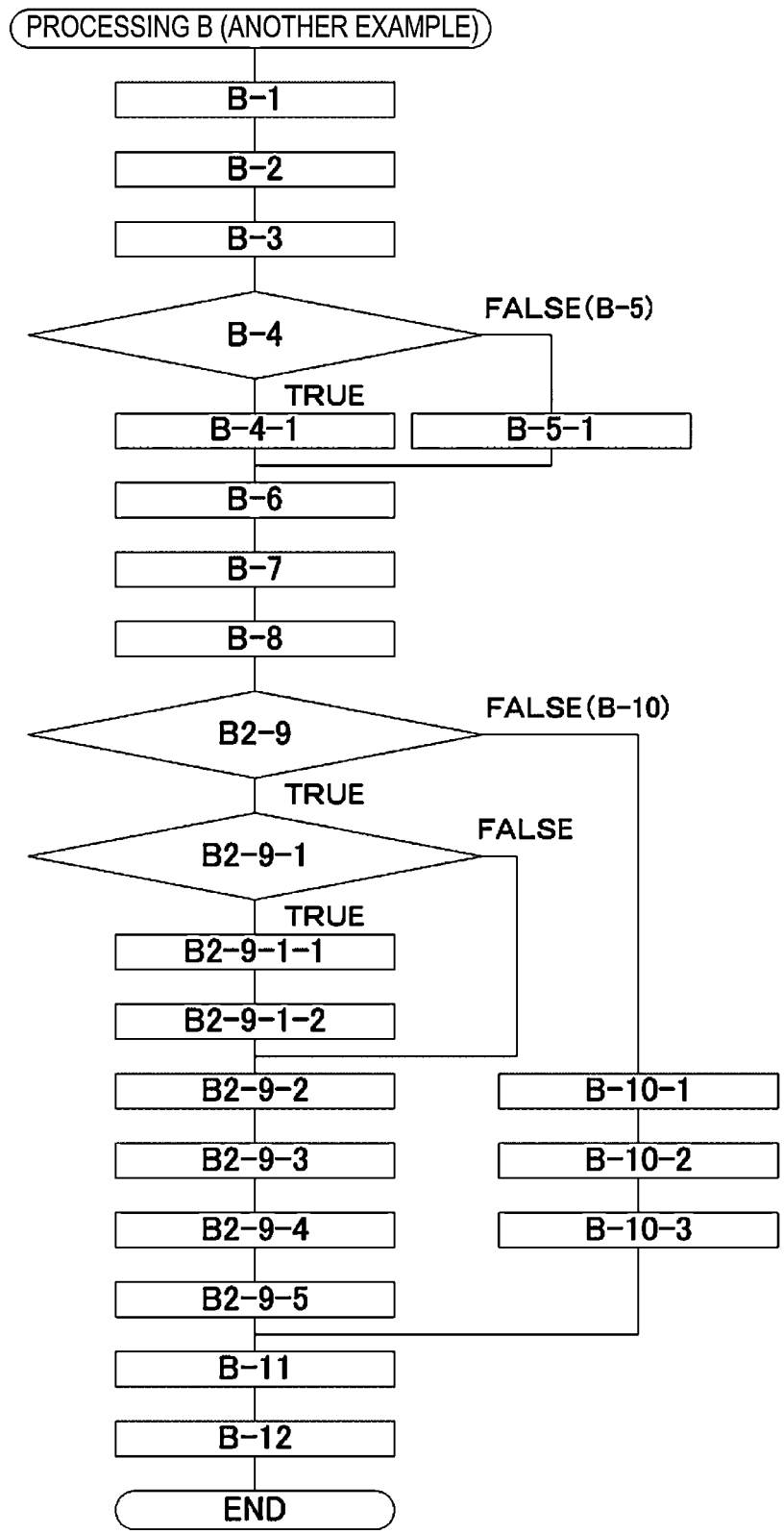
FIG. 28 is a diagram illustrating another example of a flow of processing B according to an embodiment of the present invention.

In NR, the processing in the scope of the processing (B-9) of the (processing B) described above may be, for example, processing (B2-9) as illustrated in FIG. 28. In the case of MBB-HO, the configuration for "this cell group" in the processing (B-9) and the subsequent processing in the processing (B) described above may be applied to the target.

(B2-9) In a case that Reconfiguration With Sync includes information indicating MBB-HO,
  (B2-9-1) in a case that no MAC entity for the target (also referred to as a secondary MAC entity) is present as part of the current terminal apparatus,
    (B2-9-1-1) the MAC entity of this existing cell group (also referred to as a primary MAC entity) is not reset.
    (B2-9-1-2) A secondary MAC entity is generated.
  (B2-9-2) An existing (default) MAC cell group configuration is applied to the secondary MAC entity. Alternatively, the same configuration as that for the primary MAC entity may be applied to the secondary MAC entity.
  (B2-9-3) The secondary MAC entity is reset.
  (B2-9-4) The SCell of the target cell group is considered to be in the deactivated state in a case that this configuration has been performed.
  (B2-9-5) The value of newUE-Identity is applied as the C-RNTI of this cell group.

Figure 29:
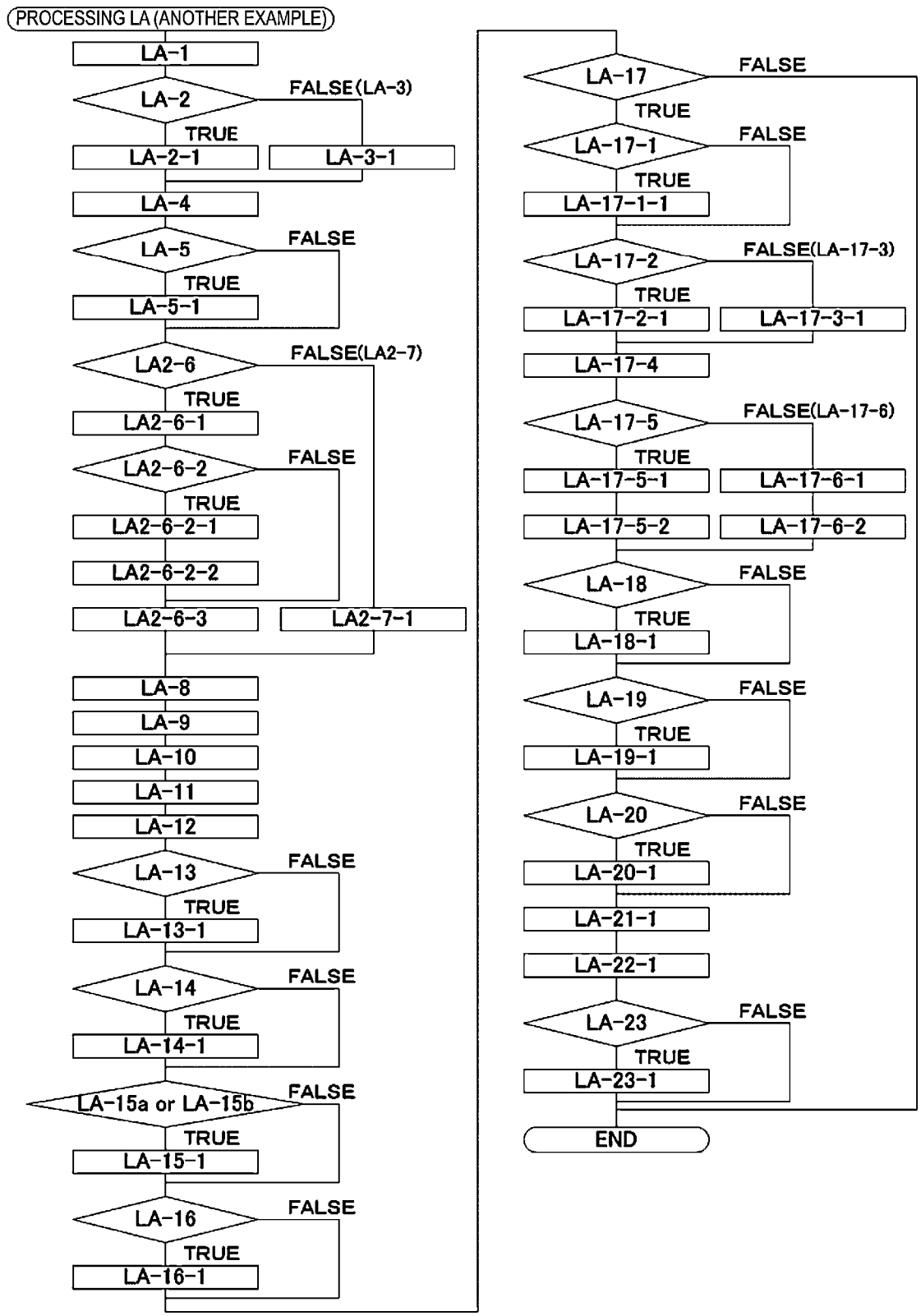
FIG. 29 is a diagram illustrating another example of a flow of processing LA according to an embodiment of the present invention.

In LTE, processing in the scope from the processing (LA-6) to the processing (LA-7) in the (processing LA) described above may be processing (LA2-6) and processing (LA2-7) as illustrated in FIG. 29, for example.

(LA2-6) In a case that makeBeforeBreak-r16 is configured,
  (LA2-6-1) the configuration of the current terminal apparatus (source configuration) is replicated as a target configuration, and the subsequent reconfiguration processing may be performed on the replicated target configuration unless otherwise indicated. For example, the "configuration of the current terminal apparatus" for processing may be, for MBB-HO, considered to be the "target configuration of the current terminal apparatus." For example, the configuration to be replicated may include some or all of (1) the configuration of the bearer (e.g., the SRB configuration, the DRB configuration, and the like), (2) the configuration of the cell group (e.g., the SpCell configuration, the SCell configuration, the RLC entity configuration, the MAC entity configuration, a PHY configuration, and the like), (3) internal variables (the measurement configuration (VarMeasConfig), measurement results (VarMeasReportList), the timer, the counter, etc.), and (4) the configuration related to security (e.g., the keys). Furthermore, the configuration of the bearer to be replicated may exclude the SRB configuration. Specifically, for the DRB, both the source configuration and the target configuration may be managed, and for the SRB, with the replication of the configuration being avoided, the source configuration may be switched to the target configuration. Information enabling determination of whether to replicate the SRB configuration may be included in the RRC connection reconfiguration message including mobilityControlInfo. For example, the above-described information may be included in MakeBeforeBreak-r16. The above-described replication may involve generation of each layer entity (e.g., RLC entity, MAC entity).

(LA2-6-2) In a case that no MAC entity for the target (also referred to as the secondary MAC entity) is present as part of the configuration of the current terminal apparatus, (LA2-6-2-1) the MAC entity of this existing cell group (also referred to as the primary MAC entity) is not reset.

(LA2-6-2-2) A secondary MAC entity is generated.

(LA2-6-3) The secondary MAC entity is reset if needed.

(L2A-7) Otherwise, (LA2-7-1) the MAC of the MCG and the MAC of the SCG are reset in a case that this configuration is provided.

Accordingly, the MAC entity can be appropriately generated even in a case that the MAC cell group configuration is not included in the RRC reconfiguration message in NR. In a case that the MAC main configuration is not included in the RRC connection reconfiguration message in EUTRA, the MAC entity can be generated appropriately.

In the above-described (processing I), (processing J), or other processing, in response to receiving the message for releasing the source configuration, the terminal apparatus may release the current primary MAC entity and consider the current secondary MAC entity as the primary MAC entity. In response to receiving the message for releasing the source configuration, the terminal apparatus may reset the current primary MAC entity and consider the current secondary MAC entity as the primary MAC entity instead of considering the current primary MAC entity as the primary MAC entity.

Thus, the MAC entity can be appropriately managed.

Note that in each of the above-described processing operations, a handover (also referred to as an MBB-HO) may be performed in a case that makeBeforeBreak-r16 is included in the configuration of the master cell group, whereas a change of the secondary cell group (also referred to as an MBB-SCG Change) may be performed in a case that makeBeforeBreak-r16 is included in the configuration of the secondary cell group.

The terminal apparatus may notify the base station apparatus of some or all of the pieces of (1) information indicating whether to support performance of the MBB-HO or MBB-SCG Change in which communication using two or more cell groups (e.g. Dual Connectivity or Multi Connectivity) is maintained, (2) information indicating whether to support the performance of the MBB-HO in which communication using two or more cell groups (e.g. Dual Connectivity) is maintained, (3) information indicating whether to support the performance of the MBB-SCG Change in which communication using two or more cell groups (e.g. Dual Connectivity) is maintained, and (4) information indicating whether to support both the MBB-HO and MBB-SCG Change in which Dual Connectivity is maintained. For example, the information may be included in a message (for example, UECapabilityInformation) notifying the base station apparatus 3 of the radio access capability of the terminal apparatus. The information may be notified as information that is not dependent on the band combination supported by the terminal apparatus. In addition, the information may be notified as information for each band combination supported by the terminal apparatus. The information need not necessarily be notified to the base station apparatus.

The terminal apparatus may release one or more cell groups other than the MCG and perform the MBB-HO. The terminal apparatus may perform the above-described MBB-HO in a case that the terminal apparatus does not support the performance of the MBB-HO in which communication using two or more cell groups is maintained. The terminal apparatus may release one or more cell groups other than the MCG and perform the MBB-SCG Change. The terminal apparatus may perform the above-described MBB-SCG Change in a case that the terminal apparatus does not support the performance of the MBB-SCG Change in which communication using two or more cell groups is maintained. The terminal apparatus may perform a normal change of the secondary cell group (SCG Change) instead of the MBB-SCG Change. The terminal apparatus may perform the above-described change of the secondary cell group in a case that the terminal apparatus does not support the performance of the MBB-SCG Change in which communication using two or more cell groups is maintained. The SCG Change may be interpreted as SCG reconfiguration with sync. The handover (HO) may also be interpreted as MCG reconfiguration with sync.

FIG. 10 is an example of ASN.1 notation indicating the RRC connection reconfiguration message in EUTRA in FIG. 4. FIG. 11 is another example of the ASN.1 notification, illustrating the RRC connection reconfiguration message of the EUTRA in FIG. 4. FIG. 12 is an example of the ASN.1 notification, illustrating the RRC reconfiguration message of the NR in FIG. 4. FIG. 13 is another example of the ASN.1 notification, illustrating the RRC reconfiguration message of the NR in FIG. 4.

In FIG. 10 and FIG. 11, the information element represented by mobilityControlInfo is an information element including parameters related to mobility to the EUTRA for network control. Some or all of the pieces of information from (A) to (H) below may be included in the information element represented by mobilityControlInfo.

(A) Target physical cell identity of the target, (B) t304 indicating information of the time from start to expiration of the timer T304, (C) newUE-identity indicating a new identifier (C-RNTI) of the UE 122, (D) Radio resource configuration, (E) Configuration of a dedicated random access channel, (F) makeBeforeBreak-r14 corresponding to a parameter for configuring the existing (Release14) make before break-handover, (G) rack-Skip-r14 corresponding to a parameter for configuring a RACH-less handover, and (H) makeBeforeBreak-r16 corresponding to a parameter for configuring a make before break-handover according to the present embodiment.

FIG. 10 illustrates an example where makeBeforeBreak-r16 is of an enumerated type, and FIG. 11 illustrates an example where makeBeforeBreak-r16 has, as a value, MakeBeforeBreak-r16 of the information element, and MakeBeforeBreak-r16 of the information element includes multiple fields.

In FIG. 12 and FIG. 13, the information element represented by Reconfiguration With Sync is an information element including, for example, parameters related to handover of the PCell and the addition or change of the PSCell. The information element represented by Reconfiguration With Sync may include some or all of the pieces of information from (A) to (F) below.

(A) Configuration of SpCell,
(B) t304 indicating information of the time from start to expiration of the timer T304,
(C) newUE-identity indicating a new identifier (RNTI) of the UE 122,
(D) Configuration of a dedicated random access channel,
(E) makeBeforeBreak-r16 corresponding to a parameter for configuring a make before break-handover according to the present embodiment, and
(F) rack-Skip-r16 corresponding to a parameter for configuring a RACH-less handover.

FIG. 12 illustrates an example where makeBeforeBreak-r16 is of an enumerated type, and FIG. 13 illustrates an example where makeBeforeBreak-r16 has, as a value, MakeBeforeBreak-r16 of the information element, and MakeBeforeBreak-r16 of the information element includes multiple fields.

Some or all of the fields illustrated in FIGS. 10 to 13 may be optional. In other words, the fields illustrated in FIGS. 10 to 13 may be included in the message depending on the condition.

Note that the eNB 102 or the gNB 108 may be allowed to provide a configuration as to whether to apply a make before break-handover (MBB-HO) for each radio bearer. In a case that a configuration as to whether to apply a make before break-handover is performed for each radio bearer, a parameter related to the make before break-handover may be configured below (in a layer below) the radio bearer configuration (information element indicated by SRB-ToAdd-Mod and/or information element indicated by DRB-ToAddMod) or may be present below an information element indicated by PDCP-Config. In a case that a configuration as to whether to apply a make before break-handover is performed for each radio bearer, the information of the radio bearer to which the make before break-handover is applied may be allowed to be present above (in a layer above) the radio bearer configuration instead of allowing the parameter related to the make before break-handover to be present below the radio bearer configuration or the information element indicated by PDCP-Config.

FIG. 20 illustrates an example of ASN.1 depicting a parameter (information element or field) for a configuration as to whether to apply a make before break-handover (MBB-HO) to the radio bearer to be established or configured according to each embodiment of the present invention. In FIG. 20, an example is illustrated in which a parameter is present below PDCP-Config, the parameter being used to provide a configuration as to whether to apply a make before break-handover to the radio bearer to be established or configured. However, the parameter may be present anywhere as long as the parameter is located below the radio bearer configuration. Note that "whether to apply a make before break-handover to the radio bearer to be established or configured" described above may be interpreted as a similar expression such as "whether the radio bearer to be established or configured performs a make before break-handover." Also, "whether to apply a make before break-handover to the radio bearer to be established or configured" described above may be interpreted as "whether to apply a make before break-handover to a PDCP entity," or "whether the PDCP entity performs a make before break-handover," or "the PDCP entity has a first configuration and a second configuration." The first configuration described above may be a source (handover source) configuration in the handover. Additionally, the second configuration described above may be a target (handover destination) configuration in the handover. In addition, the first configuration described above may be a primary configuration. Additionally, the second configuration described above may be a secondary configuration. Any other expression may be used as long as the expression means that a make before break-handover is performed with both source and target configured for one PDCP entity and/or both primary a secondary configurations performed for one PDCP entity.

In the example in FIG. 20, a field expressed by mbb-drb is used as a parameter as to "whether to apply a make before break-handover to the radio bearer to be established or configured." However, a field and/or information element with any other name may be used. FIG. 20(A) illustrates an example in which mbb-drb is of an enumerated type, and FIG. 20(B) illustrates an example in which mbb-drb has the information element MBB-DRB as a value and in which the information element MBB-DRB includes one or more fields. In FIG. 20(A), in a case that the information element includes a field expressed by mbb-drb or that the field is true, this may indicate that a make before break-handover is applied to the PDCP entity configured by this PDCP-Config and/or the radio bearer to which the PDCP entity is linked. In FIG. 20(B), the MBB-DRB information element includes, as a configuration for the handover destination, some or all of an identifier (field labeled targetCellGroupIdId) of a cell group corresponding to the handover destination, and a logical channel identifier (field labeled targetLogicalChannelIdentity) linked with this PDCP entity at the handover destination, and other parameters (not illustrated).

Note that the parameter may be as follows: the field expressed by mbb-drb as illustrated in FIG. 20 is optionally present only in a case that a parameter equivalent to makeBeforeBreak-r16 illustrated in the example in FIGS. 10 to 13 is configured, whereas the field expressed by mbb-drb is not present in a case that no parameter equivalent to makeBeforeBreak-r16 illustrated in the example in FIGS. 10 to 13 is configured.

FIG. 21 illustrates an example of ASN.1 in which the information of the radio bearer to which a make before break-handover is applied is present above the radio bearer configuration. As illustrated in FIG. 21, as one of the parameters of information elements of MakeBeforeBreak-r16 (e.g., parameterA or parameterB illustrated in FIG. 11 and/or FIG. 13), the information of the radio bearer to which a make before break-handover is applied may be present. In the example in FIG. 21, as parameters for the "information of the radio bearer to which a make before break-handover is applied," the fields expressed by mbb-drb and mbb-drbList (list of mbb-drb) are used. However, fields and/or information elements with any other names may be used. As illustrated in FIG. 21, the above-described information of the radio bearer to which a make before break-handover is applied may include some or all of a radio bearer identity (field expressed by drb-Identity) of the above-described radio bearer to which a make before break-handover is applied, and the identifier (field labeled targetCellGroupId) of the cell group corresponding to the handover destination, and the logical channel identifier (field labeled targetLogicalChannelIdentity) linked to this PDCP entity at the handover destination, and other parameters (not illustrated). In the example illustrated in FIG. 21, in a case that no parameter for the "information of the radio bearer to which a make before break-handover is applied," the make before break-handover may be applied to all of the radio bearers or all of the data radio bearers. Furthermore, although only the information of the data radio bearer (DRB) is illustrated as the "information of the radio bearer to which a make before break-handover is applied" in FIG. 21, information of a signaling radio bearer (SRB) may be included.

Figure 5:
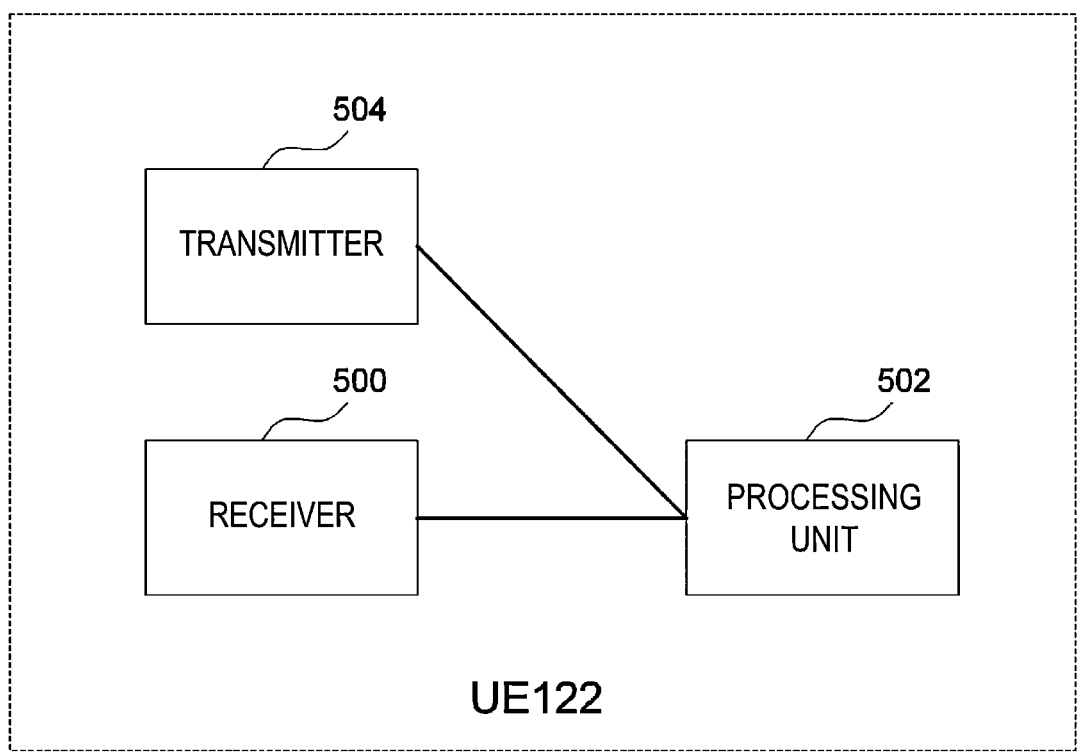
FIG. 5 is a block diagram illustrating a configuration of a terminal apparatus according to each embodiment of the present invention.

FIG. 5 is a block diagram illustrating a configuration of the terminal apparatus (UE 122) according to each embodiment of the present invention. Note that FIG. 5 illustrates only the main components closely related to an aspect of the present invention in order to avoid complexity of description.

The UE 122 illustrated in FIG. 5 includes a receiver 500 configured to receive an RRC message and the like from a base station apparatus, a processing unit 502 configured to perform processing in accordance with any or all of pieces of configuration information such as various information elements (IEs), various fields, and various conditions included in the message received, and a transmitter 504 configured to transmit the RRC message and the like to the base station apparatus. The above-described base station apparatus may be the eNB 102 or the gNB 108. The processing unit 502 may include some or all of the functions of various layers (e.g., a physical layer, a MAC layer, an RLC layer, a PDCP layer, an RRC layer, and an NAS layer). In other words, the processing unit 502 may include some or all of a physical layer processing unit, a MAC layer processing unit, an RLC layer processing unit, a PDCP layer processing unit, an RRC layer processing unit, and an NAS layer processing unit.

Figure 6:
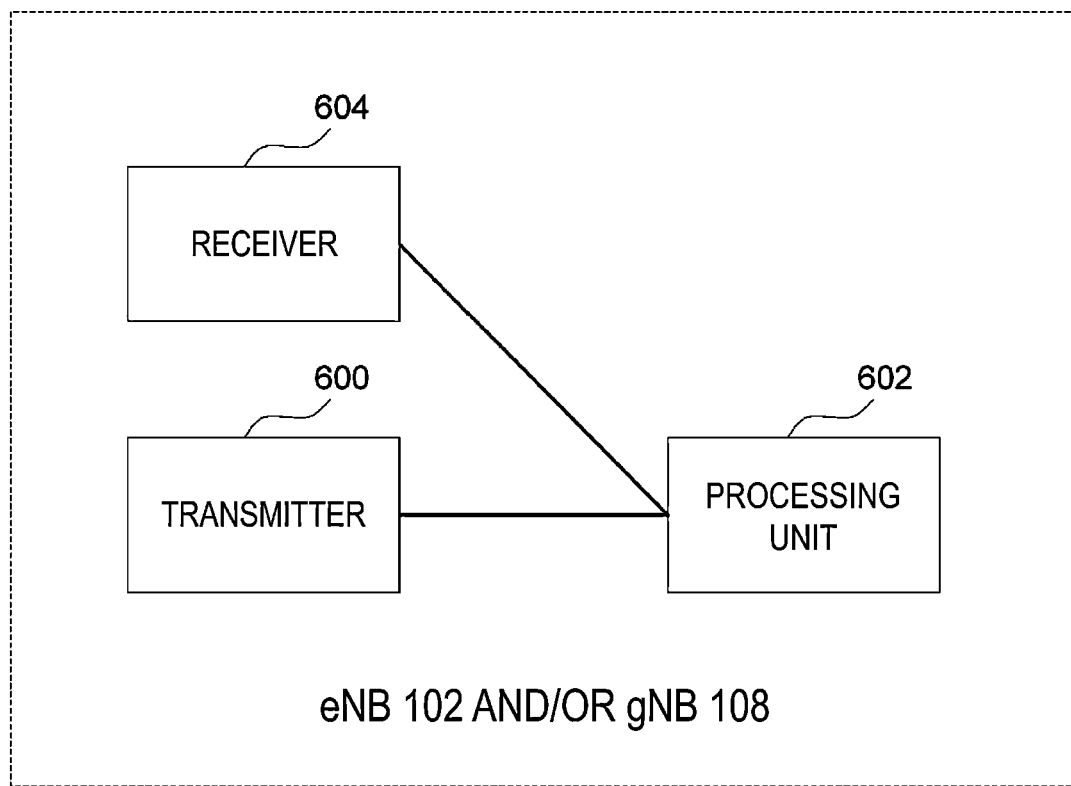
FIG. 6 is a block diagram illustrating a configuration of a base station apparatus according to each embodiment of the present invention.

FIG. 6 is a block diagram illustrating a configuration of the base station apparatus according to each embodiment of the present invention. Note that FIG. 6 illustrates only the main components closely related to one aspect of the present invention in order to avoid complexity of description. The above-described base station apparatus may be the eNB 102 or the gNB 108.

The base station apparatus illustrated in FIG. 6 includes a transmitter 600 configured to transmit an RRC message and the like to the UE 122, a processing unit 602 configured to create an RRC message including any or all of pieces of configuration information such as various information elements (IEs), various fields, and various conditions and to transmit the RRC message to the UE 122 to cause the processing unit 502 of the UE 122 to perform processing, and a receiver 604 configured to receive the RRC message and the like from the UE 122. Furthermore, the processing unit 602 may include some or all of the functions of various layers (e.g., the physical layer, the MAC layer, the RLC layer, the PDCP layer, the RRC layer, and the NAS layer). In other words, the processing unit 602 may include some or all of the physical layer processing unit, the MAC layer processing unit, the RLC layer processing unit, the PDCP layer processing unit, the RRC layer processing unit, and the NAS layer processing unit.

Figure 22:
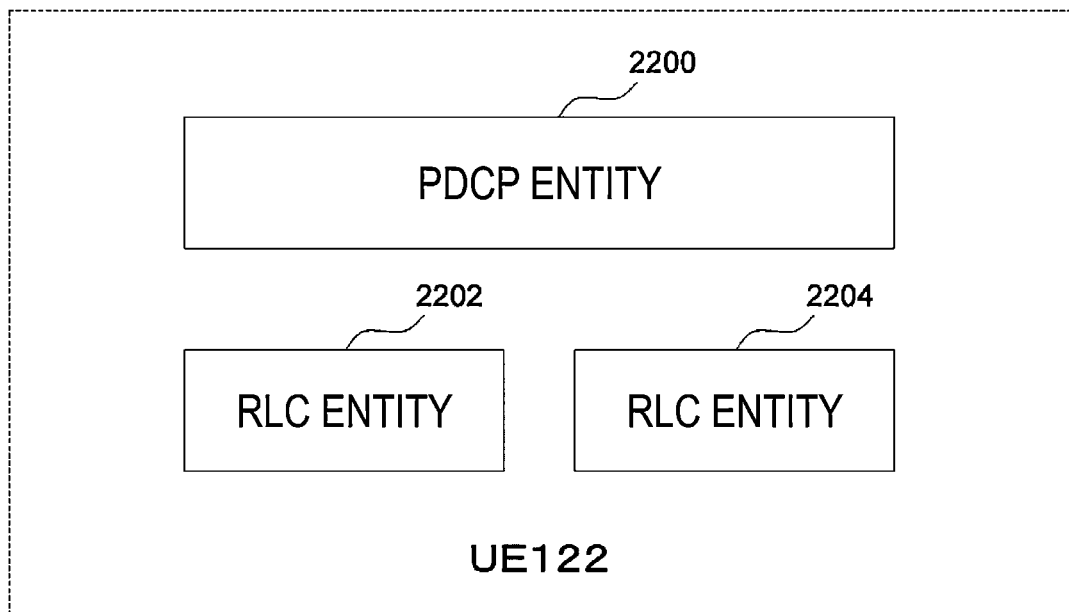
FIG. 22 is a block diagram illustrating a structure of a protocol configured for UE 122 according to each embodiment of the present invention.

FIG. 22 is a block diagram illustrating a structure of a protocol established and/or configured in the UE 122 according to each embodiment of the present invention. Note that FIG. 22 illustrates only the main components closely related to an aspect of the present invention in order to avoid complexity of description. The UE 112 illustrated in FIG. 22 is established and/or configured with a PDCP entity 2200, an RLC entity 2202, and an RLC entity 2204. Note that the PDCP entity 2200, RLC entity 2202, and RLC entity 2204 may be present only in a case that the RRC layer, corresponding to an upper layer, is established and/or configured instead of being always present. Additionally, the RLC entity 2202 and/or the RLC entity 2204 are not limited to one RLC entity, and may be multiple RLC entities. Note that the PDCP entity may be interpreted as a PDCP layer or may be interpreted as a PDCP. Additionally, one or multiple PDCP sub-entities may be present in the PDCP entity 2202 to perform some functions of the PDCP. In addition, the RLC entity may also be interpreted as an RLC layer or an RLC. The RLC entity 2202 may be part of a first RLC bearer, and the RLC 2204 may be part of a second RLC bearer different from the first RLC bearer. In each embodiment of the present invention, the RLC entity 2202 and the RLC entity 2204 may respectively be interpreted as the RLC bearer 2202 and the RLC bearer 2204. Additionally, the RLC entity 2202 may be linked to a first cell group, or the RLC 2204 may be linked to a second cell group different from the first cell group. In each embodiment of the present invention, the RLC entity 2202 and the RLC entity 2204 may be interpreted as the cell group 2202 and a cell group 2204. Additionally, a first MAC entity may be present in the first cell group, and a second MAC entity different from the first MAC entity may be present in the second cell group.

Now, with reference to FIG. 4 and FIGS. 22 to 26, processing of the protocol in the UE 122 in an embodiment of the present invention will be described.

In FIG. 4, the RRC layer of eNB 102 or gNB 108 creates a message for reconfiguring the RRC connection (connection) (step S400) and transmits the message to the RRC layer of the UE 122 (step S402). In a case that the message for reconfiguring the RRC connection (connection) includes parameters associated with the PDCP, the RRC layer of UE 122 performs, according to the above-described parameters associated with the PDCP, establishment of a PDCP entity, configuration of the PDCP entity, issuance of a request to the PDCP entity, provision of a ciphering algorithm and a ciphering key to the PDCP entity, provision of an integrity protection algorithm and an integrity protection key to the PDCP entity, and the like. The above-described parameters associated with the PDCP may include parameters related to, in addition to the PDCP configuration (PDCP-Config), re-establishment, recovery, and security of the PDCP, and the like. In a case that the message for reconfiguring the RRC connection described above includes the application of a make before break-handover (MBB-HO), the RRC layer of UE 122 may provide a configuration for the MBB-HO to the PDCP entity linked to the radio bearer to which the MBB-HO is applied (step S404).

In step S404, in a case that the message for reconfiguring the RRC connection (connection) includes a parameter associated with the configuration of a cell group, the RRC layer of the UE 122 performs the configuration of the cell group and the like according to the parameter associated with the configuration of the cell group. For example, in a case that a parameter related to an RLC configuration or an RLC bearer is included as the above-described parameter associated with the configuration of a cell group, an RLC entity is established and/or configured. The RLC entity described above may be established in the above-described cell group in a case that no logical channel identifier is configured to which the above-described RLC configuration is linked. In a case that the RLC entity is established, the RRC layer of the UE 122 may associate any or all of the RLC entity, the RLC bearer, and the logical channel with the PDCP entity based on the above-described RLC configuration or the radio bearer identity to which the RLC bearer configuration is linked. In a case that the RRC layer of UE 122 associates any or all of the RLC entity, the RLC bearer, and the logical channel described above with the PDCP entity, the RRC layer may perform the association with the PDCP entity linked to the same radio bearer identity. The RRC layer of the UE 122 may associate any or all of the RLC entity, RLC bearer, and logical channel described above with a sub-entity of the PDCP entity. In a case that multiple sub-entities of the PDCP entity are present, information related to the sub-entity to be associated may be included in the above-described message for reconfiguring the RRC connection.

Figure 23:
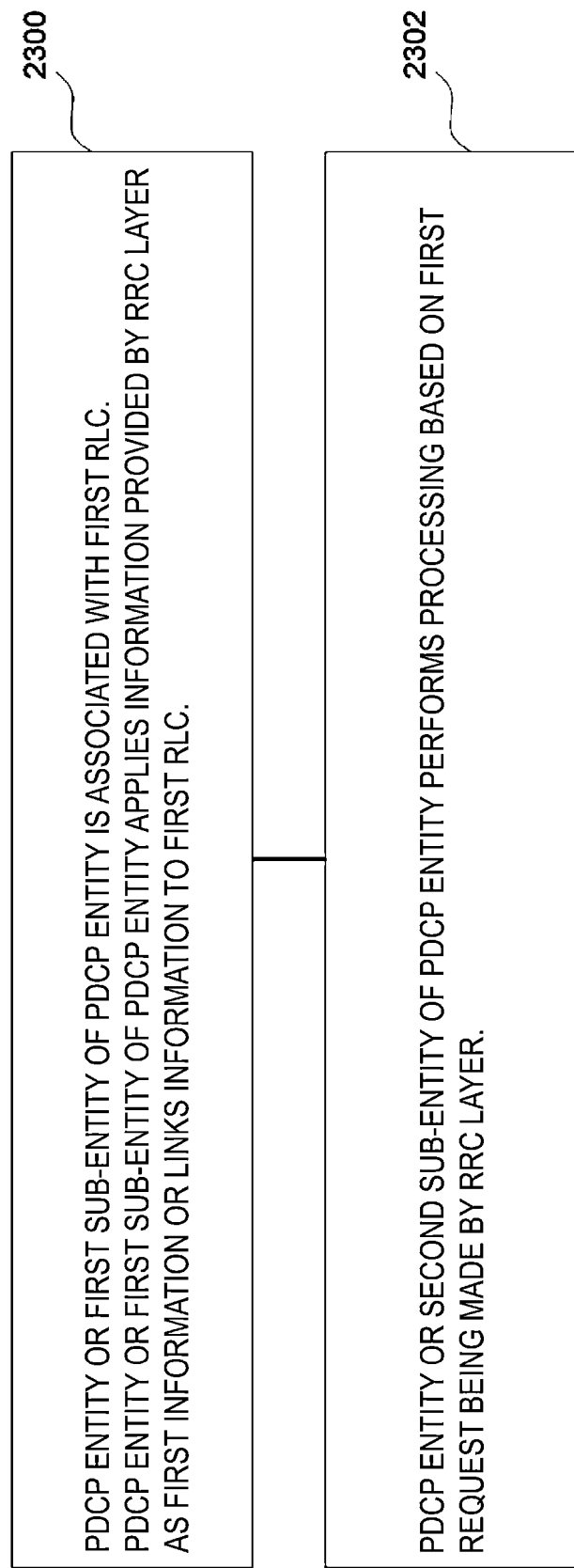
FIG. 23 is an example of a processing method performed by a PDCP entity 2200 according to each form of the present implementation.

FIG. 23 is an example of a processing method performed by a PDCP entity 2200 in each form of the present implementation. The PDCP entity 2200 or a first sub-entity (not illustrated) of the PDCP entity 2200 may be associated with the RLC entity 2202 as a first RLC entity. The PDCP entity 2200 may link, to the RLC entity 2202, some or all of the ciphering algorithm and ciphering key provided by the RRC layer, corresponding to the upper layer, the integrity protection algorithm and integrity protection key provided by the RRC layer, corresponding to the upper layer, the state of header compression (RoHC), and other information. Additionally, some or all of the pieces of information linked to the RLC entity 2202 and including the ciphering algorithm and ciphering key provided by the RRC layer, corresponding to the upper layer, the integrity protection algorithm and integrity protection key provided by the RRC layer, corresponding to the upper layer, the state of header compression (RoHC), and other information may be applied as first information, that is, a first ciphering algorithm and a first ciphering key, a first integrity protection algorithm and a first integrity protection key, and a first state of header compression (RoHC) (step S2300).

Then, the PDCP entity 2200 or a second sub-entity of the PDCP entity 2200 may perform some or all of the following processing operations (A) to (G) based on a first request being made by the RRC layer, corresponding to the upper layer. Note that the above-described second sub-entity of the PDCP entity 2200 may be established and/or configured based on the first request being made by the RRC layer, corresponding to the upper layer. Step S2302

(A) The RLC entity 2204 linked to the PDCP entity 2200 is considered as a second RLC entity, and/or the second sub-entity of the PDCP entity 2200 is linked to the RLC entity 2204.

(B) The information linked to the RLC entity 2202 in step S2300 (some or all of the ciphering algorithm and ciphering key, the integrity protection algorithm and integrity protection key, the RoHC state, and other information) is held as the first information, that is, some or all of the first ciphering algorithm and first ciphering key, the first integrity protection algorithm and first integrity protection key, and the first RoHC state.

(C) A ciphering algorithm and a ciphering key provided by the upper layer are applied as a second ciphering algorithm and a second ciphering key and/or linked to the RLC entity 2204.

(D) An integrity protection algorithm and an integrity protection key provided by the upper layer are applied as a second integrity protection algorithm and a second integrity protection key and/or linked to the RLC entity 2204.

(E) A header compression protocol is initiated in a No Context (NC) state in a unidirectional mode (U-mode) as a second RoHC state for downlink reception from the RLC entity 2204.

(F) The header compression protocol is initiated in an Initialization and Refresh (IR) state in a unidirectional mode (U-mode) as a second RoHC state for uplink reception to the RLC entity 2204.

(G) Any other processing.

Note that processing of (E) and/or (F) in step S2302 may be performed only in a case that the continuation of the header compression protocol is not configured by the RRC layer, corresponding to the upper layer. In a case that the continuation of the header compression protocol is configured by the RRC layer, corresponding to the upper layer, then in step S2302, the first RoHC state for downlink reception described above and the first RoHC state for uplink transmission described above may respectively be copied to the second RoHC state for downlink reception and the second RoHC state for uplink transmission, or instead of the first RoHC state and the second RoHC state into which the RoHC state is split, a common RoHC state may be provided. Note that, even in a case that the continuation of the header compression protocol is not configured by the RRC layer, corresponding to the upper layer, instead of the first RoHC state and the second RoHC state into which the RoHC state is split, a common RoHC state may be provided. Based on the first request described above, instead of the first RoHC state and the second RoHC state into which the RoHC state is split, a common RoHC state may be provided. In a case that instead of the first RoHC state and the second RoHC state into which the RoHC state is split, a common RoHC state is provided in step S2302, then the first RoHC state and the second RoHC state may be interpreted as a common RoHC state in step S2400 described below and in step S2500 described below.

In step S2302, the first request may be a request for performing an MBB-HO, or may be a request for re-establishment of the PDCP entity. Also in step 2302, in response to receiving the first request from the upper layer, the PDCP entity 2200 may perform some or all of the processing operations (A) to (G) in step S2302 described above, based on the first configuration having been performed for the PDCP entity 2200 having received the first request described above or the radio bearer to which the PDCP entity 2200 having received the first request is linked. The first configuration described above may refer to the configuration for the MBB-HO having been performed by the RRC layer, corresponding to the upper layer. The configuration for the MBB-HO described above may refer to adaptation of the MBB-HO, or configuration for some or all of the second RLC entity, the second RLC bearer, the second logical channel, and the second cell group.

Also in step 2302, in response to receiving the first request from the upper layer, the PDCP entity 2200 may further perform some or all of (H) to (S) below based on the above-described first configuration not having been performed for the PDCP entity 2200 having received the first request described above or the radio bearer to which the PDCP entity 2200 having received the first request is linked.

(H) The header compression protocol is reset for downlink reception from the RLC entity 2204 and initiated in the No Context (NC) state in the unidirectional mode (U-mode). This processing may be performed in a case that the continuation of the header compression protocol is not configured by the RRC layer, corresponding to the upper layer.

(I) The header compression protocol is reset for uplink reception from the RLC entity 2204 and initiated in the Initialization Refresh (IR) state in the unidirectional mode (U-mode). This processing may be performed in a case that the continuation of the header compression protocol is not configured by the RRC layer, corresponding to the upper layer.

(J) On the transmission side, for the UM DRB, TX_NEXT (a variable meaning a COUNT value or sequence number to be assigned to the next PDCP SDU in a case that the PDCP SDU is transmitted) is set to an initial value.
- (K) During processing of the first request, the ciphering algorithm and ciphering key provided from the upper layer are applied.
- (L) During processing of the first request, the integrity protection algorithm and integrity protection key provided by the upper layer are applied.
- (M) On the transmission side, for the UM DRB, the PDCP SDUs to which sequence numbers are assigned but which have not been transmitted to a lower layer as PDCP PDUs are considered to have been received from the upper layer, and are transmitted in the order of the COUNT values assigned before processing of the first request. In this case. a timer for deleting the transmitted PDCP SDUs need not be restarted.
- (N) On the transmission side, for the AM DRB, the PDCP SDUs for which successful transmission from the lower layer has not been confirmed are transmitted or re-transmitted in the order of the COUNT values assigned before processing of the first request. In this case, header compression may be performed. Additionally, in this case, the assigned COUNT values may be used for ciphering and/or integrity protection.
- (O) On the reception side, the first request is processed to process PDCP DATA PDUs received from the lower layer.
- (P) On the reception side, for the UM DRB, the stored PDCP SDUs are delivered to the upper layer in the order of COUNT values. In this case, header decompression may be performed. The present processing may also be performed in a case that a re-ordering timer is running or that re-ordering is configured. In a case that the re-ordering timer described above is running, the re-ordering timer described above may be stopped and reset.
- (Q) On the reception side, for the AM DRB, header decompression is performed on all the stored PDCP PDUs. This processing may be performed in a case that the continuation of the header compression protocol is not configured by the RRC layer, corresponding to the upper layer.
- (R) On the reception side, for the UM DRB, RX_NEXT (a variable meaning the COUNT value of the next PDCP SDU expected to be received), and/or RX_DELIV (variable meaning the COUNT value of the first one of the PDCP SDUs that have not been delivered to the upper layer and that are waiting for reception) is configured with the initial value.
- (S) Any other processing.

Also in step 2302, in response to receiving the first request described above from the upper layer, the first sub-entity of the PDCP entity 2200 and/or the second sub-entity of the PDCP entity 2200 may perform some or all of (H) to (S) below.
- (H) The header compression protocol is initiated in the No Context (NC) state in the unidirectional mode (U-mode) for downlink reception. This processing may be performed in a case that the continuation of the header compression protocol is not configured by the RRC layer, corresponding to the upper layer.
- (I) The header compression protocol is initiated in the Initialization Refresh (IR) state in the unidirectional mode (U-mode) for uplink transmission. This processing may be performed in a case that the continuation of the header compression protocol is not configured by the RRC layer, corresponding to the upper layer.
- (J) On the transmission side, for the UM DRB, TX_NEXT (a variable meaning a COUNT value or sequence number to be assigned to the next PDCP SDU in a case that the PDCP SDU is transmitted) is set to an initial value.
- (K) During processing of the first request, the ciphering algorithm and ciphering key provided from the upper layer are applied.
- (L) During processing of the first request, the integrity protection algorithm and integrity protection key provided by the upper layer are applied.
- (M) On the transmission side, for the UM DRB, the PDCP SDUs to which sequence numbers are assigned but which have not been transmitted to a lower layer as PDCP PDUs are considered to have been received from the upper layer, and are transmitted in the order of the COUNT values assigned before processing of the first request. In this case. the timer for deleting the transmitted PDCP SDUs need not be restarted.
- (N) On the transmission side, for the AM DRB, the PDCP SDUs for which successful transmission from the lower layer has not been confirmed are transmitted or re-transmitted in the order of the COUNT values assigned before processing of the first request. In this case, header compression may be performed. Additionally, in this case, the assigned COUNT values may be used for ciphering and/or integrity protection.
- (O) On the reception side, the first request is processed to process PDCP DATA PDUs received from the lower layer.
- (P) On the reception side, for the UM DRB, the stored PDCP SDUs are delivered to the upper layer in the order of COUNT values. In this case, header decompression may be performed. The present processing may also be performed in a case that a re-ordering timer is running or that re-ordering is configured. In a case that the re-ordering timer described above is running, the re-ordering timer described above may be stopped and reset.
- (Q) On the reception side, for the AM DRB, header decompression is performed on all the stored PDCP PDUs. This processing may be performed in a case that the continuation of the header compression protocol is not configured by the RRC layer, corresponding to the upper layer.
- (R) On the reception side, for the UM DRB, RX_NEXT (a variable meaning the COUNT value of the next PDCP SDU expected to be received), and/or RX_DELIV (variable meaning the COUNT value of the first one of the PDCP SDUs that have not been delivered to the upper layer and that are waiting for reception) is configured with the initial value.
- (S) Any other processing.

Note that these processing operations may be performed based on the first configuration described above having been performed.

Also, in step S2302, the first sub-entity, the first RLC entity, the first information (the first ciphering algorithm and first ciphering key, the first integrity protection algorithm and first integrity protection key, the first RoHC state, and the first other information) may refer to a sub-entity, an RLC entity, and information for the handover source and/or for the cell group of the handover source in the MBB-HO, and/or a primary sub-entity, a primary RLC entity, and primary information. Also in step S2302, the second sub-entity, the second RLC entity, and the second information (the second ciphering algorithm and second ciphering key, the second integrity protection algorithm and second integrity protection key, the second RoHC state, and the second other information) may refer to a sub-entity, an RLC entity, and information for the handover destination (target) and/or the cell group of the handover destination in the MBB-HO, and/or a secondary sub-entity, a secondary RLC entity, and secondary information.

Additionally, some or all of the processing operations (A) to (G) in step S2302 may be performed without the basis of the first request made from the RRC layer, corresponding to the upper layer.

FIG. 24 is an example of a downlink reception processing method performed by the PDCP entity 2200 in each form of the present implementation. Note that step S2400 described below may be performed based on part or all of steps S2300 and S2302 described above having been performed, or may further be performed after part or all of steps S2300 and S2302 described above are performed.

The PDCP entity 2200, the first sub-entity of the PDCP entity 2200, and the second sub-entity of the PDCP entity 2200 in step S2400 described below may respectively be the PDCP entity 2200, the first sub-entity of the PDCP entity 2200, and the second sub-entity of the PDCP entity 2200 described in part or all of steps S2300 and S2302 described above. The first RLC entity and the second RLC entity in step S2400 described below may respectively be the first RLC and the second RLC entity described in part or all of steps S2300 and S2302 described above. The first ciphering algorithm, and first ciphering key, and the second ciphering algorithm and second ciphering key in step S2400 described below may respectively be the first ciphering algorithm and first ciphering key, and the second ciphering algorithm and second ciphering key described in part or all of steps S2300 and S2302 described above. The first integrity protection algorithm and first integrity protection key, and the second integrity protection algorithm and second integrity protection key in step S2400 described below may respectively be the first integrity protection algorithm and first integrity protection key, and the second integrity protection algorithm and second integrity protection key described in part or all of step S2300 and step S2302 described above. The first RoHC state and the second RoHC state in step S2400 described below may respectively be the first RoHC state and a second RoHC state described in part or all of steps S2300 and S2302 described above.

In response to receiving PDCP data PDUs from the first RLC entity described above, the PDCP entity 2200 described above may perform some or all of the processing operations in (A) to (C) and (G) below, or the first sub-entity of PDCP entity 2200 described above may perform some or all of the processing operations in (A) to (C) and (G) below. In response to receiving PDCP data PDUs from the second RLC entity described above, the PDCP entity 2200 described above may perform some or all of the processing operations in (D) to (G) below, or the second sub-entity of PDCP entity 2200 described above may perform some or all of the processing operations in (A) to (C) and (G) below.

Step S2400

(A) Decoding is performed by using the first ciphering algorithm described above, the first ciphering key described above, and the COUNT values obtained from the headers of the PDCP DATA PDUs received from the first RLC entity described above.

(B) Integrity verification is performed by using the first integrity protection algorithm described above, the first integrity protection key described above, and the COUNT values obtained from the headers of PDCP data PDUs received from the first RLC entity described above.

(C) Header decompression is performed by using the first RoHC state described above.

(D) Decoding is performed by using the second ciphering algorithm described above, the second ciphering key described above, and the COUNT values obtained from the headers of the PDCP data PDUs received from the second RLC entity described above.

(E) Integrity verification is performed by using the second integrity protection algorithm described above, the second integrity protection key described above, and the COUNT values obtained from the headers of PDCP data PDUs received from the second RLC entity described above.

(F) Header decompression is performed by using the second RoHC state described above.

(G) Any other processing.

Note that (G) any other processing may or may not include some or all of "the COUNT value is identified by using a receive window value," "in a case that the identified COUNT value is less than the COUNT value of the initial PDCP SDU not delivered to the upper layer yet or that a PDCP Data PDU with the same COUNT value as the identified COUNT value has already been received, the PDCP Data PDU is discarded," and "in response to a failure in the integrity verification, the failure in the integrity verification is notified to the upper layer."

In step S2400, in (C) or (F), re-ordering may be performed before or after header decompression is performed, or both before and after header decompression is performed. Re-ordering may be processing for storing PDCP SDUs in a receive buffer and delivering the PDCP SDUs to the upper layer in the order of the COUNT values obtained from header information of PDCP data PDUs. Additionally, re-ordering may be processing including processing for delivering, in a case that the COUNT value of the PDCP Data PDU received is the COUNT value of the initial PDCP SDU not delivered to the upper layer yet, the stored PDCP SDUs to the upper layer in the order of COUNT values. The re-ordering described above may be performed in a re-ordering sub-entity (not illustrated) of the PDCP entity 2200. Along with the PDCP SDUs subjected to header decompression, the COUNT values of the PDCP SDUs may be passed to the re-ordering sub-entity of the PDCP entity 2200 described above by the first sub-entity of the PDCP entity 2200 described above and/or the second sub-entity of the PDCP entity 2200 described above.

Additionally, in step S2400, the first sub-entity of PDCP entity 2200 described above and/or the second sub-entity of PDCP entity 2200 described above may perform some or all of the processing operations (H) to (M) below based on the respective sub-entity configurations.

(H) The receive window value is used to identify the COUNT value.

(I) Decoding is performed by using the identified COUNT value.

(J) The identified COUNT value is used to perform integrity verification. In response to a failure in the integrity verification, the failure in the integrity verification is notified to the upper layer.

(K) In a case that the identified COUNT value is less than the COUNT value of the initial PDCP SDU not delivered to the upper layer yet, or that a PDCP Data PDU with the same COUNT value as the identified COUNT value has already been received, the PDCP Data PDU is discarded.

(L) Re-ordering processing is performed, and in a case that the header decompression has not been performed, header decompression is performed, and the PDCP SDUs are delivered to the upper layer.

(M) Any other processing.

Note that the processing of step S2400 may be performed based on the first configuration performed for the PDCP entity 2200 described above or the radio bearer to which the PDCP entity 2200 is linked. The first configuration described above may correspond to the first configuration in step S2302 described above. In other words, the first configuration may refer to the RRC layer, corresponding to the upper layer, performing the configuration for the MBB-HO. The configuration for the MBB-HO described above may refer to adaptation of the MBB-HO, or configuration for some or all of the second RLC entity, the second RLC bearer, the second logical channel, and the second cell group. In a case that the first configuration described above is performed on the PDCP entity 2200 described above or the radio bearer to which the PDCP entity 2200 described above is linked, then out of order delivery may be always configured. The configuration of the out of order delivery may include configuration for avoiding performing, in the MBB-HO, re-ordering before the header decompression is performed.

Also in step S2400, the first sub-entity, the first RLC entity, the first ciphering algorithm and the first ciphering key, the first integrity protection algorithm and the first integrity protection key, and the first RoHC state may correspond to the sub-entity, RLC entity, ciphering algorithm and ciphering key, integrity protection algorithm and integrity protection key, and RoHC state for the handover source of the MBB-HO and/or for the cell group of the handover source, and/or the primary sub-entity, RLC entity, ciphering algorithm and ciphering key, integrity protection algorithm and integrity protection key, and RoHC state. Also in step S2400, the second sub-entity, the second RLC entity, the second ciphering algorithm and the second ciphering key, the second integrity protection algorithm and the second integrity protection key, the second RoHC state may correspond to the sub-entity, RLC entity, ciphering algorithm and ciphering key, integrity protection algorithm and integrity protection key, and RoHC state for the handover target of the MBB-HO and/or for the cell group of the handover target, and/or the secondary sub-entity, RLC entity, ciphering algorithm and ciphering key, integrity protection algorithm and integrity protection key, and RoHC state.

Figure 25:
FIG. 25 is an example of an uplink transmission processing method performed by the PDCP entity 2200 according to each form of the present implementation.

FIG. 25 is an example of an uplink transmission processing method performed by the PDCP entity 2200 in each form of the present implementation. Note that step 2500 described below may be performed based on part or all of steps S2300 and S2302 described above having been performed or may further be performed after part or all of steps S2300 and S2302 described above are performed.

The PDCP entity 2200, the first sub-entity of the PDCP entity 2200, and the second sub-entity of the PDCP entity 2200 in step S2500 described below may respectively correspond to the PDCP entity 2200, the first sub-entity of PDCP entity 2200, and the second sub-entity of PDCP entity 2200 illustrated in part or all of steps S2300 and S2302 described above. The first RLC entity and the second RLC entity in step S2500 described below may respectively correspond to the first RLC and the second RLC entity illustrated in part or all of steps S2300 and S2302 described above. The first ciphering algorithm, the first ciphering key, the second ciphering algorithm, and the second ciphering key in step S2500 described below may respectively correspond to the first ciphering algorithm, the first ciphering key, the second ciphering algorithm, and the second ciphering key illustrated in part or all of steps S2300 and S2302 described above. The first integrity protection algorithm, the first integrity protection key, the second integrity protection algorithm, and the second integrity protection key in step S2500 described below may respectively correspond to the first integrity protection algorithm, the first integrity protection key, the second integrity protection algorithm, and the second integrity protection key illustrated in part or all of steps S2300 and S2302 described above. The first RoHC state and the second RoHC state in step S2500 described below may respectively correspond to the first RoHC state and the second RoHC state illustrated in part or all of steps S2300 and S2302 described above.

In a case that the second request has not been detected, the PDCP entity 2200, or the first sub-entity of the PDCP entity 2200 may perform some or all of the processing operations (A) to (D) and (I) described below, for the PDCP SDU received from the upper layer. Based on detection of the second request, the PDCP entity 2200 or the second sub-entity of the PDCP entity 2200 may perform some or all of the processing operations (E) to (I) described below, for the PDCP SDU received from the upper layer. Step S2500

(A) Header compression is performed using the first header compression processing described above.

(B) Ciphering is performed by using the first ciphering algorithm described above, the first ciphering key described above, and the COUNT value linked to the PDCP SDU described above.

(C) Integrity protection is performed by using the first integrity protection algorithm described above, the first integrity protection key described above, and the COUNT value linked to the PDCP SDU described above.

(D) The PDCP PDU created is delivered to the first RLC entity described above.

(E) Header compression is performed by using the second header compression processing described above.

(F) Ciphering is performed by using the second ciphering algorithm described above, the second ciphering key described above, and the COUNT value linked to the PDCP SDU described above.

(G) Integrity protection is performed by using the second integrity protection algorithm described above, the second integrity protection key described above, and the COUNT value linked to the PDCP SDU described above.

(H) The PDCP PDU created is delivered to the second RLC entity described above.

(I) Any other processing.

Note that in a case that in (D) and/or (H), multiple associated RLC entities are present, the PDCP entity 2200, or the first sub-entity of the PDCP entity 2200, or the second sub-entity of the PDCP entity 2200 may perform part or all of (D-1), (H-1) and (D-2), (H-2).

(D-1), (H-1) In a case that PDCP duplication is activated, a PDCP Data PDU is duplicated and resultant PDCP Data PDUs are submitted to both associated RLC entities, and a PDCP Control PDU is submitted to the primary RLC entity.

(D-2), (H-2) With PDCP duplication not activated, in a case that the two associated RLC entities belong to different cell groups and that the total amount of RLC data volume and the total amount of PDCP data volume and RLC data volume of the two associated RLC entities, the data volumes being pending for initial transmission, is more than or equal to a threshold for uplink data, then the PDCP PDU is submitted to the primary RLC entity or to the secondary RLC entity, and otherwise (in a case that the two associated RLC entities belong to different same cell group and/or the total amount of PDCP data volume and RLC data volume of the two associated RLC entities, the data volumes being pending for initial transmission, is less than the threshold for uplink data), then the PDCP PDU is submitted to the primary RLC entity.

Also, in step S2500, the PDCP entity 2200 or the first sub-entity of the PDCP entity 2200 may perform some or all of the processing operations (J) to (R) described below, based on the second request not having been detected, and the first sub-entity of the PDCP entity 2200 may perform some or all of the processing operations (J) to (R), based on the first information configured for the PDCP SDU received from the upper layer. Also, in step S2500, the PDCP entity 2200 or the second sub-entity of the PDCP entity 2200 is configured to, based on detecting the second request: The first sub-entity of the PDCP entity 2200 may perform some or all of the following processes (j) to (R) based on the second information configured for the PDCP SDU received from the upper layer.

(J) In a case that a discard timer is configured, the discard timer is started.
(K) The COUNT value corresponding to TX_NEXT (a variable meaning the COUNT value or the sequence number to be assigned to the next PDCP SDU in a case that the PDCP SDU is transmitted) is associated with the PDCP SDU received.
(L) Header compression is performed.
(M) Ciphering is performed by using TX_NEXT.
(N) Integrity protection is performed by using TX_NEXT.
(O) Calculate a sequence number from TX_NEXT and set the sequence number.
(P) Increase (increment) TX_NEXT by 1.
(Q) The PDCP Data PDU created is submitted to the lower layer as follows:
  (Q-1) In a case that one RLC entity is associated with the sub-entity, the associated RLC entity is submitted to the PDCP PDU.
  (Q-2) In a case that two RLC entities are associated with the sub-entity:
    (Q-2-1) with the PDCP duplication activated, a PDCP Data PDU is duplicated, and resultant PDCP Data PDUs are submitted to both associated RLC entities, and a PDCP Control PDU is submitted to the primary RLC entity.
    (Q-2-2) With the PDCP duplication not activated, in a case that the two associated RLC entities belong to different cell groups and that the total amount of PDCP data volume and RLC data volume of the two associated RLC entities, the data volumes being pending for initial transmission, is more than or equal to the threshold for uplink data, then the PDCP PDU is submitted to the primary RLC entity or to the secondary RLC entity, and otherwise (in a case that the two associated RLC entities belong to different same cell group and/or the total amount of PDCP data volume and RLC data volume of the two associated RLC entities, the data volumes being pending for initial transmission, is less than the threshold for uplink data), then the PDCP PDU is submitted to the primary RLC entity.
(R) Any other processing.

In step S2500 described above, the second request detection method may be a method in which the second request is detected by being received from the upper layer or the lower layer. In step S2500 described above, the second request detection method may be a method in which the second request is detected by expiry of a timer configured in the PDCP entity 2200 to detect the second request. In step S2500 described above, the second request detection method may be a method in which the second request is detected by implementation of a terminal apparatus.

Note that in step S2500 described above, the second request may be a request to switch, in the transmission processing, a submission destination for the PDCP PDU from the first RLC entity described above to the second RLC entity described above, or may be a request to perform the MBB-HO. Additionally, the second request described above may have a different name as long as the request means to switch, in the transmission processing, the submission destination for the PDCP PDU from the first RLC entity described above to the second RLC entity described above in a case that the MBB-HO is performed.

Note that the processing of step S2302 (F) described above may be performed after the second request described above is detected or immediately before the second request described above is detected.

Note that the processing of step S2500 may be performed based on the first configuration having been performed for the PDCP entity 2200 described above or the radio bearer to which the PDCP entity 2200 is linked. The first configuration described above may correspond to the first configuration in step S2302 described above. In other words, the first configuration may refer to the RRC layer, corresponding to the upper layer, performing the configuration for the MBB-HO. The configuration for the MBB-HO described above may refer to adaptation of the MBB-HO, or configuration for some or all of the second RLC entity, the second RLC bearer, the second logical channel, and the second cell group. Additionally, the processing of step S2500 may be performed based on the further association of two or more RLC entities with the PDCP entity 2200.

In a case that two or more RLC entities are associated with the PDCP entity 2200 and that the first configuration described above has not been performed, the PDCP entity 2200 may perform some or all of the processing operations (S) to (U).

(S) With the PDCP duplication activated, a PDCP Data PDU is duplicated, and resultant PDCP Data PDUs are submitted to both associated RLC entities, and a PDCP Control PDU is submitted to the primary RLC entity.
(T) With the PDCP duplication not activated, in a case that the two associated RLC entities belong to different cell groups and that the total amount of PDCP data volume and RLC data volume of the two associated RLC entities, the data volumes being pending for initial transmission, is more than or equal to the threshold for uplink data, then the PDCP PDU is submitted to the primary RLC entity or to the secondary RLC entity, and otherwise (in a case that the two associated RLC entities belong to different same cell group and/or the total amount of PDCP data volume and RLC data volume of the two associated RLC entities, the data volumes being pending for initial transmission, is less than the threshold for uplink data), then the PDCP PDU is submitted to the primary RLC entity.

(U) Any other processing.

Also in step S2500, the first sub-entity, the first RLC entity, the first ciphering algorithm and the first ciphering key, the first integrity protection algorithm and the first integrity protection key, and the first RoHC state may correspond to the sub-entity, RLC entity, ciphering algorithm and ciphering key, integrity protection algorithm and integrity protection key, and RoHC state for the handover source of the MBB-HO and/or for the cell group of the handover source, and/or the primary sub-entity, RLC entity, ciphering algorithm and ciphering key, integrity protection algorithm and integrity protection key, and RoHC state. Also in step S2500, the second sub-entity, the second RLC entity, the second ciphering algorithm and the second ciphering key, the second integrity protection algorithm and the second integrity protection key, the second RoHC state may be, for a handover target at the MBB-HO, and/or for the cell group of the handover destination and/or for the secondary sub-entity, the RLC entity, the ciphering algorithm and ciphering key, the integrity protection algorithm and the integrity protection key, RoHC state.

The MAC entity in the second cell group described above for which the second RLC entity is configured may transmit a first notification to the upper layer after receiving an initial uplink grant from the base station apparatus. The first notification may be a notification related to reception of the initial uplink grant, or may be a notification indicating that the uplink transmission is switched to some or all of the second RLC entity, the second RLC bearer, the second logical channel, and the second cell group. Note that the processing in which the MAC entity transmits the first notification to the upper layer after receiving the initial uplink grant from the base station apparatus may be performed based on the MBB-HO having been configured.

Figure 26:
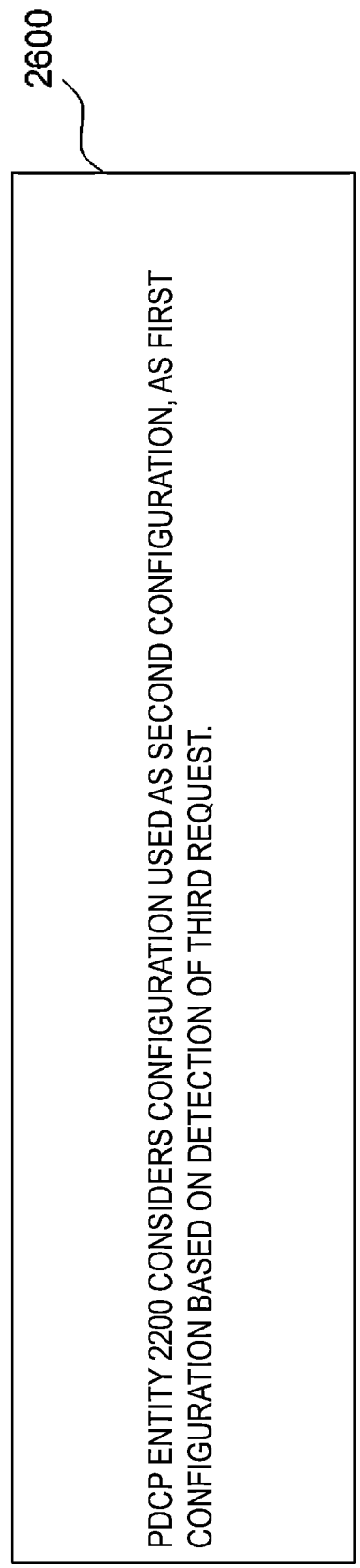
FIG. 26 is another example of the processing method performed by the PDCP entity 2200 according to each form of the present implementation.

FIG. 26 is another example of a processing method performed by the PDCP entity 2200 in each form of the present implementation. Note that step S2600 described below may be performed based on part or all of steps S2300 and S2302 described above having been performed or may further be performed after part or all of steps S2300 and S2302 described above are performed.

The PDCP entity 2200, the first sub-entity of the PDCP entity 2200, and the second sub-entity of the PDCP entity 2200 in step S2600 described below may respectively correspond to the PDCP entity 2200, the first sub-entity of PDCP entity 2200, and the second sub-entity of PDCP entity 2200 illustrated in part or all of steps S2300 and S2302 described above. The first RLC entity and the second RLC entity in step S2600 described below may respectively correspond to the first RLC entity and the second RLC entity illustrated in part or all of steps S2300 and S2302 described above. The first ciphering algorithm, the first ciphering key, the second ciphering algorithm, and the second ciphering key in step S2600 described below may respectively correspond to the first ciphering algorithm, the first ciphering key, the second ciphering algorithm, and the second ciphering key illustrated in part or all of steps S2300 and S2302 described above. The first integrity protection algorithm, the first integrity protection key, the second integrity protection algorithm, and the second integrity protection key in step S2600 described below may respectively correspond to the first integrity protection algorithm, the first integrity protection key, the second integrity protection algorithm, and the second integrity protection key illustrated in part or all of steps S2300 and S2302 described above. The first RoHC state and the second RoHC state in step S2600 described below may respectively correspond to the first RoHC state and the second RoHC state illustrated in part or all of steps S2300 and S2302 described above. The first configuration in step S2600 described below may correspond to the first configuration in step S2302 described above.

The PDCP entity 2200 may perform some or all of (A) to (K) described below in response to detecting a third request.

Step S2600

(A) The second RLC entity described above is considered as the first RLC entity.

(B) The second radio bearer to which the second RLC entity is linked is considered as the first radio bearer.

(C) The second RLC bearer to which the second RLC entity described above is linked is considered as the first RLC bearer.

(D) The second cell group to which the second RLC entity is linked is considered as the first cell group.

(E) The second MAC entity to which the second RLC entity described above is linked is considered as the first MAC entity.

(F) The second ciphering algorithm described above and the second ciphering key described above are respectively considered as the first ciphering algorithm and the first ciphering key.

(G) The second integrity protection algorithm described above and the second integrity protection key described above are respectively considered as the first integrity protection algorithm and the first integrity protection key.

(H) The second RoHC state described above is considered as the first RoHC state.

(I) The first configuration described above is erased.

(J) The second sub-entity of the PDCP entity 2200 described above is considered as the first sub-entity of the PDCP entity 2200.

(K) Any other processing.

The detection of the third request in step S2600 described above may correspond to the first RLC entity being released and/or stopped in step S2300 and/or step S2302 described above. In addition, the detection of the third request in step S2600 described above may correspond to the detection of the second request in step S2500 described above. Additionally, the detection of the third request in step S2600 described above may correspond to a method in which the third request is detected by expiry of a timer configured in the PDCP entity 2200 to detect the third request. Additionally, the detection of the third request in step S2600 described above may correspond to a method in which the third request is detected by being received from the upper layer or the lower layer. In step S2600 described above, the second request detection method may be a method in which the second method us detected by implementation of a terminal apparatus.

Also in step S2600, the first sub-entity, the first RLC entity, the first radio bearer, the first RLC bearer, the first cell group, the first MAC entity, the first ciphering algorithm and the first ciphering key, the first integrity protection algorithm and the first integrity protection key, and the first RoHC state may correspond to the sub-entity, RLC entity, radio bearer, RLC bearer, cell group, MAC entity, ciphering algorithm and ciphering key, integrity protection algorithm and integrity protection key, and RoHC state for the handover source of the MBB-HO and/or for the cell group of the handover source, and/or the primary sub-entity, RLC entity, radio bearer, RLC bearer, cell group, MAC entity, ciphering algorithm and ciphering key, integrity protection algorithm and integrity protection key, and RoHC state. Also in step S2600, the second sub-entity, the second RLC entity, the second radio bearer, the second RLC bearer, the second cell group, the second MAC entity, the second ciphering algorithm and the second ciphering key, the second integrity protection algorithm and the second integrity protection key, the second RoHC state may correspond to the sub-entity, RLC entity, radio bearer, RLC bearer, cell group, MAC entity, ciphering algorithm and ciphering key, integrity protection algorithm and integrity protection key, and RoHC state for the handover source of the MBB-HO and/or for the cell group of the handover source, and/or the secondary sub-entity, RLC entity, radio bearer, RLC bearer, cell group, MAC entity, ciphering algorithm and ciphering key, integrity protection algorithm and integrity protection key, and RoHC state.

Thus, in the embodiment of the present invention, efficient communication can be performed during handover of the UE 122.

In the above description, expressions such as "linked," "associated," and the like may be replaced with one another.

In the above description, "for MBB-HO" may be a case where transmission and/or reception of user data is performed in the target cell with continued transmission and/or reception of user data in the source cell in a case that in the LTE, RRC connection reconfiguration including MobilityControlInfo is performed or that in the NR, RRC reconfiguration including Reconfiguration With Sync is performed, or "for MBB-HO" may be expressed by another name meaning an equivalent operation. "For MBB-HO" may be a case where in the LTE or NR, a specific information element (e.g., the MakeBeforeBreak-r16 information element illustrated in FIGS. 10 to 13 and FIG. 21 and/or mbb-drb illustrated in FIGS. 20 to 22) is included in the RRC reconfiguration message. "For MBB-HO" may be a case where the time during which data communication between the terminal apparatus and the base station apparatus is prevented (disconnect time) is set to or set closer to zero milliseconds (0 msec), or another name meaning this may be used to express "for MBB-HO."

In the above description, the "configuration for MBB-HO" may be a configuration for transmission and/or reception of user data performed in the target cell with continued transmission and/or reception of user data in the source cell in a case that in the LTE, RRC connection reconfiguration including MobilityControlInfo is performed or that in the NR, RRC reconfiguration including Reconfiguration With Sync is performed, or the "configuration for MBB-HO" may be expressed by another name meaning an equivalent configuration. The "configuration for MBB-HO" may be a case where in the LTE or NR, a specific information element (e.g., the MakeBeforeBreak-r16 information element illustrated in FIGS. 10 to 13 and FIG. 21 and/or mbb-drb illustrated in FIGS. 20 and 21) is included in the RRC reconfiguration message. "For MBB-HO" may be a case where the time during which data communication between the terminal apparatus and the base station apparatus is prevented (disconnect time) is set to or set closer to zero milliseconds (0 msec), or another name meaning this may be used to express "for MBB-HO."

Additionally, in the above description, "application of make before break-handover (MBB-HO)" may be application of transmission and/or reception of user data in the target cell with continued transmission and/or reception of user data in the source cell in a case that in the LTE, RRC connection reconfiguration including MobilityControlInfo is performed or that in the NR, RRC reconfiguration including Reconfiguration With Sync is performed, or "application of make before break-handover (MBB-HO)" may be expressed by another name meaning equivalent processing. Additionally, "application of make before break-handover (MBB-HO)" may be application in a case that in the LTE or NR, a specific information element (e.g., the MakeBeforeBreak-r16 information element illustrated in FIGS. 10 to 13 and FIG. 21 and/or mbb-drb illustrated in FIGS. 20 and 21) is included in the RRC reconfiguration message. Additionally, "application of MBB-HO" may be application of processing in which the time during which data communication between the terminal apparatus and the base station apparatus is prevented (disconnect time) is set to or set closer to zero milliseconds (0 msec), or another name meaning this may be used to express "application of MBB-HO."

Note that in each embodiment of the present invention, the handover may be interpreted as Reconfiguration With Sync. For example, the make before break-handover may be interpreted as a make before break Reconfiguration With Sync.

Note that in the above description, "A may be interpreted as B" may include the meaning that B is interpreted as A in addition to interpretation of A as B.

Note that in the above description, the primary sub-entity, primary RLC entity, and/or primary MAC entity of the PDCP may be an entity that is used as or may be used as a source side (e.g., a handover source or a SCG Change source) in performing Reconfiguration With Sync (e.g., a handover or a SCG Change). The primary sub-entity, primary RLC entity, and/or primary MAC entity of the PDCP may be an entity that is used as or may be used as a target for which RRC that is not Reconfiguration With Sync (e.g., a handover or a SCG Change) is reconfigured. The secondary sub-entity, secondary RLC entity, and/or secondary MAC entity of the PDCP may be an entity that is used as or may be used as a target side (e.g., a handover target or a SCG Change target) in performing Reconfiguration With Sync (e.g., a handover or a SCG Change). The secondary sub-entity, secondary RLC entity, and/or secondary MAC entity of the PDCP may be an entity that is present only in a state in which the primary sub-entity, primary RLC entity, and/or primary MAC entity of the PDCP is present. The primary sub-entity, primary RLC entity, and/or primary MAC entity of the PDCP may be an entity that is present in a state in which the secondary sub-entity, secondary RLC entity, and/or secondary MAC entity of the PDCP is not present.

Various aspects of the terminal apparatus according to embodiments of the present invention will be described below.

(1) A first embodiment of the present invention is a terminal apparatus for communicating with a base station apparatus, wherein a PDCP entity is configured for the terminal apparatus, and the PDCP entity includes a first ciphering algorithm and a first ciphering key linked to a first RLC entity, and a first integrity protection algorithm and a first integrity protection key linked to the first RLC entity, and a first header compression state for downlink reception from the first RLC entity, and based on a first request being made by an upper layer, links, to a second RLC entity, a second ciphering algorithm and a second ciphering key provided by the upper layer, and links, to the second RLC entity, a second integrity protection algorithm and a second integrity protection key provided by the upper layer, and in response to downlink reception from the second RLC entity, initiates a second header compression protocol in a No Context (NC) state in a unidirectional mode as a second header compression state.

(2) A second embodiment of the present invention is a terminal apparatus for communicating with a base station apparatus according to the first embodiment of the present invention, wherein the PDCP entity further performs deciphering by using the first ciphering algorithm, the first ciphering key, and a COUNT value obtained from a header of the PDCP DATA PDU, performs integrity verification by using the first integrity protection algorithm, the first integrity protection key, and the COUNT value obtained from the header of the PDCP DATA PDU, and performs header decompression by using the first header compression state, in response to receiving a PDCP DATA PDU from the first RLC entity, and the PDCP entity performs deciphering by using the second ciphering algorithm, the second ciphering key, and the COUNT value obtained from the header of the PDCP DATA PDU, performs integrity verification by using the second integrity protection algorithm, the second integrity protection key, and the COUNT value obtained from the header of the PDCP DATA PDU, and performs header decompression by using the second header compression state, in response to receiving the PDCP DATA PDU from the second RLC entity.

(3) A third embodiment of the present invention is the terminal apparatus for communicating with the base station apparatus according to the first embodiment of the present invention or the second embodiment of the present invention, wherein the first RLC entity is a primary RLC entity, and the second RLC entity is a secondary RLC entity.

(4) A fourth embodiment of the present invention is the terminal apparatus for communicating with the base station apparatus according to the first embodiment of the present invention, or the second embodiment of the present invention, or the third embodiment of the present invention, wherein the PDCP entity further uses the second RLC entity as a primary RLC entity in response to detection of release or stoppage of the first RLC entity or a second request.

(5) A fifth embodiment of the present invention is the terminal apparatus for communicating with the base station apparatus according to the first embodiment of the present invention, or the second embodiment of the present invention, or the third embodiment of the present invention, or the fourth embodiment of the present invention, wherein the PDCP entity performs the processing according to the first embodiment of the present invention, or the second embodiment of the present invention, or the third embodiment of the present invention, or the fourth embodiment of the present invention in a case that the first configuration is performed by the upper layer.

(6) A sixth embodiment of the present invention is a method for a terminal apparatus for communicating with a base station apparatus, wherein a PDCP entity is configured for the terminal apparatus, and the PDCP entity includes a first ciphering algorithm and a first ciphering key linked to a first RLC entity, and a first integrity protection algorithm and a first integrity protection key linked to the first RLC entity, and a first header compression state for downlink reception from the first RLC entity, and based on a first request being made by an upper layer, links, to a second RLC entity, a second ciphering algorithm and a second ciphering key provided by the upper layer, and links, to the second RLC entity, a second integrity protection algorithm and a second integrity protection key provided by the upper layer, and in response to downlink reception from the second RLC entity, initiates a second header compression protocol in a No Context (NC) state in a unidirectional mode as a second header compression state.

(7) A seventh embodiment of the present invention is the method for the terminal apparatus for communicating with the base station apparatus according to the sixth embodiment of the present invention, wherein the PDCP entity further performs deciphering by using the first ciphering algorithm, the first ciphering key, and a COUNT value obtained from a header of the PDCP DATA PDU, performs integrity verification by using the first integrity protection algorithm, the first integrity protection key, and the COUNT value obtained from the header of the PDCP DATA PDU, and performs header decompression by using the first header compression state, in response to receiving a PDCP DATA PDU from the first RLC entity, and the PDCP entity performs deciphering by using the second ciphering algorithm, the second ciphering key, and the COUNT value obtained from the header of the PDCP DATA PDU, performs integrity verification by using the second integrity protection algorithm, the second integrity protection key, and the COUNT value obtained from the header of the PDCP DATA PDU, and performs header decompression by using the second header compression state, in response to receiving the PDCP DATA PDU from the second RLC entity.

(8) An eighth embodiment of the present invention is the method for the terminal apparatus for communicating with the base station apparatus according to the sixth embodiment of the present invention or the seventh embodiment of the present invention, wherein the first RLC entity is a primary RLC entity, and the second RLC entity is a secondary RLC entity.

(9) A ninth embodiment of the present invention is the method for the terminal apparatus for communicating with the base station apparatus according to the sixth embodiment of the present invention, or the seventh embodiment of the present invention, or the eighth embodiment of the present invention, wherein the PDCP entity further uses the second RLC entity as a primary RLC entity in response to detection of release or stoppage of the first RLC entity or a second request.

(10) A tenth embodiment of the present invention is the method for the terminal apparatus for communicating with the base station apparatus according to the sixth embodiment of the present invention, or the seventh embodiment of the present invention, or the eighth embodiment of the present invention, or the ninth embodiment of the present invention, wherein the PDCP entity performs the processing according to the sixth embodiment of the present invention, or the seventh embodiment of the present invention, or the eighth embodiment of the present invention, or the ninth embodiment of the present invention in a case that the first configuration is performed by the upper layer.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not departing from the gist of the present invention. Furthermore, various modifications are possible within the scope of one aspect of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter
2200 PDCP entity
2202, 2204 RLC entity

The invention claimed is:

1. A terminal apparatus that communicates with a base station apparatus, the terminal apparatus comprising:
a receiver configured to receive an RRC (Radio Resource Control) reconfiguration message from the base station apparatus; and
a processor, wherein
the processor is configured to:
establish a first PDCP (Packet Data Convergence Protocol) entity associated with a first DRB (Data Radio Bearer) and a second PDCP entity associated with a second DRB;
have the first PDCP entity apply a first ciphering algorithm, a first ciphering key, a first integrity protection algorithm, and a first integrity protection key; and
have the second PDCP entity apply the first ciphering algorithm, a second ciphering algorithm, the first ciphering key, a second ciphering key, the first integrity protection algorithm, a second integrity protection algorithm, the first integrity protection key, and a second integrity protection key,
the first DRB is a DRB for which a first request is not performed based on the RRC reconfiguration message, the second DRB is a DRB for which the first request is performed based on the RRC reconfiguration message, the first request is a request for performing a handover in which transmission or reception of user data in a target cell with continued transmission or reception of user data in a source cell is performed, and the first request is applied for a radio bearer with which a PDCP entity is associated.

2. The terminal apparatus according to claim 1, the processor is further configured to:

in a case that a first data is received from the source cell, have the PDCP entity perform a deciphering for the first data using the first ciphering algorithm and the first ciphering key;

in a case that a second data is received from the target cell, have the PDCP entity perform a deciphering for the second data using the second ciphering algorithm and the second ciphering key;

in a case that the first data is received from the source cell, have the PDCP entity perform a verification for the first data using the first integrity protection algorithm and the first integrity protection key; and in a case that the second data is received from the target cell, have the PDCP entity perform a verification for the second data using the second integrity protection algorithm and the second integrity protection key.

3. A base station apparatus that communicates with a terminal apparatus, the base station apparatus comprising:

a transmitter configured to transmit an RRC (Radio Resource Control) reconfiguration message to the terminal apparatus; and a processor, wherein the processor is configured to:

have the terminal apparatus establish a first PDCP (Packet Data Convergence Protocol) entity associated with a first DRB (Data Radio Bearer) and a second PDCP entity associated with a second DRB;

have the first PDCP entity apply a first ciphering algorithm, a first ciphering key, a first integrity protection algorithm, and a first integrity protection key; and have the second PDCP entity apply the first ciphering algorithm, a second ciphering algorithm, the first ciphering key, a second ciphering key, the first integrity protection algorithm, a second integrity protection algorithm, the first integrity protection key, and a second integrity protection key, the first DRB is a DRB for which a first request is not performed based on the RRC reconfiguration message, the second DRB is a DRB for which the first request is performed based on the RRC reconfiguration message, the first request is a request for performing a handover in which transmission or reception of user data in a target cell with continued transmission or reception of user data in a source cell is performed, and the first request is applied for a radio bearer with which a PDCP entity is associated.

4. The base station apparatus according to claim 3, the processor is further configured to:

in a case that a first data is received from the source cell by the terminal apparatus, have the PDCP entity perform a deciphering for the first data using the first ciphering algorithm and the first ciphering key;

in a case that a second data is received from the target cell by the terminal apparatus, have the PDCP entity perform a deciphering for the second data using the second ciphering algorithm and the second ciphering key;

in a case that the first data is received from the source cell by the terminal apparatus, have the PDCP entity perform a verification for the first data using the first integrity protection algorithm and the first integrity protection key; and in a case that the second data is received from the target cell by the terminal apparatus, have the PDCP entity perform a verification for the second data using the second integrity protection algorithm and the second integrity protection key.

5. A method for a terminal apparatus that communicates with a base station apparatus, the method comprising:

receiving an RRC (Radio Resource Control) reconfiguration message from the base station apparatus;

establishing a first PDCP (Packet Data Convergence Protocol) entity associated with a first DRB (Data Radio Bearer) and a second PDCP entity associated with a second DRB;

having the first PDCP entity apply a first ciphering algorithm, a first ciphering key, a first integrity protection algorithm, and a first integrity protection key; and having the second PDCP entity apply the first ciphering algorithm, a second ciphering algorithm, the first ciphering key, a second ciphering key, the first integrity protection algorithm, a second integrity protection algorithm, the first integrity protection key, and a second integrity protection key, the first DRB is a DRB for which a first request is not performed based on the RRC reconfiguration message, the second DRB is a DRB for which the first request is performed based on the RRC reconfiguration message, the first request is a request for performing a handover in which transmission or reception of user data in a target cell with continued transmission or reception of user data in a source cell is performed, and the first request is applied for a radio bearer with which a PDCP entity is associated.

* * * * *